(12) United States Patent
Xi et al.

(10) Patent No.: US 11,852,921 B2
(45) Date of Patent: Dec. 26, 2023

(54) ALIGNMENT DEVIATION DETECTION METHOD AND APPARATUS THEREOF, DATA COMPENSATION METHOD AND APPARATUS THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yanhui Xi, Beijing (CN); Tiankuo Shi, Beijing (CN); Yan Sun, Beijing (CN); Xiaomang Zhang, Beijing (CN); Yifan Hou, Beijing (CN); Xin Duan, Beijing (CN); Wei Sun, Beijing (CN); Ming Chen, Beijing (CN); Wenchieh Huang, Beijing (CN); Shaoru Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 237 days.

(21) Appl. No.: 17/310,849

(22) PCT Filed: Mar. 27, 2020

(86) PCT No.: PCT/CN2020/081669
§ 371 (c)(1),
(2) Date: Aug. 26, 2021

(87) PCT Pub. No.: WO2021/189421
PCT Pub. Date: Sep. 30, 2021

(65) Prior Publication Data
US 2022/0283466 A1 Sep. 8, 2022

(51) Int. Cl.
*G02F 1/1335* (2006.01)
*G02F 1/13* (2006.01)
*G09G 5/10* (2006.01)

(52) U.S. Cl.
CPC ...... *G02F 1/133607* (2021.01); *G02F 1/1323* (2013.01); *G09G 5/10* (2013.01); *G09G 2320/0626* (2013.01)

(58) Field of Classification Search
CPC .. G09G 5/10; G09G 2320/0626; G09G 3/006; G09G 2300/023; G09G 2320/0693;
(Continued)

(56) References Cited

U.S. PATENT DOCUMENTS

2011/0279749 A1* 11/2011 Erinjippurath ....... H04N 13/324
345/32

FOREIGN PATENT DOCUMENTS

CN 110673411 A * 1/2020 ........... G02F 1/1334

OTHER PUBLICATIONS

CN 110673411 A (Year: 2020).*

* cited by examiner

*Primary Examiner* — James A Dudek

(57) ABSTRACT

An alignment deviation detection method and apparatus of a display panel, a data compensation method and apparatus. The method includes: providing a first data signal for causing the dimming screen to display an alignment dimming picture including a first alignment pattern; providing a second data signal for causing the display screen to display an alignment display picture including a second alignment pattern; under a control of the first data signal, making the dimming screen display the alignment dimming picture, and under a control of the second data signal, making the display screen display the alignment display picture; according to a
(Continued)

display situation of the second alignment pattern, determining an alignment state between the display screen and the dimming screen. An orthographic projection of the second alignment pattern on the dimming screen is preset to be at least partially aligned with and at least partially deviated from the first alignment pattern.

20 Claims, 18 Drawing Sheets

(58) Field of Classification Search
CPC . G02F 1/133607; G02F 1/1323; G02F 1/1336
See application file for complete search history.

(a)

(b)

(a) (b)

US 11,852,921 B2

ALIGNMENT DEVIATION DETECTION METHOD AND APPARATUS THEREOF, DATA COMPENSATION METHOD AND APPARATUS THEREOF

This application is a National Stage of International Application No. PCT/CN2020/081669, filed Mar. 27, 2020, the entirety of which is hereby incorporated herein by reference.

TECHNICAL FIELD

At least one embodiment of the present disclosure relates to an alignment deviation detection method, a data compensation method, an alignment deviation detection apparatus, and a data compensation apparatus.

BACKGROUND

Local dimming technology can change backlight brightness in real time according to a displayed image, so as to save power consumption of the backlight and improve the contrast of image quality. A liquid crystal display panel can include two liquid crystal display screens which overlap with each other, one of the two liquid crystal display screens is used for displaying images and the other of the two liquid crystal display screens is used for local dimming. The liquid crystal display panel can significantly improve its contrast, and the display effect of the liquid crystal display panel is comparable to that of an organic light-emitting diode (OLED) display panel. The liquid crystal display panel including two liquid crystal display screens can be called a double-cell liquid crystal display panel, which can achieve high-precision dynamic dimming with a contrast of more than 100,000 levels and millions of levels of partitions through double-screen control, and is highly favored by customers.

SUMMARY

At least one embodiment of the present disclosure provides an alignment deviation detection method of a display panel, the display panel comprises a dimming screen and a display screen, and the dimming screen is on a backlight side of the display screen and is configured to perform backlight modulation on the display screen, the method comprises: providing a first data signal for causing the dimming screen to display an alignment dimming picture comprising a first alignment pattern; providing a second data signal for causing the display screen to display an alignment display picture comprising a second alignment pattern; under a control of the first data signal, making the dimming screen display the alignment dimming picture, and under a control of the second data signal, making the display screen display the alignment display picture; according to a display situation of the second alignment pattern in the alignment display picture, determining an alignment state between the display screen and the dimming screen, an orthographic projection of the second alignment pattern on the dimming screen is preset to be at least partially aligned with the first alignment pattern and at least partially deviated from the first alignment pattern.

For example, in the alignment deviation detection method of the display panel provided by at least one embodiment of the present disclosure, the first alignment pattern comprises a first part, and the second alignment pattern comprises a first part, a second part, and a third part, and the first part, the second part, and the third part of the second alignment pattern are independent of each other, the orthographic projection of the second alignment pattern on the dimming screen being preset to be at least partially aligned with the first alignment pattern and at least partially deviated from the first alignment pattern, comprises: presetting an orthographic projection of the first part of the second alignment pattern on the dimming screen to deviate to a first side of the first part of the first alignment pattern in a first alignment direction; presetting an orthographic projection of the second part of the second alignment pattern on the dimming screen to be aligned with the first part of the first alignment pattern in the first alignment direction; presetting an orthographic projection of the third part of the second alignment pattern on the dimming screen to deviate to a second side of the first part of the first alignment pattern in the first alignment direction. A direction in which the first part of the second alignment pattern deviates from the first part of the first alignment pattern is opposite to a direction in which the third part of the second alignment pattern deviates from the first part of the first alignment pattern, and a distance by which the first part of the second alignment pattern deviates from the first part of the first alignment pattern is identical with a distance by which the third part of the second alignment pattern deviates from the first part of the first alignment pattern, and the first side and the second side of the first part of the first alignment pattern are two sides opposite to each other.

For example, in the alignment deviation detection method of the display panel provided by at least one embodiment of the present disclosure, the dimming screen comprises a plurality of dimming pixels, and the plurality of dimming pixels are arranged in M rows and N columns; the display screen comprises a plurality of display pixels, and the plurality of display pixels are arranged in αM rows and αN columns, M and N are positive integers, 3≤M, 3≤N, and α is a positive integer.

For example, in the alignment deviation detection method of the display panel provided by at least one embodiment of the present disclosure, the first part of the first alignment pattern comprises a first dimming line segment. Under the control of the first data signal, making the dimming screen display the alignment dimming picture, comprises: under the control of the first data signal, controlling at least part of dimming pixels located in an m-th row of the dimming screen to display the first dimming line segment, m is a positive integer, and 2≤m≤M−1.

For example, in the alignment deviation detection method of the display panel provided by at least one embodiment of the present disclosure, α=2, the first part of the second alignment pattern comprises a first display line segment, the second part of the second alignment pattern comprises a second display line segment, and the third part of the second alignment pattern comprises a third display line segment. Under the control of the second data signal, making the display screen display the alignment display picture, comprises: under the control of the second data signal, controlling display pixels located in an nb-th column to an nb'-th column of a ((2*m−2)−β)-th row and in the nb-th column to the nb'-th column of a ((2*m−1)−β)-th row of the display screen to display the first display line segment, controlling display pixels located in an nc-th column to an nc'-th column of a (2*m−1)-th row and in the nc-th column to the nc'-th column of a (2*m)-th row of the display screen to display the second display line segment, and controlling display pixels located in an nd-th column to an nd'-th column of a ((2*m)+β)-th row and in the nd-th column to the nd'-th column of a ((2*m+1)+β)-th row of the display screen to display the third display line segment. 13 is 0, 1, or 2, nb, nb', nc, nc', nd, and nd' are positive integers, and 1≤nb≤nb'<nc≤nc'<nd≤nd'≤2N.

For example, in the alignment deviation detection method of the display panel provided by at least one embodiment of the present disclosure, the first alignment direction is a column direction of the plurality of dimming pixels of the dimming screen, and the alignment state comprises a first alignment state, a second alignment state, and a third alignment state. The first alignment state indicates that an alignment between the display screen and the dimming screen has no deviation in the column direction of the plurality of dimming pixels of the dimming screen, the second alignment state indicates that the display screen is offset upward by one row of display pixels relative to the dimming screen in the column direction of the plurality of dimming pixels of the dimming screen, the third alignment state indicates that the display screen is offset downward by one row of display pixels relative to the dimming screen in the column direction of the plurality of dimming pixels of the dimming screen.

For example, in the alignment deviation detection method of the display panel provided by at least one embodiment of the present disclosure, β=0, according to the display situation of the second alignment pattern, determining the alignment state between the display screen and the dimming screen, comprises: in a case where a brightness value of the second display line segment is greater than a brightness value of the first display line segment and a brightness value of the third display line segment, and the brightness value of the first display line segment is equal to the brightness value of the third display line segment, determining that the display screen and the dimming screen are in the first alignment state; in a case where the brightness value of the third display line segment is greater than the brightness value of the second display line segment, and the brightness value of the second display line segment is greater than the brightness value of the first display line segment, determining that the display screen and the dimming screen are in the second alignment state; or, in a case where the brightness value of the first display line segment is greater than the brightness value of the second display line segment, and the brightness value of the second display line segment is greater than the brightness value of the third display line segment, determining that the display screen and the dimming screen are in the third alignment state.

For example, in the alignment deviation detection method of the display panel provided by at least one embodiment of the present disclosure, the first part of the second alignment pattern further comprises a fourth display line segment, and the third part of the second alignment pattern further comprises a fifth display line segment. Under the control of the second data signal, making the display screen display the alignment display picture, further comprises: under the control of the second data signal, controlling display pixels located in an na-th column to an na'-th column of a ((2*m−3)−β)-th row and in the na-th column to the na'-th column of the ((2*m−2)−β)-th row of the display screen to display the fourth display line segment in the second alignment picture, and controlling display pixels located in an ne-th column to an ne'-th column of the ((2*m+1)+β)-th row and in the ne-th column to the ne'-th column of a ((2*m+2)+β)-th row of the display screen to display the fifth display line segment in the second alignment picture, na, na', ne, and ne' are positive integers, 1≤na≤na'≤nb≤nb'<nc≤nc'<nd≤nd'≤ne≤ne'≤2N.

For example, in the alignment deviation detection method of the display panel provided by at least one embodiment of the present disclosure, β=0, according to the display situation of the second alignment pattern, determining the alignment state between the display screen and the dimming screen, comprises: in a case where a brightness value of the second display line segment is greater than a brightness value of the first display line segment, a brightness value of the third display line segment, a brightness value of the fourth display line segment, and a brightness value of the fifth display line segment, and the brightness value of the first display line segment is equal to the brightness value of the third display line segment, the brightness value of the fourth display line segment is equal to the brightness value of the fifth display line segment, and the brightness value of the first display line segment is greater than the brightness value of the fourth display line segment, determining that the display screen and the dimming screen are in the first alignment state; in a case where the brightness value of the third display line segment is greater than the brightness value of the first display line segment, the brightness value of the second display line segment, the brightness value of the fourth display line segment, and the brightness value of the fifth display line segment, and the brightness value of the second display line segment is equal to the brightness value of the fifth display line segment, the brightness value of the first display line segment is smaller than the brightness value of the second display line segment and is greater than the brightness value of the fourth display line segment, determining that the display screen and the dimming screen are in the second alignment state; or, in a case where the brightness value of the first display line segment is greater than the brightness value of the second display line segment, the brightness value of the third display line segment, the brightness value of the fourth display line segment, and the brightness value of the fifth display line segment, and the brightness value of the second display line segment is equal to the brightness value of the fourth display line segment, and the brightness value of the third display line segment is smaller than the brightness value of the second display line segment and is greater than the brightness value of the fifth display line segment, determining that the display screen and the dimming screen are in the third alignment state.

For example, in the alignment deviation detection method of the display panel provided by at least one embodiment of the present disclosure, the first alignment pattern further comprises a second part, and the second alignment pattern further comprises a fourth part, a fifth part, and a sixth part, and the fourth part, the fifth part, and the sixth part are independent of each other. The orthographic projection of the second alignment pattern on the dimming screen being preset to be at least partially aligned with the first alignment pattern and at least partially deviated from the first alignment pattern, further comprises: presetting an orthographic projection of the fourth part of the second alignment pattern on the dimming screen to deviate to a first side of the second part of the first alignment pattern in a second alignment direction; presetting an orthographic projection of the fifth part of the second alignment pattern on the dimming screen to be aligned with the second part of the first alignment pattern in the second alignment direction; and presetting an orthographic projection of the sixth part of the second alignment pattern on the dimming screen to deviate to a second side of the second part of the first alignment pattern in the second alignment direction, a direction in which the fourth part of the second alignment pattern deviates from the second part of the first alignment pattern is opposite to a direction in which the sixth part of the second alignment pattern deviates from the second part of the first alignment pattern, and a distance by which the fourth part of the second alignment pattern deviates from the second part of the first alignment pattern is identical with a distance by which the sixth part of the second alignment pattern deviates from the second part of the first alignment pattern; the first side and the second side of the second part of the first alignment pattern are two sides opposite to each other; and the first alignment direction and the second alignment direction are perpendicular to each other on a plane parallel to the dimming screen.

For example, in the alignment deviation detection method of the display panel provided by at least one embodiment of the present disclosure, the second part of the first alignment pattern comprises a second dimming line segment. Under the control of the first data signal, making the dimming screen display the alignment dimming picture, further comprises: under the control of the first data signal, controlling at least part of dimming pixels located in an n-th column of the dimming screen to display the second dimming line segment, n is a positive integer, $2 \leq n \leq N-1$.

For example, in the alignment deviation detection method of the display panel provided by at least one embodiment of the present disclosure, $\alpha=2$, the fourth part of the second alignment pattern comprises a sixth display line segment, the fifth part of the second alignment pattern comprises a seventh display line segment, and the sixth part of the second alignment pattern comprises an eighth display line segment. Under the control of the second data signal, making the display screen display the alignment display picture, comprises: under the control of the second data signal, controlling display pixels located in an mb-th row to an mb'-th row of a $((2*n-2)-\gamma)$-th column and in the mb-th row to the mb'-th row of a $((2*n-1)-\gamma)$-th column of the display screen to display the sixth display line segment, controlling display pixels located in an mc-th row to an mc'-th row of a $(2*n-1)$-th column and in the mc-th row to the mc'-th row of a $(2*n)$-th column of the display screen to display the seventh display line segment, and controlling display pixels located in an md-th row to an md'-th row of a $((2*n)+\gamma)$-th column and in the md-th row to the md'-th row of a $((2*n+1)+\gamma)$-th column of the display screen to display the eighth display line segment, γ is 0 or 1, mb, mb', mc, mc', md, and md' are positive integers, and $1 \leq mb \leq mb' < mc \leq mc' < md \leq md' \leq 2M$.

For example, in the alignment deviation detection method of the display panel provided by at least one embodiment of the present disclosure, the second alignment direction is a row direction of the plurality of dimming pixels of the dimming screen, and the alignment state comprises a fourth alignment state, a fifth alignment state, and a sixth alignment state, the fourth alignment state indicates that in the row direction of the plurality of dimming pixels of the dimming screen, an alignment between the display screen and the dimming screen has no deviation, the fifth alignment state indicates that in the row direction of the plurality of dimming pixels of the dimming screen, the display screen is offset to left by one column of display pixels relative to the dimming screen, the sixth alignment state indicates that in the row direction of the plurality of dimming pixels of the dimming screen, the display screen is offset to right by one column of display pixels relative to the dimming screen.

For example, in the alignment deviation detection method of the display panel provided by at least one embodiment of the present disclosure, $\gamma=0$, according to the display situation of the second alignment pattern, determining the alignment state between the display screen and the dimming screen, comprises: in a case where a brightness value of the seventh display line segment is greater than a brightness value of the sixth display line segment and a brightness value of the eighth display line segment, and the brightness value of the sixth display line segment is equal to the brightness value of the eighth display line segment, determining that the display screen and the dimming screen are in the fourth alignment state; in a case where the brightness value of the eighth display line segment is greater than the brightness value of the seventh display line segment, and the brightness value of the seventh display line segment is greater than the brightness value of the sixth display line segment, determining that the display screen and the dimming screen are in the fifth alignment state; or, in a case where the brightness value of the sixth display line segment is greater than the brightness value of the seventh display line segment, and the brightness value of the seventh display line segment is greater than the brightness value of the eighth display line segment, determining that the display screen and the dimming screen are in the sixth alignment state.

For example, in the alignment deviation detection method of the display panel provided by at least one embodiment of the present disclosure, the fourth part of the second alignment pattern further comprises a ninth display line segment, and the sixth part of the second alignment pattern further comprises a tenth display line segment. Under the control of the second data signal, making the display screen display the alignment display picture, further comprises: under the control of the second data signal, controlling display pixels located in an ma-th row to an ma'-th row of a $((2*n-3)-\gamma)$-th column and in the ma-th row to the ma'-th row of a $((2*n-2)-\gamma)$-th column of the display screen to display the ninth display line segment, and controlling display pixels located in an me-th row to an me'-th row of a $((2*n+1)+\gamma)$-th column and in the me-th row to the me'-th row of a $((2*n+2)+\gamma)$-th column of the display screen to display the tenth display line segment, ma, ma', me, and me' are positive integers, and $1 \leq ma \leq ma' < mb \leq mb' < mc \leq mc' < md \leq md' < me \leq me' \leq 2M$.

For example, in the alignment deviation detection method of the display panel provided by at least one embodiment of the present disclosure, $\gamma=0$, according to the display situation of the second alignment pattern, determining the alignment state between the display screen and the dimming screen, comprises: in a case where a brightness value of the seventh display line segment is greater than a brightness value of the sixth display line segment, a brightness value of the eighth display line segment, a brightness value of the ninth display line segment, and a brightness value of the tenth display line segment, and the brightness value of the sixth display line segment is equal to the brightness value of the eighth display line segment, and the brightness value of the ninth display line segment is equal to the brightness value of the tenth display line segment, and the brightness value of the sixth display line segment is greater than the brightness value of the ninth display line segment, determining that the display screen and the dimming screen are in the fourth alignment state; in a case where the brightness value of the eighth display line segment is greater than the brightness value of the sixth display line segment, the brightness value of the seventh display line segment, the brightness value of the ninth display line segment, and the brightness value of the tenth display line segment, and the brightness value of the seventh display line segment is equal to the brightness value of the tenth display line segment, and the brightness value of the sixth display line segment is smaller than the brightness value of the seventh display line segment and is equal to the brightness value of the ninth display line segment, determining that the display screen and the dimming screen are in the fifth alignment state; or, in a case where the brightness value of the sixth display line segment is greater than the brightness value of the seventh display line segment, the brightness value of the eighth display line segment, the brightness value of the ninth display line segment, and the brightness value of the tenth display line segment, and the brightness value of the seventh display line segment is equal to the brightness value of the ninth display line segment, and the brightness value of the eighth display line segment is smaller than the brightness value of the seventh display line segment and is equal to the brightness value of the tenth display line segment, determining that the display screen and the dimming screen are in the sixth alignment state.

At least one embodiment of the present disclosure further provides a data compensation method of a display panel, the display panel comprises a dimming screen and a display screen, the dimming screen is on a backlight side of the display screen and is configured to perform backlight modulation on the display screen, and the method comprises: determining an alignment state between the display screen and the dimming screen by using the alignment deviation detection method of the display panel provided by any one of the above-mentioned embodiments; acquiring an image signal of an input image to be displayed; according to the alignment state, determining, based on the image signal, dimming pixel data of a dimming picture to be displayed on the dimming screen; according to the alignment state, determining, based on the image signal and the dimming pixel data, display pixel data of a display picture to be displayed on the display screen.

In the data compensation method of the display panel provided by at least one embodiment of the present disclosure, the dimming screen comprises a plurality of dimming pixels, and the display screen comprises a plurality of display pixels, according to the alignment state, determining, based on the image signal, the dimming pixel data of the dimming picture to be displayed on the dimming screen, comprises: according to a pixel corresponding relationship between the image signal and the display screen, determining initial pixel data corresponding to each display pixel of the display screen in the image signal; according to the alignment state, determining a pixel corresponding relationship between the display screen and the dimming screen in physical position; according to the pixel corresponding relationship between the display screen and the dimming screen in physical position, determining one or more display pixels of the display screen corresponding to, in physical position, a dimming pixel of the dimming screen; and based on initial pixel data corresponding to each of the one or more display pixels, determining dimming pixel data of the dimming pixel of the dimming screen corresponding to the one or more display pixels in physical position.

In the data compensation method of the display panel provided by at least one embodiment of the present disclosure, based on the initial pixel data corresponding to each of the one or more display pixels, determining the dimming pixel data of the dimming pixel of the dimming screen corresponding to the one or more display pixels in physical position, comprises: in a case where in the alignment state, one dimming pixel of the dimming screen corresponds to one display pixel of the display screen in physical position, taking initial pixel data corresponding to the one display pixel as dimming pixel data of the one dimming pixel of the dimming screen corresponding to the one display pixel in physical position; and in a case where in the alignment state, one dimming pixel of the dimming screen corresponds to a plurality of display pixels of the display screen in physical position, selecting a maximum value in initial pixel data corresponding to each of the plurality of display pixels as dimming pixel data of the one dimming pixel of the dimming screen corresponding to the plurality of display pixels in physical position.

In the data compensation method of the display panel provided by at least one embodiment of the present disclosure, according to the alignment state, determining, based on the image signal and the dimming pixel data, the display pixel data of the display picture to be displayed on the display screen, comprises: in a case where in the alignment state, there is no dimming pixel of the dimming screen corresponding to one or more display pixels of the display screen in physical position, taking initial pixel data corresponding to each of the one or more display pixels as display pixel data of the one or more display pixels of the display screen; and in a case where in the alignment state, there is a dimming pixel of the dimming screen corresponding to one or more display pixels of the display screen in physical position, determining display pixel data of the one or more display pixels of the display screen based on initial pixel data corresponding to each of the one or more display pixels and dimming pixel data of the dimming pixel of the dimming screen corresponding to the one or more display pixels in physical position.

In the data compensation method of the display panel provided by at least one embodiment of the present disclosure, determining the display pixel data of the one or more display pixels of the display screen based on the initial pixel data corresponding to each of the one or more display pixels and the dimming pixel data of the dimming pixel of the dimming screen corresponding to the one or more display pixels in physical position, comprises: determining the display pixel data of the one or more display pixels of the display screen according to a calculation formula as follows, the calculation formula is expressed as:

$$\text{Main} = h(f(In) * g(\text{Sub}))$$

where Main represents the display pixel data of the one or more display pixels of the display screen, Sub represents the dimming pixel data of the dimming pixel of the dimming screen corresponding to the one or more display pixels of the display screen in physical position, In represents initial pixel data corresponding to the one or more display pixels of the display screen, and $h(x)=x^{1/2.02}$, $f(x)=x^{2.2}$, and $g(x)=x^{-1}$.

At least one embodiment of the present disclosure also provides an alignment deviation detection device, comprising: a processor and a memory storing computer executable instructions. When the computer executable instructions are executed by the processor, causing the processor to perform the alignment deviation detection method of the display panel provided by any one of the above-mentioned embodiments.

At least one embodiment of the present disclosure also provides a data compensation apparatus, comprising: a processor and a memory storing computer executable instructions. When the computer executable instructions are executed by the processor, causing the processor to perform the data compensation method of the display panel provided by any one of the above-mentioned embodiments.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
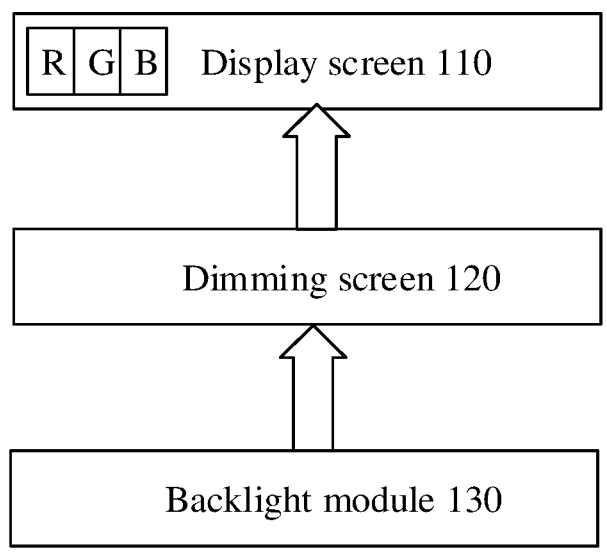
FIG. 1 is a schematic structural diagram of a display panel provided by an embodiment of the present disclosure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical terms and scientific terms used herein have the same meanings as commonly understood by one of ordinary skill in the art to which the present disclosure belongs. The terms "first," "second," etc., which are used in the present disclosure, are not intended to indicate any sequence, amount, or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The embodiments of the present disclosure will be described in detail below with reference to the accompanying drawings, but the present disclosure is not limited to these specific embodiments. In addition, it should be noted that, in order to keep the following description of the embodiments of the present disclosure clear and concise, the present disclosure omits detailed descriptions of some known functions and known components.

At least one embodiment of the present disclosure provides an alignment deviation detection method of a display panel, the display panel comprises a dimming screen and a display screen, and the dimming screen is provided on a backlight side of the display screen and is configured to perform backlight modulation on the display screen. The method comprises: providing a first data signal for causing the dimming screen to display an alignment dimming picture including a first alignment pattern; providing a second data signal for causing the display screen to display an alignment display picture including a second alignment pattern; under a control of the first data signal, making the dimming screen display the alignment dimming picture, and under a control of the second data signal, making the display screen display the alignment display picture; according to a display situation of the second alignment pattern in the alignment display picture, determining an alignment state between the display screen and the dimming screen. An orthographic projection of the second alignment pattern on the dimming screen is preset to be at least partially aligned with the first alignment pattern and at least partially deviated from the first alignment pattern.

According to the alignment deviation detection method of the display panel provided by the embodiment of the present disclosure, the alignment dimming picture including the first alignment pattern and the alignment display picture including the second alignment pattern can be displayed on the dimming screen and the display screen, respectively, and then according to the display situation of the second alignment pattern in the alignment display picture, the alignment state between the display screen and the dimming screen is determined. Because the dimming screen can perform backlight modulation on the display screen, the display situation of the second alignment pattern in the alignment display picture is affected by the first alignment pattern in the alignment dimming picture, that is, the display situation is related to the alignment deviation between the dimming screen and the display screen, so that the alignment state between the dimming screen and the display screen can be determined according to the display situation of the second alignment pattern in the alignment display picture.

First, a display panel provided by at least one embodiment of the present disclosure will be described.

FIG. 1 is a schematic structural diagram of a display panel provided by at least one embodiment of the present disclosure.

As shown in FIG. 1, the display panel 10 includes a display screen 110, a dimming screen 120, and a backlight module 130. The dimming screen 120 is disposed between the backlight module 130 and the display screen 110. The backlight module 130 is disposed on a backlight side of the dimming screen 120 (that is, a side of the dimming screen 120 away from the display screen 110), and is configured to provide backlight to the dimming screen 120. The display screen 110 and the dimming screen 120 are laminated, the dimming screen 120 is disposed on the backlight side of the display screen 110 (that is, the side of the display screen 110 close to the backlight module 130) and is configured to perform backlight modulation on the display screen 110, and the display screen 110 is configured to display an image. For example, a display region (an active region) of the display screen 110 and a dimming region (an active region) of the dimming screen 120 overlap with each other. For example, the display region and the dimming region have the same size in both a length direction and a width direction.

For example, in each embodiment of the present disclosure, the display panel 10 is a liquid crystal display panel, and the display screen 110 and the dimming screen 120 are also liquid crystal screens. The embodiments of the present disclosure have no restrictions on the type, structure, and the like of the liquid crystal screen used to implement the display screen 110 or the dimming screen 120. For example, the liquid crystal screen may be a vertical electric field type or a horizontal electric field type, for example, when the liquid crystal screen is a horizontal electric field type, the liquid crystal screen can be an in-plane switching (IPS) type, a fringe field switching (FFS) type, an advanced multi-dimensional switching (ADS) type, etc.

Similarly, the various embodiments of the present disclosure have no restrictions on the type, structure, and the like of the backlight module 130, for example, the backlight module 130 may be a side-incident type or a direct type, etc., and a light emitting source used in the backlight module 130 may be a cold cathode fluorescence or a light emitting diode (LED), etc.

Figure 2:
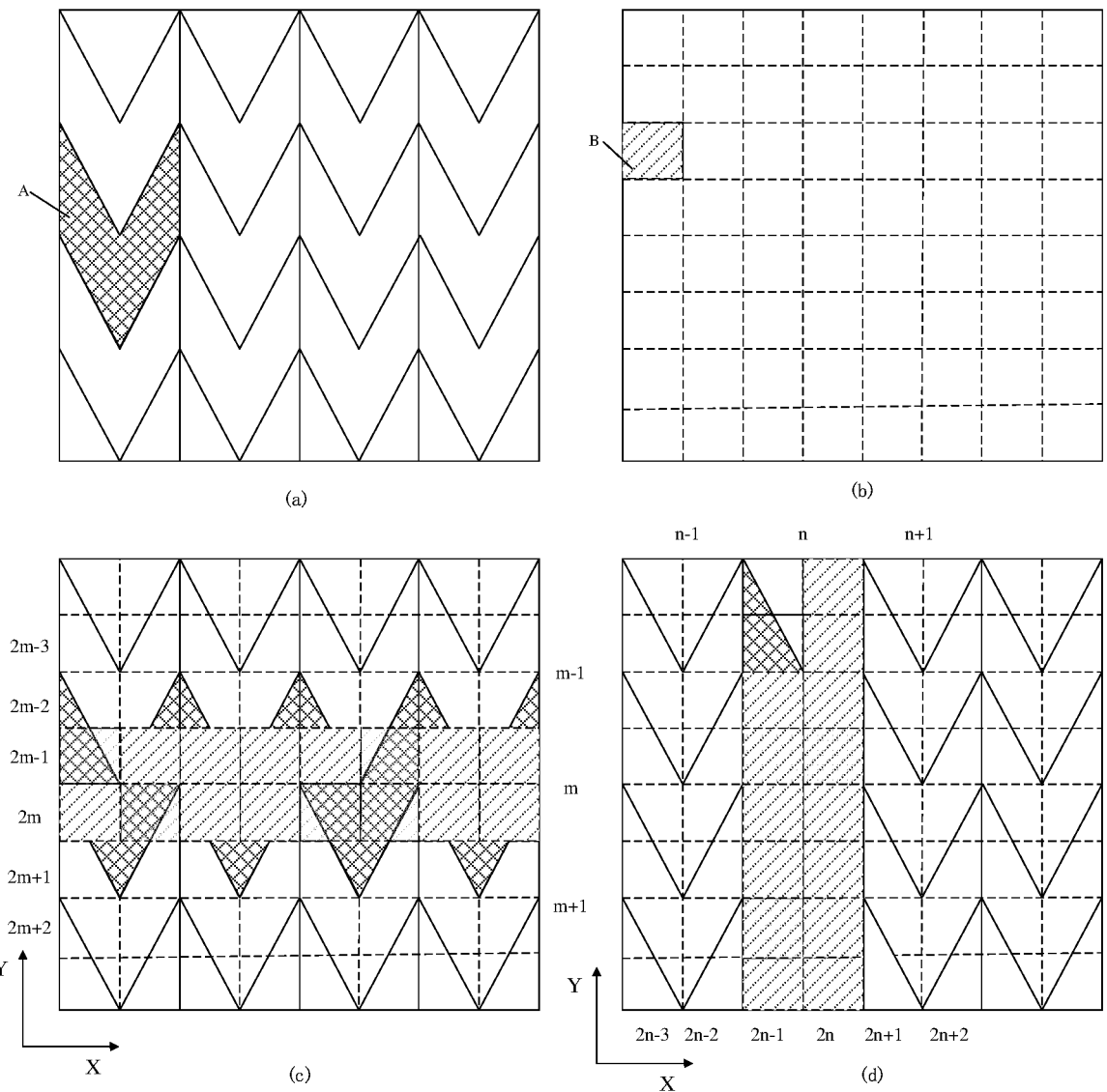
FIG. 2 is a schematic diagram of pixel distribution of a display screen and a dimming screen in the display panel shown in FIG. 1.

FIG. 2 is a schematic diagram of pixel distribution (pixel array) of a display screen and a dimming screen in the display panel shown in FIG. 1.

As shown in FIG. 2(a), the dimming region of the dimming screen 120 may include a plurality of dimming pixels A, the plurality of dimming pixels A may be arranged in M rows and N columns, where M and N are positive integers, 3≤M and 3≤N. For the sake of simplicity, gate lines and data lines for the dimming pixels A and pixel electrodes included in the dimming pixels A are omitted in the figure. These gate lines and data lines cross each other to define a plurality of pixel regions for the various dimming pixels A, and the shapes of these gate lines and/or data lines define the shapes of these pixel regions, and in each dimming pixel A, the shape of the pixel electrode may have substantially the same shape as the pixel region. For example, as shown in FIG. 2(a), the shape of each dimming pixel A of the dimming screen 120 may be a "V" shape; corresponding to the "V" shape, the gate line for the dimming pixels A is in a zigzag shape and the data line for the dimming pixels A is in a straight shape. For example, in some embodiments, the dimming screen 120 is a Full High-Definition (FHD) liquid crystal screen with a 2K resolution, and the dimming screen 120 may include 1080*1920 dimming pixels, in this case, M=1080 and N=1920.

As shown in FIG. 2(b), the display region of the display screen 110 may include a plurality of display pixels B, the plurality of display pixels B may be arranged in αM rows and αN columns, and α is a positive integer. For the sake of simplicity, gate lines and data lines for the plurality of display pixels B and pixel electrodes included in the display pixels B are omitted in the figure. These gate lines and data lines cross each other to define a plurality of pixel regions for the display pixels B, and the shapes of these gate lines and/or data lines define the shapes of these pixel regions, and in each display pixel B, the shape of the pixel electrode may have substantially the same shape as the pixel region. For example, as shown in FIG. 2(b), the shape of each display pixel B of the display screen 110 may be a rectangle (e.g., a square); corresponding to the rectangle, the gate line for the display pixels B is in a straight shape and the data line for the display pixels B is also in a straight shape. For example, in some embodiments, the display screen 110 is an Ultra High-Definition (UHD) liquid crystal screen with a 4K resolution, and the display screen 110 may include 2160*3840 display pixels, in this case, M=1080, N=1920, and α=2.

In some embodiments, as shown in FIG. 2(c), when α=2, one row of dimming pixels of the dimming screen 120 may correspond to two rows of display pixels of the display screen 110. For example, as shown in FIG. 2(c), the dimming pixels in an m-th row of the dimming screen 120 may correspond to the display pixels in a (2m−1)-th row and the display pixels in a 2m-th row of the display screen 110, 1≤m≤M.

As shown in FIG. 2(d), when α=2, one column of dimming pixels of the dimming screen 120 may correspond to two columns of display pixels of the display screen 110. For example, as shown in FIG. 2(d), the dimming pixels in an n-th column of the dimming screen 120 may correspond to the display pixels in a (2n−1)-th column and the display pixels in a 2n-th column of the display screen 110, 1≤n≤N. That is to say, one dimming pixel located in the m-th row and the n-th column of the dimming screen 120 may correspond to four display pixels of the display screen 110, and the four display pixels are located in the (2m−1)-th row and the (2n−1)-th column, the (2m−1)-th row and the 2n-th column, the 2m-th row and the (2n−1)-th column, and the 2m-th row and the 2n-the column, respectively.

It should be noted that in FIG. 2(c), because the shape of the dimming pixel of the dimming screen 120 is a "V" shape and the shape of the display pixel of the display screen 110 is a square, in physical position, one row of dimming pixels of the dimming screen 120 actually spans four rows of display pixels of the display screen 110 in the column direction (as shown in the direction Y in FIG. 2(c)) of the dimming pixels of the dimming screen 120. That is to say, an orthographic projection of one row of dimming pixels of the dimming screen 120 on the display screen 110 partially overlaps with the corresponding four rows of display pixels on the display screen 110.

For example, as shown in FIG. 2(c), the dimming pixels in the m-th row of the dimming screen 120 may span the display pixels in the (2m−2)-th row to (2m+1)-th row of the display screen 110, that is, the orthographic projection of the dimming pixels in the m-th row of the dimming screen 120 on the display screen 110 partially overlaps with the display pixels in the (2m−2)-th row to (2m+1)-th row of the display screen 110, however, it is stipulated here that the dimming pixels in the m-th row of the dimming screen 120 correspond to the display pixels in the (2m−1)-th row and the display pixels in the 2m-th row of the display screen 110.

In addition, it should be noted that although it is shown in FIG. 2(a) that the shape of the dimming pixel in the dimming screen is a "V" shape, the embodiments of the present disclosure are obviously not limited to this, and the shape of the dimming pixel in the dimming screen may be other suitable shape besides the "V" shape. Similarly, although FIG. 2(b) shows that the shape of the display pixel in the display screen is a square, the embodiments of the present disclosure are obviously not limited to this, and the shape of the display pixel in the display screen may be other suitable shape besides square, for example, hexagon, etc. The shape of the dimming pixel is a "V" shape, and the shape of the display pixel is a square, which can avoid rainbow pattern caused by superposition of two screens.

In addition, it should be noted that although FIG. 2(c) and FIG. 2(d) only show the corresponding situation between the dimming pixels of the dimming screen and the display pixels of the display screen when α=2, the situation where a takes other values is similar. For example, when α=1, one row of dimming pixels of the dimming screen may correspond to one row of display pixels of the display screen, and one column of dimming pixels of the dimming screen may correspond to one column of display pixels of the display screen. For example, when α=4, one row of dimming pixels of the dimming screen may correspond to four rows of display pixels of the display screen, and one column of dimming pixels of the dimming screen may correspond to four columns of display pixels of the display screen. The embodiments of the present disclosure do not limit the specific corresponding relationship between the display pixels and the dimming pixels, but for the sake of simplicity, the embodiments of the present disclosure will be described below by taking α=2 as an example, and for the case where a takes other values, reference can be made to the description of the embodiments of the present disclosure when α=2.

For example, in the display panel provided by at least one embodiment of the present disclosure, the alignment state between the display screen and the dimming screen may include a first alignment state, a second alignment state, a third alignment state, a fourth alignment state, a fifth alignment state, and a sixth alignment state. The first alignment state indicates that an alignment between the display screen and the dimming screen has no deviation in a first alignment direction; the second alignment state indicates that the display screen is offset upward by one row of display pixels relative to the dimming screen in the first alignment direction; the third alignment state indicates that the display screen is offset downward by one row of display pixels relative to the dimming screen in the first alignment direction; the fourth alignment state indicates that the alignment between the display screen and the dimming screen in a second alignment direction has no deviation; the fifth alignment state indicates that the display screen is offset to the left by one column of display pixels relative to the dimming screen in the second alignment direction; the sixth alignment state indicates that the display screen is offset to the right by one column of display pixels relative to the dimming screen in the second alignment direction. The second alignment state and the third alignment state are two opposite deviation states in the first alignment direction, and the fifth alignment state and the sixth alignment state are two opposite deviation states in the second alignment direction, and the first alignment direction and the second alignment direction are perpendicular to each other on a plane parallel to the dimming screen. For example, the first alignment direction is the column direction of the plurality of dimming pixels of the dimming screen, and the second alignment direction is the row direction of the plurality of dimming pixels of the dimming screen.

Figure 3A:
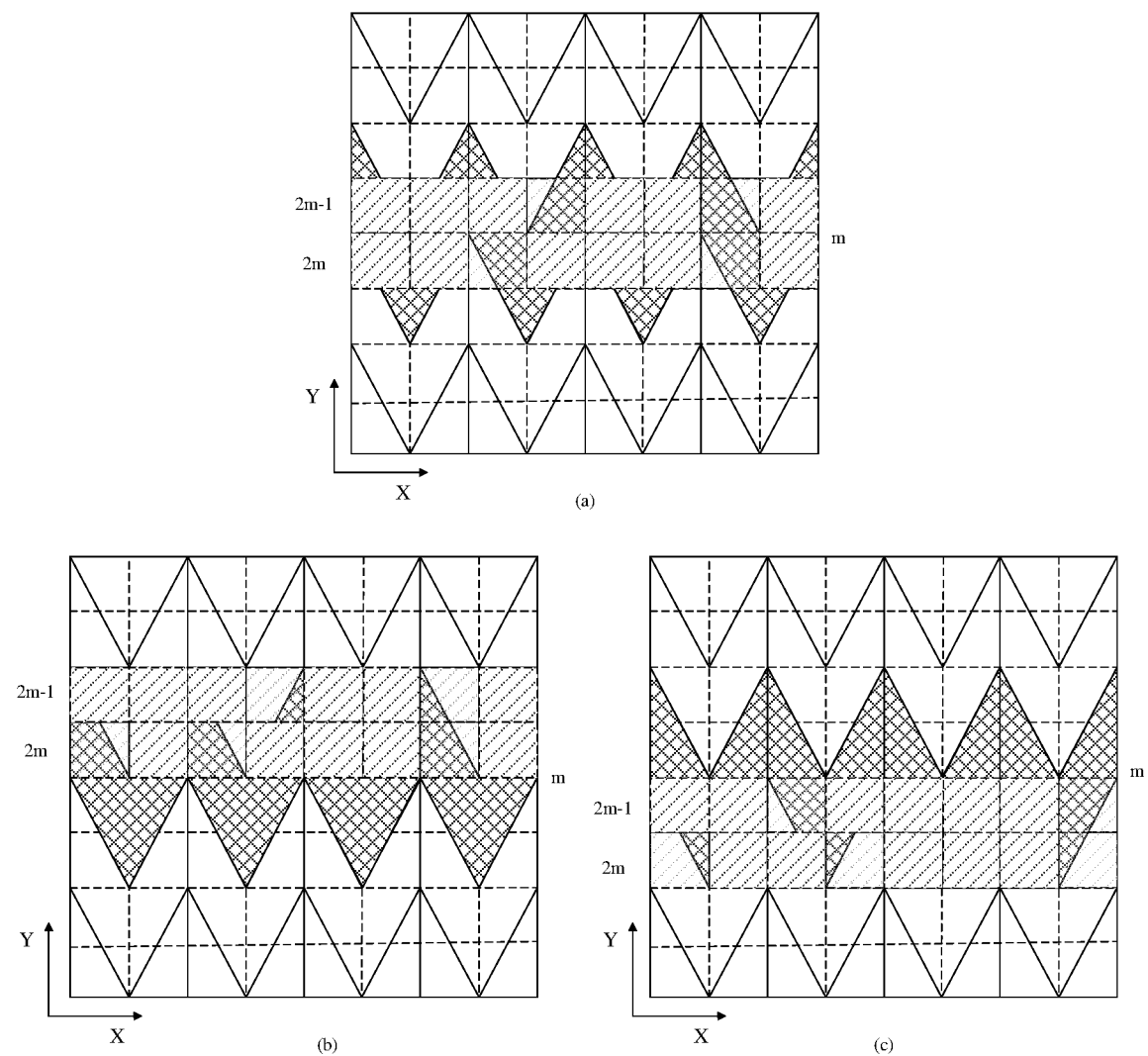
FIG. 3A is a schematic diagram of an alignment state between the display screen and the dimming screen in the display panel shown in FIG. 1.

FIG. 3A is a schematic diagram of an alignment state between the display screen and the dimming screen in the display panel shown in FIG. 1.

As shown in FIG. 3A(a), the display screen 110 and the dimming screen 120 are in the first alignment state, that is, there is no alignment deviation between the display screen 110 and the dimming screen 120 in the column direction Y of the dimming pixels of the dimming screen 120. In this case, as shown in FIG. 3A(a), in the column direction Y of the dimming pixels of the dimming screen 120, the orthographic projections of the display pixels in the (2m−1)-th row and the display pixels in the 2m-th row of the display screen 110 on the dimming screen 120 are aligned with the dimming pixels in the m-th row of the dimming screen 120, that is, the orthographic projections of the display pixels in the (2m−1)-th row and the display pixels in the 2m-th row of the display screen 110 on the dimming screen 120 are within the middle region of the dimming pixels in the m-th row of the dimming screen 120, in this case, the area of the overlapping region between the orthographic projections of the display pixels in the (2m−1)-th row of the display screen 110 on the dimming screen 120 and the dimming pixels in the m-th row of the dimming screen 120 is equal to the area of the overlapping region between the orthographic projections of the display pixels in the 2m-th row of the display screen 110 on the dimming screen 120 and the dimming pixels in the m-th row of the dimming screen 120.

As shown in FIG. 3A(b), the display screen 110 and the dimming screen 120 are in the second alignment state, that is, in the column direction Y of the dimming pixels of the dimming screen 120, the display screen 110 is offset upward by one row of display pixels relative to the dimming screen 120. In this case, as shown in FIG. 3A(b), in the column direction Y of the dimming pixels of the dimming screen 120, the orthographic projections of the display pixels in the (2m−1)-th row and the display pixels in the 2m-th row of the display screen 110 on the dimming screen 120 are offset upward by one row of display pixels relative to the dimming pixels in the m-th row of the dimming screen 120, that is, the orthographic projections of the display pixels in the (2m−1)-th row and the display pixels in the 2m-th row of the display screen 110 on the dimming screen 120 are falls in the region that is offset upward by one row of display pixels relative to the middle of the dimming pixels in the m-th row of the dimming screen 120, in this case, the area of the overlapping region between the orthographic projections of the display pixels in the (2m−1)-th row of the display screen 110 on the dimming screen 120 and the dimming pixels in the m-th row of the dimming screen 120 is smaller than the area of the overlapping region between the orthographic projections of the display pixels in the 2m-th row of the display screen 110 on the dimming screen 120 and the dimming pixels in the m-th row of the dimming screen 120. Actually, when the display screen 110 is offset upward by one row of display pixels relative to the dimming screen 120 in the column direction Y of the dimming pixels of the dimming screen 120, the orthographic projections of the display pixels in the 2m-th row and the display pixels in the (2m+1)-th row of the display screen 110 are aligned with the dimming pixels in the m-th row of the dimming screen 120, that is, the orthographic projections of the display pixels in the 2m-th row and the display pixels in the (2m+1)-th row of the display screen 110 on the dimming screen 120 are within the middle region of the dimming pixels in the m-th row of the dimming screen 120. In this case, in physical positions, the dimming pixels in the m-th row of the dimming screen 120 correspond to the display pixels in the 2m-th row and the display pixels in the (2m+1)-th row of the display screen 110.

As shown in FIG. 3A(c), the display screen 110 and the dimming screen 120 are in the third alignment state, that is, in the column direction Y of the dimming pixels of the dimming screen 120, the display screen 110 is offset downward by one row of display pixels relative to the dimming screen 120. In this case, as shown in FIG. 3A(c), in the column direction Y of the dimming pixels of the dimming screen 120, the orthographic projections of the display pixels in the (2m−1)-th row and the display pixels in the 2m-th row of the display screen 110 on the dimming screen 120 are offset downward by one row of display pixels relative to the dimming pixels in the m-th row of the dimming screen 120, that is, the orthographic projections of the display pixels in the (2m−1)-th row and the display pixels in the 2m-th row of the display screen 110 on the dimming screen 120 falls in the region that is offset downward by one row of display pixels relative to the middle of the dimming pixels in the m-th row of the dimming screen 120, in this case, the area of the overlapping region between the orthographic projections of the display pixels in the (2m−1)-th row of the display screen 110 on the dimming screen 120 and the dimming pixels in the m-th row of the dimming screen 120 is greater than the area of the overlapping region between the orthographic projections of the display pixels in the 2m-th row of the display screen 110 on the dimming screen 120 and the dimming pixels in the m-th row of the dimming screen 120. Actually, when the display screen 110 is offset downward by one row of display pixels relative to the dimming screen 120 in the column direction Y of the dimming pixels of the dimming screen 120, the orthographic projections of the display pixels in the (2m−2)-th row and the display pixels in the (2m−1)-th row of the display screen 110 on the dimming screen 120 are aligned with the dimming pixels in the m-th row of the dimming screen 120, that is, the orthographic projections of the display pixels in the (2m−2)-th row and the display pixels in the (2m−1)-th row of the display screen 110 on the dimming screen 120 are within the middle region of the dimming pixels in the m-th row of the dimming screen 120. In this case, in physical position, the dimming pixels in the m-th row of the dimming screen 120 correspond to the display pixels in the (2m−2)-th row and the display pixels in the (2m−1)-th row of the display screen 110.

Figure 3B:
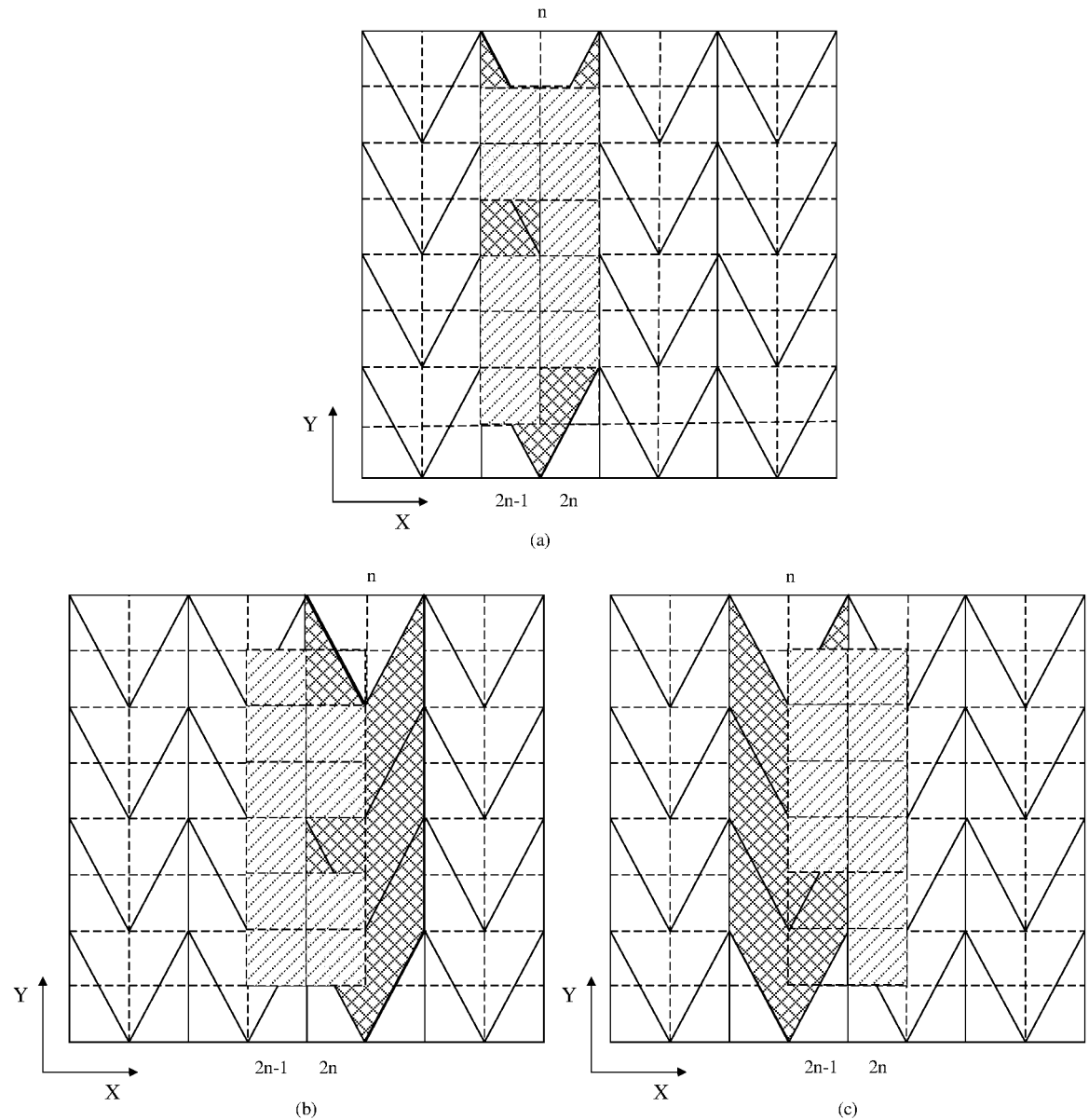
FIG. 3B is another schematic diagram of an alignment state between the display screen and the dimming screen in the display panel shown in FIG. 1.

FIG. 3B is another schematic diagram of an alignment state between the display screen and the dimming screen in the display panel shown in FIG. 1.

As shown in FIG. 3B(a), the display screen 110 and the dimming screen 120 are in the fourth alignment state, that is, in the row direction X of the dimming pixels of the dimming screen 120, the alignment between the display screen 110 and the dimming screen 120 has no deviation. In this case, as shown in FIG. 3B(a), in the row direction X of the dimming pixels of the dimming screen 120, the orthographic projections of the display pixels in the (2n−1)-th column and the display pixels in the 2n-th column of the display screen 110 on the dimming screen 120 are aligned with the dimming pixels in the n-th column of the dimming screen 120, that is, the orthographic projections of the display pixels in the (2n−1)-th column and the display pixels in the 2n-th column of the display screen 110 on the dimming screen 120 coincide with the dimming pixels in the n-th column of the dimming screen 120. In this case, the orthographic projections of the display pixels in the (2n−1)-th column and the orthographic projections of the display pixels in the 2n-th column of the display screen 110 on the dimming screen 120 are symmetrical with respect to the symmetry axis of the dimming pixels in the n-th column of the dimming screen 120. The area of the overlapping region between the orthographic projections of the display pixels in the (2n−1)-th column of the display screen 110 on the dimming screen 120 and the dimming pixels in the n-th column of the dimming screen 120 is equal to the area of the overlapping region between the orthographic projections of the display pixels in the 2n-th column of the display screen 110 on the dimming screen 120 and the dimming pixels in the n-th column of the dimming screen 120.

As shown in FIG. 3B(b), the display screen 110 and the dimming screen 120 are in the fifth alignment state, that is, in the row direction X of the dimming pixels of the dimming screen 120, the display screen 110 is offset to the left by one column of display pixels relative to the dimming screen 120. In this case, as shown in FIG. 3B(b), in the row direction X of the dimming pixels of the dimming screen 120, the orthographic projections of the display pixels in the (2n−1)-th column to the 2n-th column of the display screen 110 on the dimming screen 120 are offset to the left by one column of the display pixels relative to the dimming pixels in the n-th column of the dimming screen 120, that is, the orthographic projections of the display pixels in the (2n−1)-th column to the 2n-th column of the display screen 110 on the dimming screen 120 falls in the region that is offset to the left by one column of display pixels relative to the middle of the dimming pixels in the n-th column of the dimming screen 120. In this case, the orthographic projections of the display pixels in the (2n−1)-th column of the display screen on the dimming screen 120 does not overlap with the dimming pixels in the n-th column of the dimming screen 120. Actually, when the display screen 110 is offset to the left by one column of display pixels relative to the dimming screen 120 in the row direction X of the dimming pixels of the dimming screen 120, the orthographic projections of the display pixels in the 2n-th column and the display pixels in the (2n+1)-th column on the dimming screen 120 are aligned with the dimming pixels in the n-th column of the dimming screen 120, that is, the orthographic projections of the display pixels in the 2n-th column and the display pixels in the (2n+1)-th column of the display screen 110 on the dimming screen 120 coincide with the dimming pixels in the n-th column of the dimming screen 120. In this case, in physical position, the dimming pixels in the n-th column of the dimming screen 120 correspond to the display pixels in the 2n-th column and the display pixels in the (2n+1)-th column of the display screen 110.

As shown in FIG. 3B(c), the display screen 110 and the dimming screen 120 are in the sixth alignment state, that is, in the row direction X of the dimming pixels of the dimming screen 120, the display screen 110 is offset to the right by one column of display pixels relative to the dimming screen 120. In this case, as shown in FIG. 3B(c), in the row direction X of the dimming pixels of the dimming screen 120, the orthographic projections of the display pixels in the (2n−1)-th column to the 2n-th column of the display screen 110 on the dimming screen 120 are offset to the right by one column of display pixels relative to the dimming pixels in the n-th column of the dimming screen 120, that is, the orthographic projections of the display pixels in the (2n−1)-th column to the 2n-th column of the display screen 110 on the dimming screen 120 falls in the region that is offset to the right by one row of display pixels relative to the middle of the dimming pixels in the n-th column of the dimming screen 120. In this case, the orthographic projections of the display pixels in the 2n-th column of the display screen on the dimming screen 120 does not overlap with the dimming pixels in the n-th column of the dimming screen 120. Actually, when the display screen 110 is offset to the right by one column of display pixels relative to the dimming screen 120 in the row direction X of the dimming pixels of the dimming screen 120, the orthographic projections of the display pixels in the (2n−2)-th column and the display pixels in the (2n−1)-th column of the display screen 110 on the dimming screen 120 are aligned with the dimming pixels in the n-th column of the dimming screen 120, that is, the orthographic projections of the display pixels in the (2n−2)-th column and the display pixels in the (2n−1)-th column of the display screen 110 on the dimming screen 120 coincide with the dimming pixels in the n-th column of the dimming screen 120. In this case, in physical position, the dimming pixels in the n-th column of the dimming screen 120 correspond to the display pixels in the (2n−2)-th column and the display pixels in the (2n−1)-th column of the display screen 110.

It should be noted that although as shown in FIG. 3A and FIG. 3B, the alignment deviation between the display screen and the dimming screen is one row of display pixels in the column direction of the dimming pixels of the dimming screen, and the alignment deviation between the display screen and the dimming screen is one column of display pixels in the row direction of the dimming pixels of the dimming screen, the embodiments of the present disclosure are obviously not limited to this case. For example, in the column direction of the dimming pixels of the dimming screen, the display screen may be offset by half row of display pixels relative to the dimming screen, or the display screen may be offset by a plurality of rows of display pixels relative to the dimming screen. In the row direction of the dimming pixels of the dimming screen, the display screen may be offset by half column of display pixels relative to the dimming screen, or the display screen may be offset by a plurality of columns of display pixels relative to the dimming screen.

In actual operation, for example, in a case where the alignment deviation between the display screen and the dimming screen in the display panel is within the range of one row and/or one column of display pixels, the display panel can be considered as a non-defective product that is allowed to leave the factory; while in a case where the alignment deviation between the display screen and the dimming screen in the display panel exceeds the range of one row and/or one column of display pixels, the display panel can be considered as a defective product which is not allowed to leave the factory. Therefore, the embodiment of the present disclosure only describe the case where the alignment deviation between the display screen and the dimming screen in the display panel is within the range of one row and/or one column of display pixels.

Figure 4:
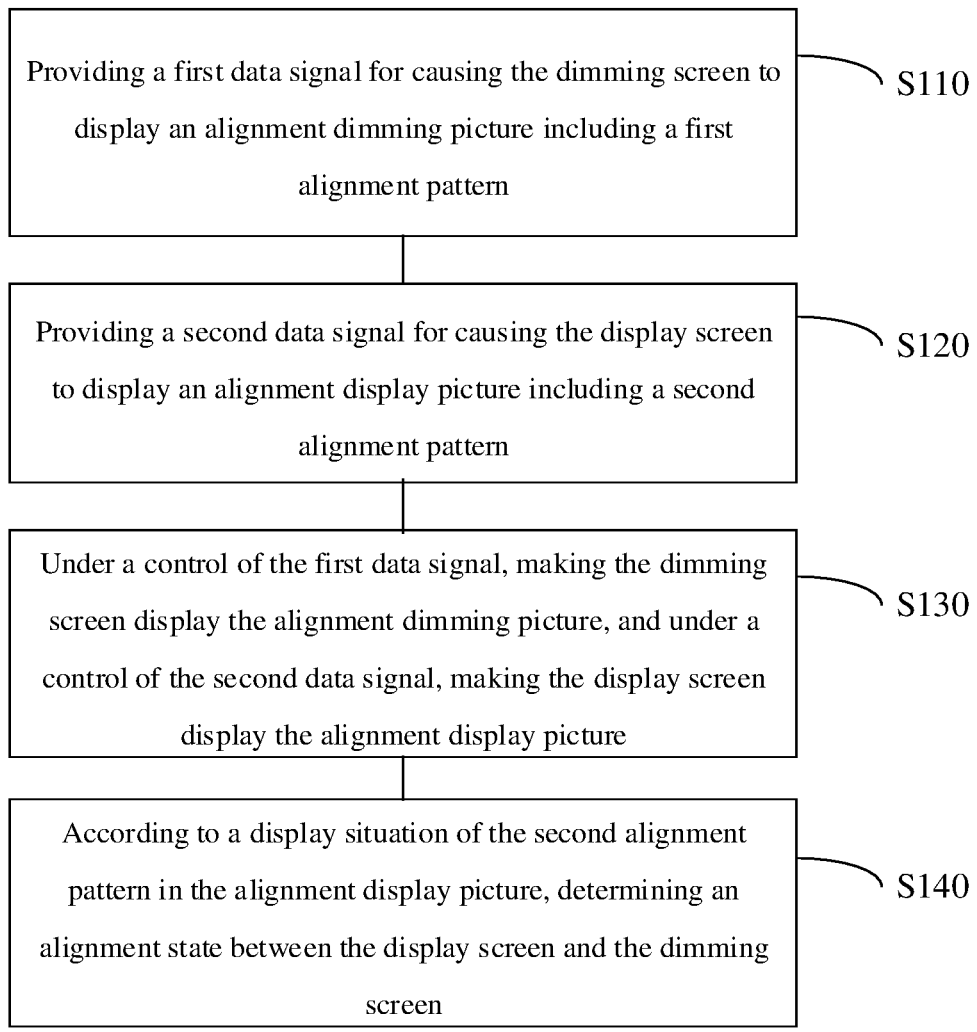
FIG. 4 is a flowchart of an alignment deviation detection method of a display panel provided by an embodiment of the present disclosure.

FIG. 4 is a flowchart of an alignment deviation detection method of a display panel provided by an embodiment of the present disclosure. For example, the alignment deviation detection method can detect the alignment deviation of the display panel described in the above embodiment.

As shown in FIG. 4, the alignment deviation detection method for the display panel may include the following steps:

S110: providing a first data signal for causing the dimming screen to display an alignment dimming picture including a first alignment pattern.

S120: providing a second data signal for causing the display screen to display an alignment display picture including a second alignment pattern.

S130: under a control of the first data signal, making the dimming screen display the alignment dimming picture, and under a control of the second data signal, making the display screen display the alignment display picture.

S140: according to a display situation of the second alignment pattern in the alignment display picture, determining an alignment state between the display screen and the dimming screen.

For example, an orthographic projection of the second alignment pattern on the dimming screen is preset to be at least partially aligned with the first alignment pattern and at least partially deviated from the first alignment pattern.

Figure 5A:
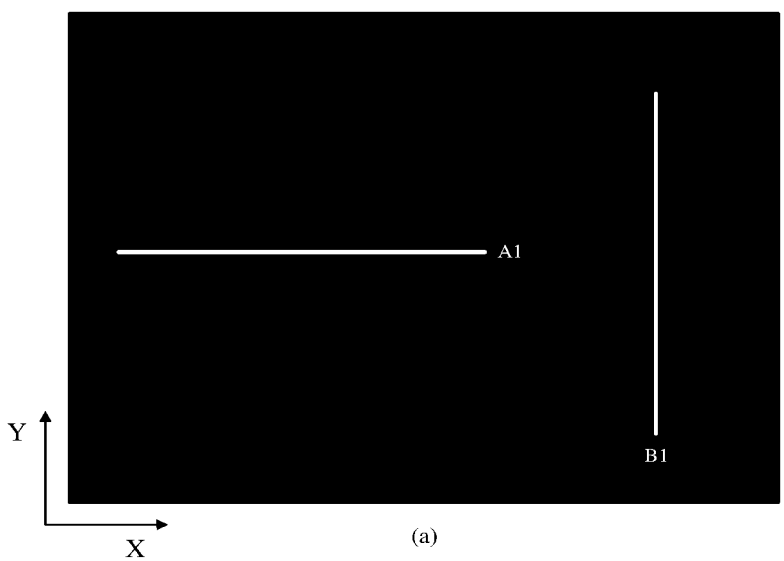
FIG. 5A is a macroscopic schematic diagram of an alignment dimming picture displayed on a dimming screen and an alignment display picture displayed on the display screen provided by an embodiment of the present disclosure.
Figure 5A:
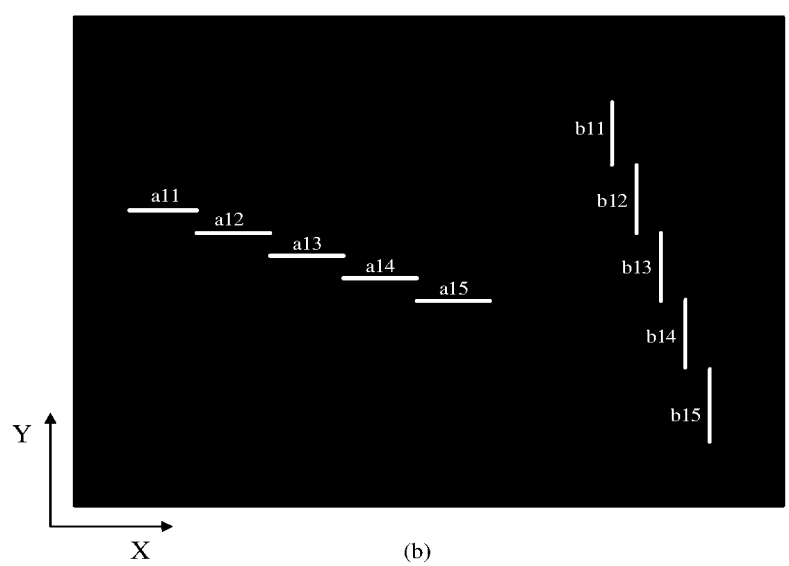
Figure 5A:
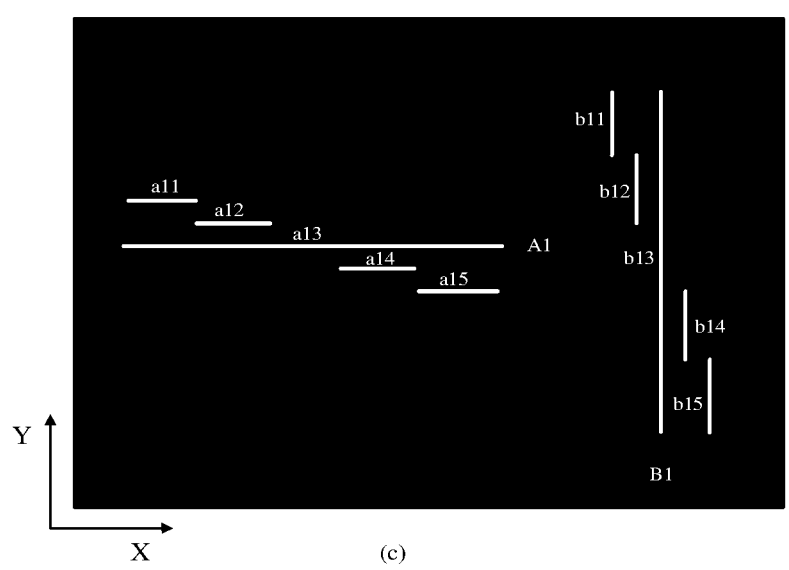

FIG. 5A is a macroscopic schematic diagram of the alignment dimming picture displayed on the dimming screen and the alignment display picture displayed on the display screen provided by the embodiment of the present disclosure.

Under the control of the first data signal, the alignment dimming picture displayed on the dimming screen 120 is shown in FIG. 5A(a). As shown by the white lines in FIG. 5A(a), the first alignment pattern in the alignment dimming picture may include a plurality of continuous straight line segments extending in the X direction or in the Y direction perpendicular to the X direction.

For example, the first alignment pattern in the alignment dimming picture shown in FIG. 5A(a) includes a white straight line segment A1 extending along the X direction and a white straight line segment B1 extending along the Y direction. Under the control of the second data signal, the alignment display picture displayed on the display screen 110 is shown in FIG. 5A(b). As shown by white lines in FIG. 5A(b), the second alignment pattern in the alignment display picture may include a plurality of discrete straight line segments. For example, the second alignment pattern in the alignment display picture shown in FIG. 5A(b) includes five white straight line segments a11, a12, a13, a14, and a15 extending along the X direction, and five white straight line segments b11, b12, b13, b14, and b15 extending along the Y direction.

In addition, as shown in FIG. 5A(c), orthographic projections of some straight line segments included in the second alignment pattern in the alignment dimming picture on the dimming screen 120 are aligned with some straight line segments included in the first alignment pattern in the alignment display picture, while orthographic projections of other straight line segments included in the second alignment pattern in the alignment dimming picture deviate from some straight line segments included in the first alignment pattern in the alignment display picture.

For example, as shown in FIG. 5A(c), an orthographic projection of a straight line segment a13 included in the second alignment pattern in the alignment dimming picture on the dimming screen 120 is aligned with a straight line segment A1 included in the first alignment pattern in the alignment display picture, and an orthographic projection of a straight line segment b13 included in the second alignment pattern in the alignment dimming picture on the dimming screen 120 is aligned with a straight line segment B1 included in the first alignment pattern in the alignment display picture. The orthographic projections of the straight line segments a11, a12, a14, and a15 included in the second alignment pattern in the alignment dimming picture on the dimming screen 120 deviate from the straight line segment A1 included in the first alignment pattern in the alignment display picture, and the orthographic projections of straight line segments b11, b12, b14, and b15 included in the second alignment pattern in the alignment dimming picture on the dimming screen 120 deviate from the straight line segment B1 included in the first alignment pattern in the alignment display picture.

It should be noted that the continuous straight line segments A1 and B1 included in the first alignment pattern in the alignment dimming picture shown in FIG. 5A can also be regarded as being composed of a plurality of discrete straight line segments, and these straight line segments are not spaced from each other. In this case, at the macro level, respective connection line segments included in the straight line segment A1 in the first alignment pattern can have the same shape and size as straight line segments a11, a12, a13, a14, and a15 in the second alignment pattern, respectively, and macroscopically, respective straight line segments included in the straight line segment B1 in the first alignment pattern can have the same shape and size as the straight line segments b11, b12, b13, b14, and b15 in the second alignment pattern.

Figure 5B:
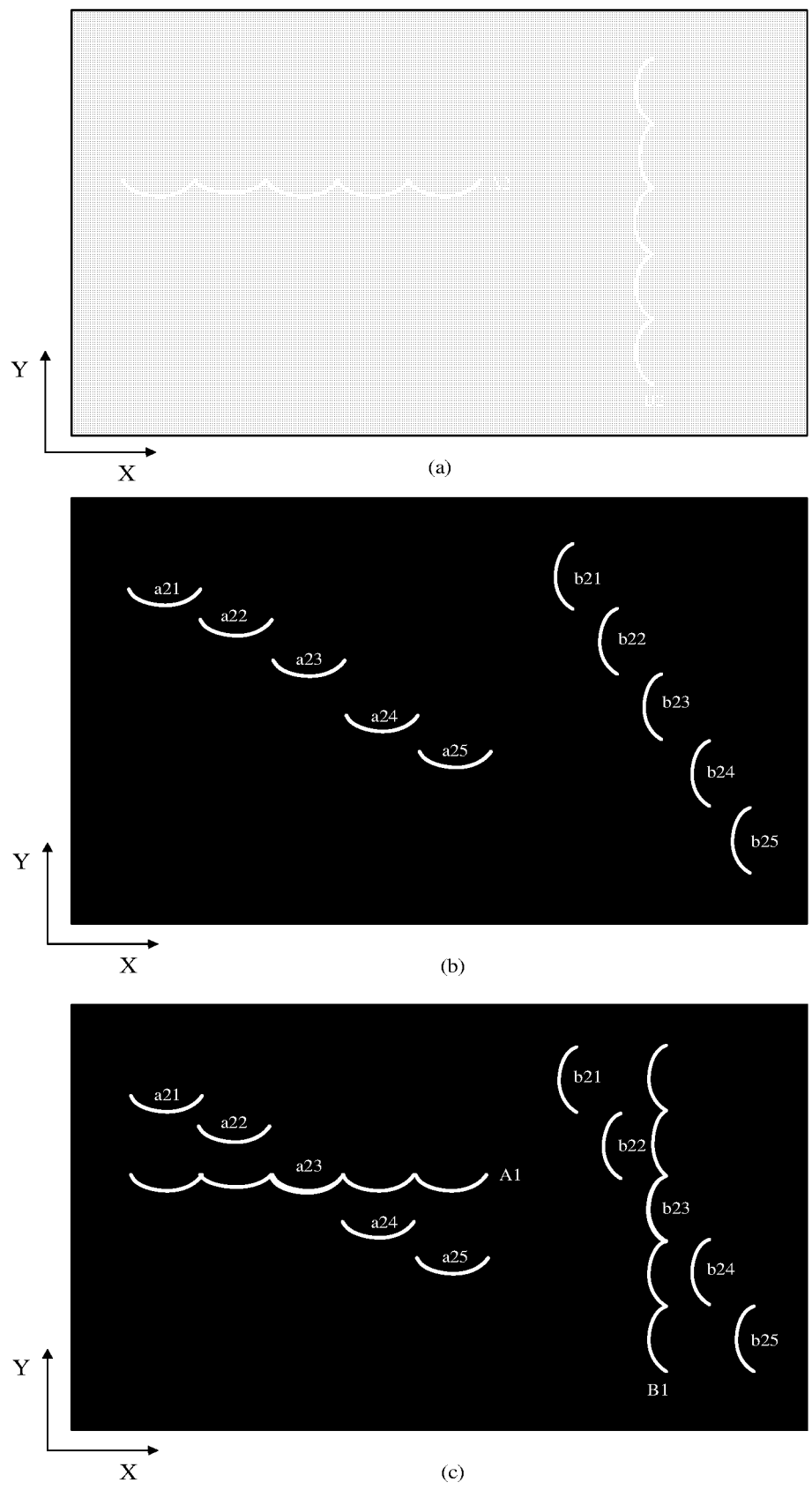
FIG. 5B is another macroscopic schematic diagram of an alignment dimming picture displayed on a dimming screen and an alignment display picture displayed on a display screen provided by an embodiment of the present disclosure.

FIG. 5B is another macro schematic diagram of the alignment dimming picture displayed on the dimming screen and the alignment display picture displayed on the display screen provided by the embodiment of the present disclosure.

Under the control of the first data signal, the alignment dimming picture displayed on the dimming screen 120 is shown in FIG. 5B(a). As shown by the white lines in FIG. 5B(a), the first alignment pattern in the alignment dimming picture may include a plurality of continuous curve line segments, and these curve line segments extend in the X direction or the Y direction. For example, the first alignment pattern in the alignment dimming picture shown in FIG. 5B(a) includes a white curve line segment A2 extending along the X direction and a white curve line segment B2 extending along the Y direction. Under the control of the second data signal, the alignment display picture displayed on the display screen 110 is shown in FIG. 5B(b). As shown by the bright lines in FIG. 5B(b), the second alignment pattern in the alignment display picture may include a plurality of discrete curve line segments. For example, the second alignment pattern in the alignment display picture shown in FIG. 5B(b) includes five white curve line segments a21, a22, a23, a24, and a25 extending in the X direction and five white curve line segments b21, b22, b23, b24, and b25 extending in the Y direction.

In addition, as shown in FIG. 5B(c), the orthographic projections of some curve line segments included in the second alignment pattern in the alignment dimming picture on the dimming screen 120 are aligned with some curve line segments included in the first alignment pattern in the alignment display picture, while the orthographic projections of some other curve line segments included in the second alignment pattern in the alignment dimming picture on the dimming screen 120 deviate from some curve line segments included in the first alignment pattern in the alignment display picture.

For example, as shown by bright lines in FIG. 5B(c), an orthographic projection of a curve line segment a23 included in the second alignment pattern in the alignment dimming picture on the dimming screen 120 is aligned with a curve line segment A2 included in the first alignment pattern in the alignment display picture, and an orthographic projection of a curve line segment b23 included in the second alignment pattern in the alignment dimming picture on the dimming screen 120 is aligned with a curve line segment B2 included in the first alignment pattern in the alignment display picture. The orthographic projections of the curve line segments a21, a22, a24, and a25 included in the second alignment pattern in the alignment dimming picture on the dimming screen 120 deviate from the curve line segment A2 included in the first alignment pattern in the alignment display picture, and the orthographic projections of the curve line segments b21, b22, b24, and b25 included in the second alignment pattern in the alignment dimming picture on the dimming screen 120 deviate from the curve line segment B2 included in the first alignment pattern in the alignment display picture.

It should be noted that the continuous curve line segments A2 and B2 included in the first alignment pattern in the alignment dimming picture shown in FIG. 5B can also be regarded as being composed of a plurality of discrete curve line segments, and these curve line segments are not spaced from each other. In this case, at a macroscopic level, respective connection line segments included in the curve line segment A2 in the first alignment pattern can have the same shape and size as the curve line segments a21, a22, a23, a24, and a25 in the second alignment pattern, respectively, and at a macroscopic level, respective curve line segments included in the curve line segment B2 in the first alignment pattern can have the same shape and size as the curve line segments b21, b22, b23, b24, and b25 in the second alignment pattern, respectively.

In addition, it should be noted that the straight line segments and the curve line segments included in the first alignment pattern in the alignment dimming picture shown in FIG. 5A and FIG. 5B are microscopically composed of a plurality of dimming pixels, and similarly, the straight line segments and the curve line segments included the second alignment pattern in the alignment display picture shown in FIG. 5A and FIG. 5B are microscopically composed of a plurality of display pixels.

In addition, it should be noted that although the straight line segments included in the second alignment pattern shown in FIG. 5A are spaced apart by a certain interval in the X direction, this is only for the purpose of making each straight line segment included in the second alignment pattern clearly identifiable, in fact, the straight line segments included in the second alignment pattern may not be spaced apart or partially overlapped in the X direction. Similarly, although the curve line segments included in the second alignment pattern shown in FIG. 5B are spaced apart by a certain interval in the X direction, it is only for the purpose of making each curve line segment included in the second alignment pattern clearly identifiable, and in fact, the curve line segments included in the second alignment pattern may not be spaced apart or partially overlapped in the X direction.

In addition, it should be noted that although FIG. 5A shows that the first alignment pattern included in the alignment dimming picture displayed on the dimming screen includes a continuous straight line segment extending along the X direction and a continuous straight line segment extending along the Y direction, and FIG. 5B shows that the first alignment pattern included in the alignment dimming picture displayed on the dimming screen includes a continuous curve line segment extending along the X direction and a continuous curve line segment extending along the Y direction, however, the embodiments of the present disclosure are obviously not limited to this. For example, the first alignment pattern included in the alignment dimming picture displayed on the dimming screen may be a plurality of discrete curve line segments extending along the X direction or the Y direction and/or a plurality of discrete straight line segments extending along the X direction or the Y direction, and these curve line segments or straight line segments are spaced apart from each other.

In the alignment deviation detection method of the display panel provided by at least one embodiment of the present disclosure, the first alignment pattern may include a first part, the second alignment pattern may include a first part, a second part, and a third part, and the first part, the second part, and the third part of the second alignment pattern are independent of each other. The orthographic projection of the second alignment pattern on the dimming screen being preset to be at least partially aligned with the first alignment pattern and at least partially deviated from the first alignment pattern, comprises: presetting an orthographic projection of the first part of the second alignment pattern on the dimming screen to deviate to a first side of the first part of the first alignment pattern in a first alignment direction; presetting an orthographic projection of the second part of the second alignment pattern on the dimming screen to be aligned with the first part of the first alignment pattern in the first alignment direction; presetting an orthographic projection of the third part of the second alignment pattern on the dimming screen to deviate to a second side of the first part of the first alignment pattern in the first alignment direction. A direction in which the first part of the second alignment pattern deviates from the first part of the first alignment pattern is opposite to a direction in which the third part of the second alignment pattern deviates from the first part of the first alignment pattern, a distance by which the first part of the second alignment pattern deviates from the first part of the first alignment pattern is identical with a distance by which the third part of the second alignment pattern deviates from the first part of the first alignment pattern, and the first side and the second side of the first part of the first alignment pattern are two sides opposite to each other.

In the alignment deviation detection method of the display panel provided by at least one embodiment of the present disclosure, the first part of the first alignment pattern may include a first dimming line segment; the first part of the second alignment pattern may include a first display line segment, the second part of the second alignment pattern may include a second display line segment, and the third part of the second alignment pattern may include a third display line segment.

Figure 6A:
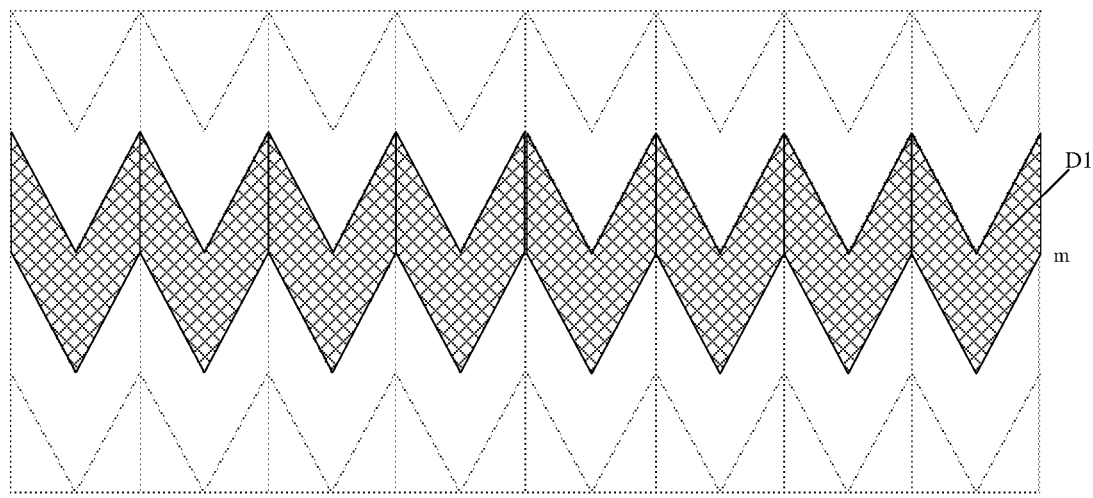
FIG. 6A is a schematic diagram of a first alignment pattern and a second alignment pattern provided by an embodiment of the present disclosure.
Figure 6A:
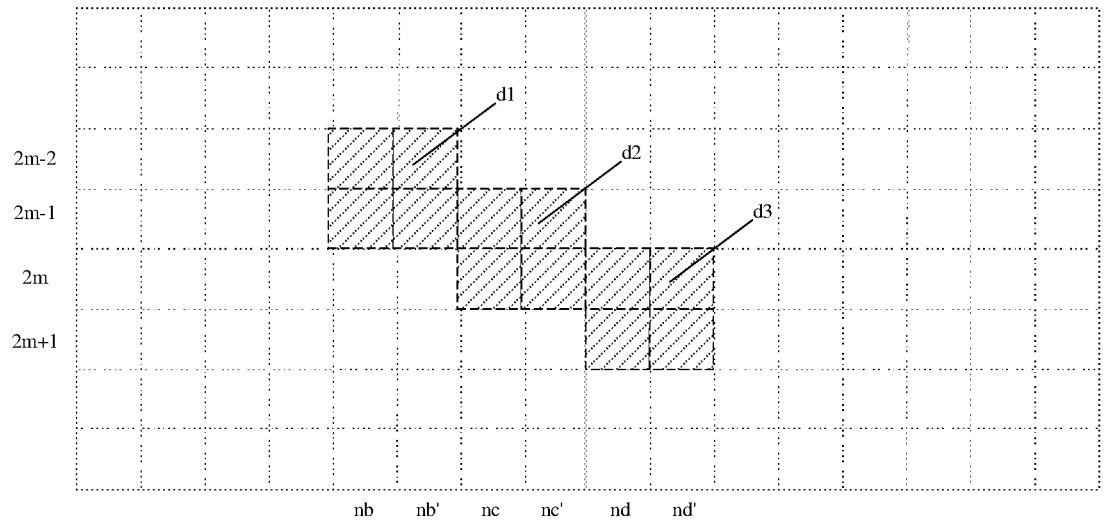

FIG. 6A is a schematic diagram of a first alignment pattern and a second alignment pattern provided by at least one embodiment of the present disclosure.

As shown in FIG. 6A(a), the first part of the first alignment pattern includes a first dimming line segment D1 (equivalent to a straight line segment A1 in FIG. 5A(a)), and the first dimming line segment D1 is located at the position of the dimming pixels in the m-th row of the dimming screen 120, where m is a positive integer and $2 \leq m \leq M-1$.

As shown in FIG. 6A(b), the first part of the second alignment pattern includes a first display line segment d1 (equivalent to the straight line segment a12 in FIG. 5A(b)), and the first display line segment d1 is located at the positions of display pixels from an nb-th column to an nb'-th column in a $((2*m-2)-\beta)$-th row and of display pixels from the nb-th column to the nb'-th column in a $((2*m-1)-\beta)$-th row of the display screen 110. The second part of the second alignment pattern includes a second display line segment d2 (equivalent to the straight line segment a13 in FIG. 5A(b)), and the second display line segment d2 is located at the positions of display pixels from an nc-th column to an nc'-th column in a $(2*m-1)$-th row and of display pixels from the nc-th column to the nc'-th column in a $(2*m)$-th row of the display screen 110. The third part of the second alignment pattern includes a third display line segment d3 (equivalent to the straight line segment a14 in FIG. 5A(b)), the third display line segment d3 is located at the positions of display pixels from an nd-th column to an nd'-th column in a $((2*m)+\beta)$-th row and of display pixels from the nd-th column to the nd'-th column in a $((2*m+1)+\beta)$-th row of the display screen 110, where $\beta$ is 0, 1, or 2, nb, nb', nc, nc', nd, and nd' are positive integers, $1 \leq nb \leq nb' < nc \leq nc' < nd \leq nd' \leq 2N$.

For example, in the example shown in FIG. 6A(b), $\beta=0$, nb'=nb+1, nc=nb'+1, nc'=nc+1, nd=nc'+1, nd'=nd+1.

It should be noted that although it is shown in FIG. 6A(a) that the first dimming line segment is located at the positions of the dimming pixels in the m-th row of the dimming screen, that is, the first dimming line segment is continuous and includes all dimming pixels in the m-th row of the dimming screen, the embodiments of the present disclosure are obviously not limited to this, and the first dimming line segment may be disconnected and/or include some dimming pixels in the m-th row of the dimming screen. In addition, although the first dimming line segment shown in FIG. 6A(a) is a straight line segment, the embodiments of the present disclosure are obviously not limited to this, and the first dimming line segment may also be a curve line segment.

It should be noted that although in the embodiment shown in FIG. 6A(a), the first dimming line segment includes one row of dimming pixels, the embodiments of the present disclosure are obviously not limited to this, and the first dimming line segment may also include a plurality of rows of dimming pixels (for example, 5 rows, 50 rows, etc.). Although the first display line segment includes display pixels arranged in two rows and two columns in the embodiment shown in FIG. 6A(b), the embodiments of the present disclosure are obviously not limited to this, and the first display line segment may also include display pixels arranged in two rows and several columns (e.g., 10 columns, 100 columns, etc.), and similarly, the second display line segment may also include display pixels arranged in two rows and several columns (e.g., 10 columns, 100 columns, etc.), and the third display line segment may also include display pixels arranged in two rows and several columns (e.g., 10 columns, 100 columns, etc.).

Figure 6B:
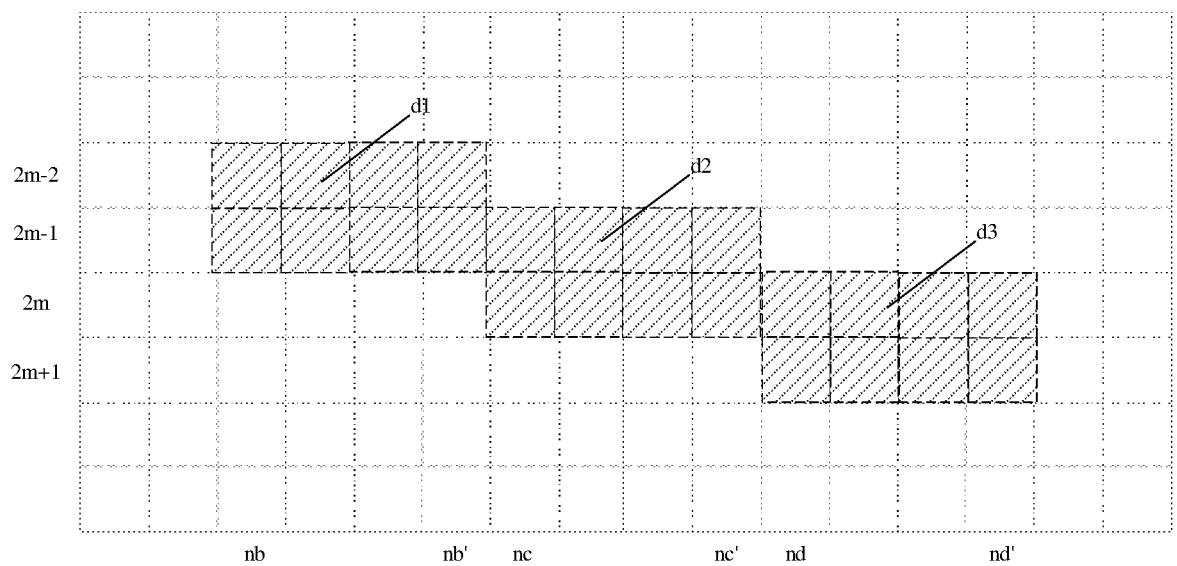
FIG. 6B is another schematic diagram of a second alignment pattern provided by an embodiment of the present disclosure.

FIG. 6B is another schematic diagram of a second alignment pattern provided by at least one embodiment of the present disclosure.

For example, in the example shown in FIG. 6B, $\beta=0$, nb'=nb+3, nc=nb'+1, nc'=nc+3, nd=nc'+1, nd'=nd+3. In this case, the first display line segment d1 includes two rows and four columns of display pixels, the second display line segment d2 includes two rows and four columns of display pixels, and the third display line segment d3 includes two rows and four columns of display pixels.

For example, in step S130, under the control of the first data signal, making the dimming screen display an alignment dimming picture, includes: under the control of the first data signal, controlling at least part of the dimming pixels located in the m-th row of the dimming screen to display the first dimming line segment in the first alignment pattern.

For example, in step S130, under the control of the second data signal, making the display screen display the alignment display picture, comprises: under the control of the second data signal, controlling display pixels located in an nb-th column to an nb'-th column of a ((2*m−2)−β)-th row and in the nb-th column to the nb'-th column of a ((2*m−1)−β)-th row of the display screen to display the first display line segment in the second alignment pattern, controlling display pixels located in an nc-th column to an nc'-th column of a (2*m−1)-th row and in the nc-th column to the nc'-th column of a (2*m)-th row of the display screen to display the second display line segment in the second alignment pattern, and controlling display pixels located in an nd-th column to an nd'-th column of a ((2*m)+β)-th row and in the nd-th column to the nd'-th column of a ((2*m+1)+β)-th row of the display screen to display the third display line segment in the second alignment pattern.

Figure 6C:
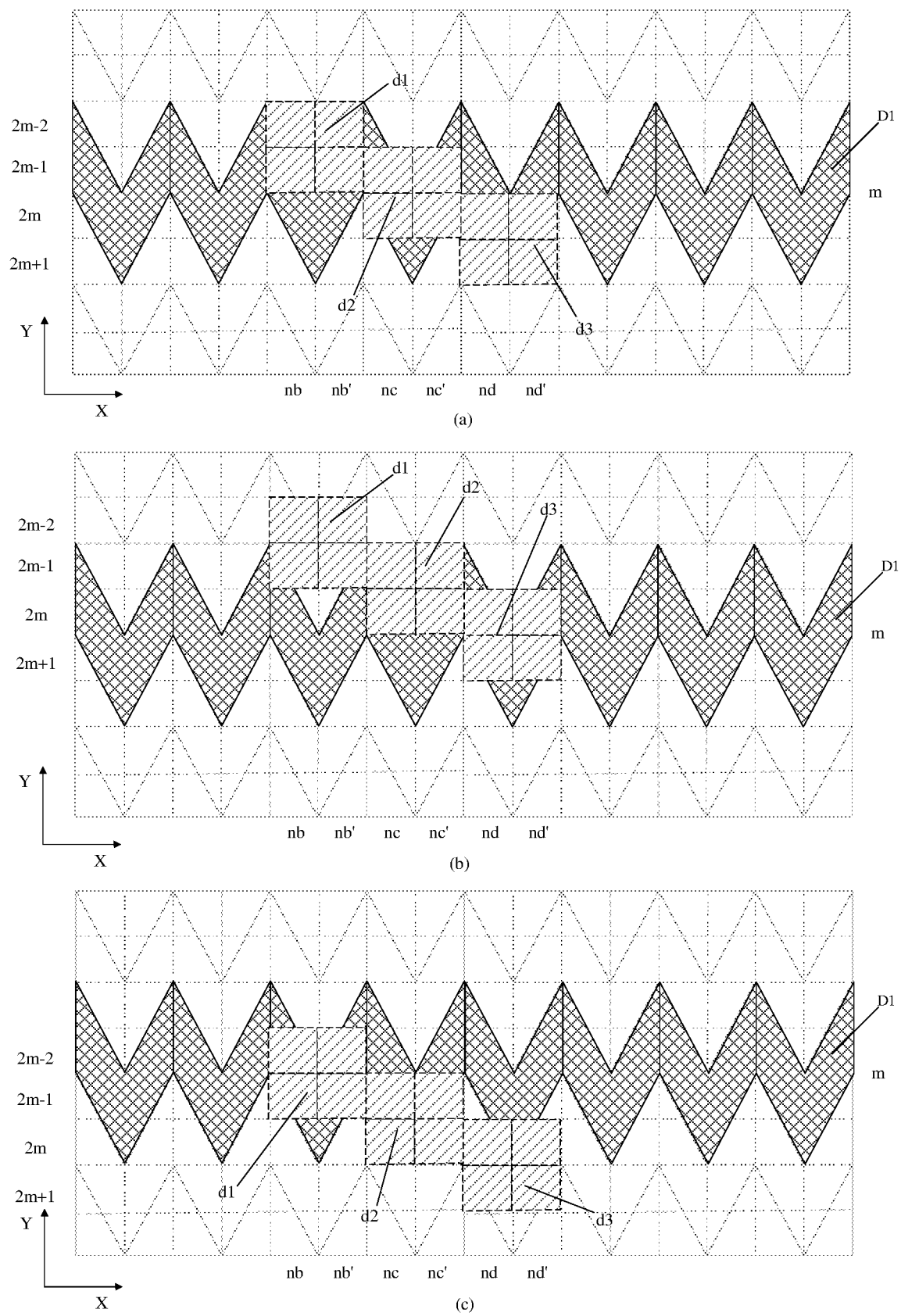
FIG. 6C is a schematic diagram of alignment situations of the first alignment pattern and the second alignment pattern in FIG. 6A in different alignment states.

FIG. 6C is a schematic diagram of alignment situations of the first alignment pattern and the second alignment pattern in FIG. 6A in different alignment states.

As shown in FIG. 6C(a), in a case where the display screen 110 and the dimming screen 120 are in the first alignment state, that is, when the alignment between the display screen 110 and the dimming screen 120 in the column direction Y of the dimming pixels of the dimming screen 120 has no deviation, the orthographic projection of the first display line segment d1 on the dimming screen 120 is offset upward by one row of display pixels relative to the first dimming line segment D1, the orthographic projection of the second display line segment d2 on the dimming screen 120 is aligned with the first dimming line segment D1, and the orthographic projection of the third display line segment d3 on the dimming screen 120 is offset downward by one row of display pixels relative to the first dimming line segment D1. In this case, the area of the overlapping region between the orthographic projections of the display pixels included in the second display line segment d2 on the dimming screen 120 and the dimming pixels included in the first dimming line segment D1 is greater than the area of the overlapping region between the orthographic projections of the display pixels included in the first display line segment d1 or the third display line segment d3 on the dimming screen 120 and the dimming pixels included in the first dimming line segment D1, and the area of the overlapping region between the orthographic projections of the display pixels included in the first display line segment d1 on the dimming screen 120 and the dimming pixels included in the first dimming line segment D1 is equal to the area of the overlapping region between the orthographic projections of the display pixels included in the third display line segment d3 on the dimming screen 120 and the dimming pixels included in the first dimming line segment D1. In this case, the brightness value of the second display line segment d2 is greater than the brightness value of the first display line segment d1 and the brightness value of the third display line segment d3, and the brightness value of the first display line segment d1 is equal to the brightness value of the third display line segment d3.

As shown in FIG. 6C(b), in a case where the display screen 110 and the dimming screen 120 are in the second alignment state, that is to say, when the display screen 110 is offset upward by one row of display pixels relative to the dimming screen 120 in the column direction Y of the dimming pixels of the dimming screen 120, the orthographic projection of the first display line segment d1 on the dimming screen 120 is offset upward by two rows of display pixels relative to the first dimming line segment D1, the orthographic projection of the second display line segment d2 on the dimming screen 120 is offset upward by one row of display pixels relative to the first dimming line segment D1, and the orthographic projection of the third display line segment d3 on the dimming screen 120 is aligned with the first dimming line segment D1. In this case, the area of the overlapping region between the orthographic projections of the display pixels included in the third display line segment d3 on the dimming screen 120 and the dimming pixels included in the first dimming line segment D1 is greater than the area of the overlapping region between the orthographic projections of the display pixels included in the second display line segment d2 on the dimming screen 120 and the dimming pixels included in the first dimming line segment D1, and the area of the overlapping region between the orthographic projections of the display pixels included in the second display line segment d2 on the dimming screen 120 and the dimming pixels included in the first dimming line segment D1 is greater than the area of the overlapping region between the orthographic projections of the display pixels included in the first display line segment d1 on the dimming screen 120 and the dimming pixels included in the first dimming line segment D1. In this case, the brightness value of the third display line segment d3 is greater than the brightness value of the second display line segment d2, and the brightness value of the second display line segment d2 is greater than the brightness value of the first display line segment d1.

As shown in FIG. 6C(c), in a case where the display screen 110 and the dimming screen 120 are in the third alignment state, that is, when the display screen 110 is offset downward by one row of display pixels relative to the dimming screen 120 in the column direction Y of the dimming pixels of the dimming screen 120, the orthographic projection of the first display line segment d1 on the dimming screen 120 is aligned with the first dimming line segment D1, the orthographic projection of the second display line segment d2 on the dimming screen 120 is offset downward by one row of display pixels relative to the first dimming line segment D1, and the orthographic projection of the third display line segment d3 on the dimming screen 120 is offset downward by two rows of display pixels relative to the first dimming line segment D1. In this case, the area of the overlapping region between the orthographic projections of the display pixels included in the first display line segment d1 on the dimming screen 120 and the dimming pixels included in the first dimming line segment D1 is greater than the area of the overlapping region between the orthographic projections of the display pixels included in the second display line segment d2 on the dimming screen 120 and the dimming pixels included in the first dimming line segment D1, and the area of the overlapping region between the orthographic projections of the display pixels included in the second display line segment d2 on the dimming screen 120 and the dimming pixels included in the first dimming line segment D1 is greater than the area of the overlapping region between the orthographic projections of the display pixels included in the third display line segment d3 on the dimming screen 120 and the dimming pixels included in the first dimming line segment D1. In this case, the brightness value of the first display line segment d1 is greater than the brightness value of the second display line segment d2, and the brightness value of the second display line segment d2 is greater than the brightness value of the third display line segment d3.

According to at least one embodiment of the present disclosure, referring to FIG. 6C, when β=0, the brightness situations of the first display line segment, the second display line segment, and the third display line segment in the second alignment pattern in different alignment states are specifically explained, and the situations where β taking other values are similar to this, and will not be described again. For example, when β=1 and the display screen 110 and the dimming screen 120 are in the first alignment state, the brightness value of the second display line segment d2 is greater than the brightness value of the first display line segment d1 and the brightness value of the third display line segment d3, and the brightness value of the first display line segment d1 is equal to that of the third display line segment d3; when the display screen 110 and the dimming screen 120 are in the second alignment state, the brightness value of the second display line segment d2 is equal to that of the third display line segment d3, and the brightness value of the second display line segment d2 is greater than that of the first display line segment d1; when the display screen 110 and the dimming screen 120 are in the third alignment state, the brightness value of the first display line segment d1 is equal to that of the second display line segment d2, and the brightness value of the second display line segment d2 is greater than that of the third display line segment d3. For example, when β=2 and the display screen 110 and the dimming screen 120 are in the first alignment state, the brightness value of the second display line segment d2 is greater than the brightness value of the first display line segment d1 and the brightness value of the third display line segment d3, and the brightness value of the first display line segment d1 is equal to that of the third display line segment d3; when the display screen 110 and the dimming screen 120 are in the second alignment state, the brightness value of the second display line segment d2 is greater than that of the third display line segment d3, and the brightness value of the third display line segment d3 is greater than that of the first display line segment d1; when the display screen 110 and the dimming screen 120 are in the third alignment state, the brightness value of the second display line segment d2 is greater than that of the first display line segment d1, and the brightness value of the first display line segment d1 is greater than that of the third display line segment d3.

It should be noted that, in the alignment deviation detection method of the display panel provided by at least one embodiment of the present disclosure, as shown in FIG. 6C, in the column direction of the dimming pixels of the dimming screen, the orthographic projection of the first display line segment on the dimming screen being aligned with the first dimming line segment means that the orthographic projection of the first display line segment on the dimming screen falls in the middle region of the first dimming line segment, the orthographic projection of the first display line segment on the dimming screen being offset upward by one row of the display pixels relative to the first dimming line segment means that the orthographic projection of the first display line segment on the dimming screen falls in the region that is offset upward by one row of display pixels relative to the middle of the first dimming line segment, the orthographic projection of the first display line segment on the dimming screen being offset upward by two rows of the display pixels relative to the first dimming line segment means that the orthographic projection of the first display line segment on the dimming screen falls in the region that is offset upward by two rows of display pixels relative to the middle of the first dimming line segment. The orthographic projection of the second display line segment on the dimming screen being aligned with the first dimming line segment, or being offset upward by one row of display pixels relative to the first dimming line segment, or being offset downward by one row of display pixels relative to the first dimming line segment means that the orthographic projection of the second display line segment on the dimming screen falls in the middle region of the first dimming line segment, the orthographic projection of the second display line segment on the dimming screen being offset upward by one row of the display pixels relative to the first dimming line segment means that the orthographic projection of the second display line segment on the dimming screen falls in the region that is offset upward by one row of display pixels relative to the middle of the first dimming line segment, the orthographic projection of the second display line segment on the dimming screen being offset downward by one row of the display pixels relative to the first dimming line segment means that the orthographic projection of the second display line segment on the dimming screen falls in the region that is offset downward by one row of display pixels relative to the middle of the first dimming line segment. The orthographic projection of the third display line segment on the dimming screen being aligned with the first dimming line segment means that the orthographic projection of the third display line segment on the dimming screen falls in the middle region of the first dimming line segment, the orthographic projection of the third display line segment on the dimming screen being offset downward by one row of the display pixels relative to the first dimming line segment means that the orthographic projection of the third display line segment on the dimming screen falls in the region that is offset downward by one row of display pixels relative to the middle of the first dimming line segment, the orthographic projection of the third display line segment on the dimming screen being offset downward by two rows of the display pixels relative to the first dimming line segment means that the orthographic projection of the third display line segment on the dimming screen falls in the region that is offset downward by two rows of display pixels relative to the middle of the first dimming line segment.

It should be noted that "being offset upward" means deviating to a direction of the first display line segment d1 away from the second display line segment d2 in the Y direction, and "being offset downward" means deviating to a direction of the first display line segment d1 close to the second display line segment d2 in the Y direction.

In addition, it should be noted that, in the alignment deviation detection method of the display panel provided in at least one embodiment of the present disclosure, the brightness of the first display line segment refers to the average brightness value of respective display pixels included in the first display line segment, the brightness of the second display line segment refers to the average brightness value of respective display pixels included in the second display line segment, and the brightness of the third display line segment refers to the average brightness value of respective display pixels included in the third display line segment.

For example, in step S140, according to the display situation of the second alignment pattern, determining the alignment state between the display screen and the dimming screen, comprises: in a case where the brightness value of the second display line segment is greater than the brightness value of the first display line segment and the brightness value of the third display line segment, and the brightness value of the first display line segment is equal to the brightness value of the third display line segment, determining that the display screen and the dimming screen are in the first alignment state; in a case where the brightness value of the third display line segment is greater than the brightness value of the second display line segment, and the brightness value of the second display line segment is greater than the brightness value of the first display line segment, determining that the display screen and the dimming screen are in the second alignment state; or, in a case where the brightness value of the first display line segment is greater than the brightness value of the second display line segment, and the brightness value of the second display line segment is greater than the brightness value of the third display line segment, determining that the display screen and the dimming screen are in the third alignment state.

For example, in some embodiments of the present disclosure, the first part of the second alignment pattern further includes a fourth display line segment, and the third part of the second alignment pattern further includes a fifth display line segment.

Figure 7A:
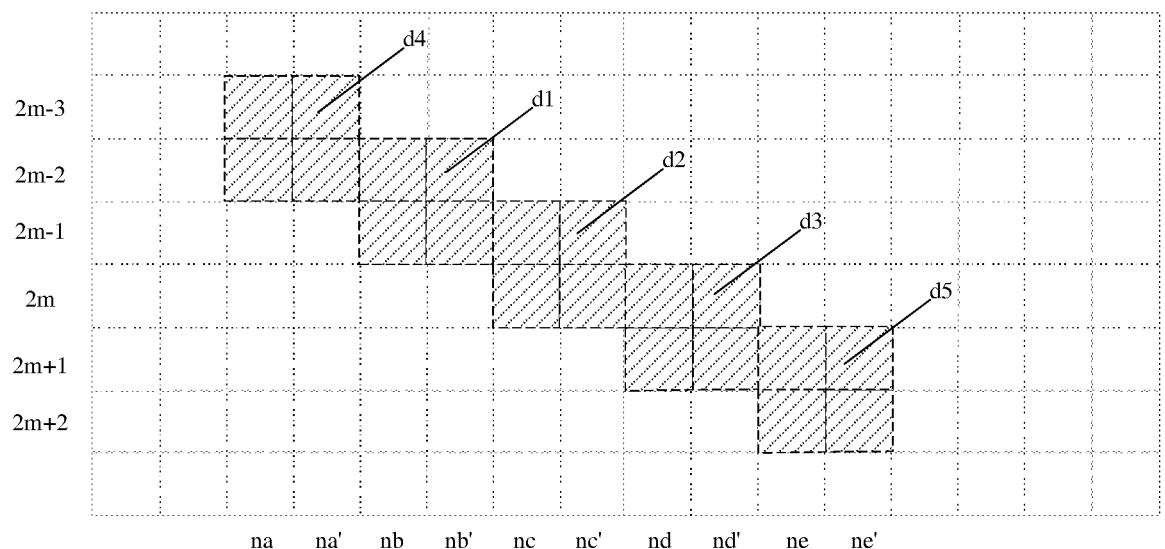
FIG. 7A is another schematic diagram of a second alignment pattern provided by an embodiment of the present disclosure.

FIG. 7A is another schematic diagram of a second alignment pattern provided by at least one embodiment of the present disclosure.

As shown in FIG. 7A, the first part of the second alignment pattern also includes a fourth display line segment d4 (equivalent to the straight line segment a11 in FIG. 5A(b)), the fourth display line segment d4 is located at the positions of display pixels from an na-th column to an na'-th column in a $(2*m-3)-\beta$-th row and of display pixels from the na-th column to the na'-th column in a $(2*m-2)-\beta$-th row of the display screen 110. The third part of the second alignment pattern further includes a fifth display line segment d5 (equivalent to the straight line segment a15 in FIG. 5A(b)), and the fifth display line segment d5 is located at the positions of display pixels from an ne-th column to an ne'-th column in a $((2*m+1)+\beta)$-th row and of display pixels from the ne-th column to the ne'-th column in a $((2*m+2)+\beta)$-th row of the display screen 110, where na, na', ne, and ne' are positive integers, $1 \le na \le na' < nb \le nb' < nc \le nc' < nd \le nd' < ne \le ne' \le 2N$.

For example, in the example shown in FIG. 7A, $\beta=0$, na'=na+1, nb=na'+1, nb'=nb+1, nc=nb'+1, nc'=nc+1, nd=nc'+1, nd'=nd+1, ne=nd'+1, ne'=ne+1. It should be noted that although in the embodiment shown in FIG. 7A, the first display line segment includes two rows and two columns of display pixels, the present disclosure is not limited to this, and the first display line segment may also include two rows and several columns (e.g., 10 columns, 100 columns, etc.) of display pixels, similarly, the second display line segment may also include two rows and several columns (e.g., 10 columns, 100 columns, etc.) of display pixels, and the third display line segment may also include two rows and several columns (e.g., 10 columns, 100 columns, etc.) of display pixels, the fourth display line segment may also include two rows and several columns (e.g., 10 columns, 100 columns, etc.) of display pixels, and the fifth display line segment may also include two rows and several columns (e.g., 10 columns, 100 columns, etc.) of display pixels.

For example, in step S130, under the control of the second data signal, causing the display screen to display the alignment display picture, further comprises: under the control of the second data signal, controlling display pixels located in the na-th column to the na'-th column of the $((2*m-3)-\beta)$-th row and in the na-th column to the na'-th column of the $((2*m-2)-\beta)$-th row of the display screen to display the fourth display line segment d4 in the second alignment picture, and controlling display pixels located in the ne-th column to the ne'-th column of the $((2*m+1)+\beta)$-th row and in the ne-th column to the ne'-th column of the $((2*m+2)+\beta)$-th row of the display screen to display the fifth display line segment d5 in the second alignment picture.

Figure 7B:
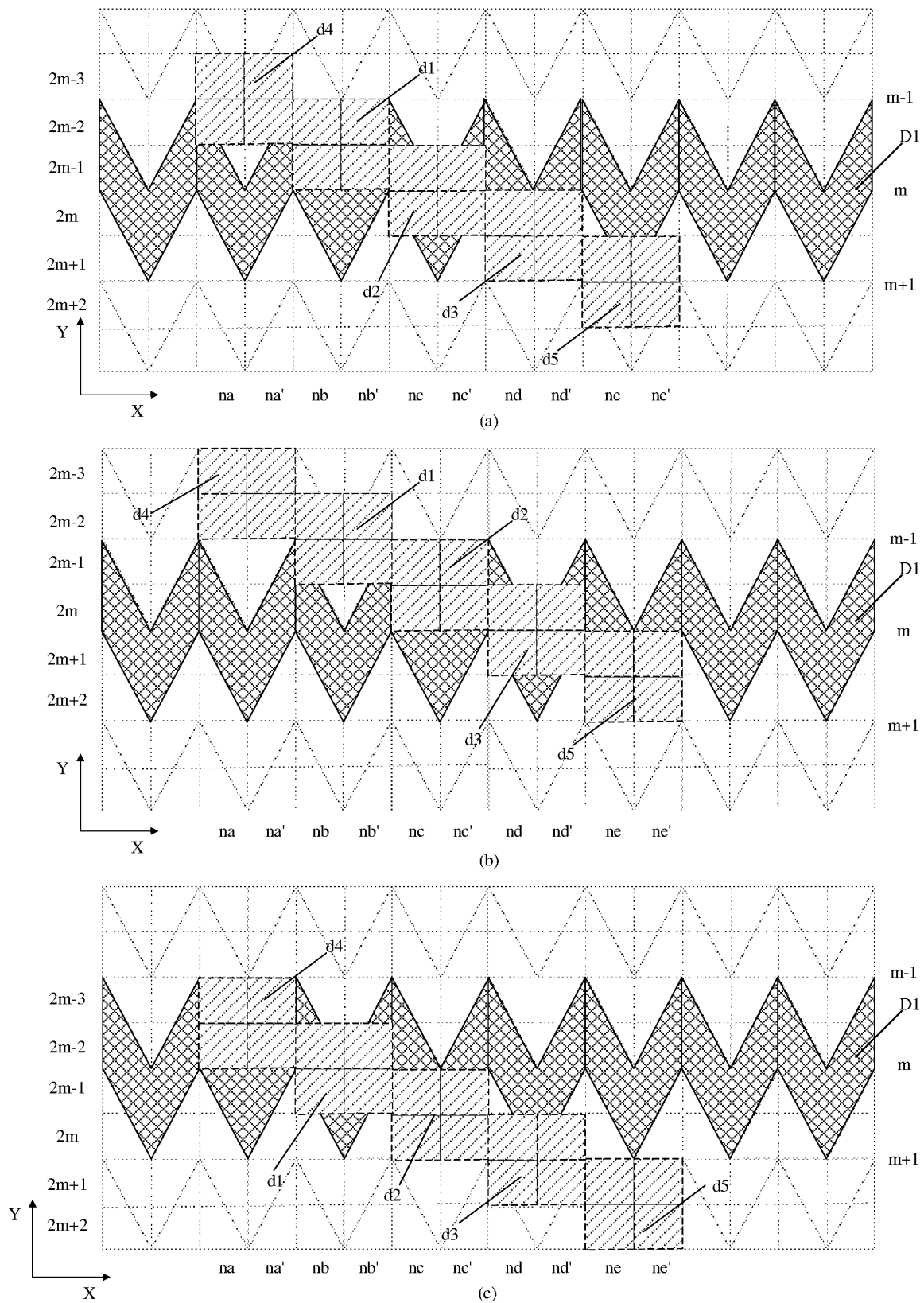
FIG. 7B is a schematic diagram of alignment situations of the first alignment pattern in FIG. 6A and the second alignment pattern in FIG. 7A in different alignment states.

FIG. 7B is a schematic diagram of alignment situations of the first alignment pattern in FIG. 6A and the second alignment pattern in FIG. 7A in different alignment states.

As shown in FIG. 7B(a), in a case where the display screen 110 and the dimming screen 120 are in the first alignment state, that is, in a case where the alignment between the display screen 110 and the dimming screen 120 in the column direction of the dimming pixels of the dimming screen 120 has no deviation, the orthographic projection of the fourth display line segment d4 on the dimming screen 120 is offset upward by two rows of display pixels relative to the first dimming line segment D1, and the orthographic projection of the fifth display line segment d5 on the dimming screen 120 is offset downward by two rows of display pixels relative to the first dimming line segment D1. In this case, the area of the overlapping region between the orthographic projections of the display pixels included in the second display line segment d2 on the dimming screen 120 and the dimming pixels included in the first dimming line segment D1 is greater than the area of the overlapping region between the orthographic projections of the display pixels included in the first display line segment d1, the third display line segment d3, the fourth display line segment d4, or the fifth display line segment d5 on the dimming screen 120 and the dimming pixels included in the first dimming line segment D1, the area of the overlapping region between the orthographic projections of the display pixels included in the first display line segment d1 on the dimming screen 120 and the dimming pixels included in the first dimming line segment D1 is equal to the area of the overlapping region between the orthographic projections of the display pixels included in the third display line segment d3 on the dimming screen 120 and the dimming pixels included in the first dimming line segment D1, the area of the overlapping region between the orthographic projections of the display pixels included in the fourth display line segment d4 on the dimming screen 120 and the dimming pixels included in the first dimming line segment D1 is equal to the area of the overlapping region between the orthographic projections of the display pixels included in the fifth display line segment d5 on the dimming screen 120 and the dimming pixels included in the first dimming line segment D1, and the area of the overlapping region between the orthographic projections of the display pixels included in the first display line segment d1 on the dimming screen 120 and the dimming pixels included in the first dimming line segment D1 is greater than the area of the overlapping region between the orthographic projections of the display pixels included in the fourth display line segment d4 on the dimming screen 120 and the dimming pixels included in the first dimming line segment D1. In this case, the brightness value of the second display line segment d2 is greater than the brightness value of the first display line segment d1, the brightness value of the third display line segment d3, the brightness value of the fourth display line segment d4, and the brightness value of the fifth display line segment d5, and the brightness value of the first display line segment d1 is equal to that of the third display line segment d3, the brightness value of the fourth display line segment d4 is equal to that of the fifth display line segment d5, and the brightness value of the first display line segment d1 is greater than that of the fourth display line segment d4.

As shown in FIG. 7B(b), in a case where the display screen 110 and the dimming screen 120 are in the second alignment state, that is, in a case where the display screen 110 is offset upward by one row of display pixels relative to the dimming screen 120 in the column direction of the dimming pixels of the dimming screen 120, the orthographic projection of the fourth display line segment d4 on the dimming screen 120 is offset upward by three rows of display pixels relative to the first dimming line segment D1, the orthographic projection of the fifth display line segment d5 on the dimming screen 120 is offset downward by one row of display pixels relative to the first dimming line segment D1. In this case, the area of the overlapping region between the orthographic projections of the display pixels included in the third display line segment d3 on the dimming screen 120 and the dimming pixels included in the first dimming line segment D1 is greater than the area of the overlapping region between the orthographic projections of the display pixels included in the first display line segment d1, the second display line segment d2, the fourth display line segment d4, or the fifth display line segment d5 on the dimming screen 120 and the dimming pixels included in the first dimming line segment D1, the area of the overlapping region between the orthographic projections of the display pixels included in the second display line segment d2 on the dimming screen 120 and the dimming pixels included in the first dimming line segment D1 is equal to the area of the overlapping region between the orthographic projections of the display pixels included in the fifth display line segment d5 on the dimming screen 120 and the dimming pixels included in the first dimming line segment D1, the area of the overlapping region between the orthographic projections of the display pixels included in the second display line segment d2 on the dimming screen 120 and the dimming pixels included in the first dimming line segment D1 is greater than the area of the overlapping region between the orthographic projections of the display pixels included in the first display line segment d1 on the dimming screen 120 and the dimming pixels included in the first dimming line segment D1, and the area of the overlapping region between the orthographic projections of the display pixels included in the first display line segment d1 on the dimming screen 120 and the dimming pixels included in the first dimming line segment D1 is greater than the area of the overlapping region between the orthographic projections of the display pixels included in the fourth display line segment d4 on the dimming screen 120 and the dimming pixels included in the first dimming line segment D1. In this case, the brightness value of the third display line segment d3 is greater than the brightness value of the first display line segment d1, the brightness value of the second display line segment d2, the brightness value of the fourth display line segment d4, and the brightness value of the fifth display line segment d5, and the brightness value of the second display line segment d2 is equal to that of the fifth display line segment d5, the brightness value of the first display line segment d1 is smaller than that of the second display line segment d2 and is greater than that of the fourth display line segment d4.

As shown in FIG. 7B(c), in a case where the display screen 110 and the dimming screen 120 are in the third alignment state, that is, in a case where the display screen 110 is offset downward by one row of display pixels relative to the dimming screen 120 in the column direction of the dimming pixels of the dimming screen 120, the orthographic projection of the fourth display line segment d4 on the dimming screen 120 is offset upward by one row of display pixels relative to the first dimming line segment D1, and the orthographic projection of the fifth display line segment d5 on the dimming screen 120 is offset downward by three rows of display pixels relative to the first dimming line segment D1. In this case, the area of the overlapping region between the orthographic projections of the display pixels included in the first display line segment d1 on the dimming screen 120 and the dimming pixels included in the first dimming line segment D1 is greater than the area of the overlapping region between the orthographic projections of the display pixels included in the second display line segment d2, the third display line segment d3, the fourth display line segment d4, or the fifth display line segment d5 on the dimming screen 120 and the dimming pixels included in the first dimming line segment D1, the area of the overlapping region between the orthographic projections of the display pixels included in the second display line segment d2 on the dimming screen 120 and the dimming pixels included in the first dimming line segment D1 is equal to the area of the overlapping region between the orthographic projections of the display pixels included in the fourth display line segment d4 on the dimming screen 120 and the dimming pixels included in the first dimming line segment D1, the area of the overlapping region between the orthographic projections of the display pixels included in the second display line segment d2 on the dimming screen 120 and the dimming pixels included in the first dimming line segment D1 is greater than the area of the overlapping region between the orthographic projections of the display pixels included in the third display line segment d3 on the dimming screen 120 and the dimming pixels included in the first dimming line segment D1, and the area of the overlapping region between the orthographic projections of the display pixels included in the third display line segment d3 on the dimming screen 120 and the dimming pixels included in the first dimming line segment D1 is greater than the area of the overlapping region between the orthographic projections of the display pixels included in the fifth display line segment d5 on the dimming screen 120 and the dimming pixels included in the first dimming line segment D1. In this case, the brightness value of the first display line segment d1 is greater than the brightness value of the second display line segment d2, the brightness value of the third display line segment d3, the brightness value of the fourth display line segment d4, and the brightness value of the fifth display line segment d5, and the brightness value of the second display line segment d2 is equal to that of the fourth display line segment d4, the brightness value of the third display line segment d3 is smaller than that of the second display line segment d2 and is greater than that of the fifth display line segment d5.

With reference to FIG. 7B, the embodiment of the present disclosure specifically illustrates the brightness situations of the first display line segment, the second display line segment, the third display line segment, the fourth display line segment, and the fifth display line segment in the second alignment pattern under different alignment states when β=0, and the situations are similar when β takes other values and will not be described again. For example, when β=1, in a case where the display screen 110 and the dimming screen 120 are in the first alignment state, the brightness value of the second display line segment d2 is greater than that of the first display line segment d1 and that of the third display line segment d3, and the brightness value of the first display line segment d1 is equal to that of the third display line segment d3, the brightness value of the third display line segment d3 is greater than that of the fourth display line segment d4, the brightness value of the fourth display line segment d4 is equal to that of the fifth display line segment d5; in a case where the display screen 110 and the dimming screen 120 are in the second alignment state, the brightness value of the second display line segment d2 is equal to that of the third display line segment d3, the brightness value of the second display line segment d2 is greater than that of the first display line segment d1, the brightness value of the first display line segment d1 is equal to that of the fourth display line segment d4, the brightness value of the fourth display line segment d4 is equal to that of the fifth display line segment d5; in a case where the display screen 110 and the dimming screen 120 are in the third alignment state, the brightness value of the first display line segment d1 is equal to that of the second display line segment d2, the brightness value of the second display line segment d2 is greater than that of the third display line segment d3, the brightness value of the third display line segment d3 is equal to that of the fourth display line segment d4, the brightness value of the fourth display line segment d4 is equal to that of the fifth display line segment d5. For example, when $\beta=2$, in a case where the display screen 110 and the dimming screen 120 are in the first alignment state, the brightness value of the second display line segment d2 is greater than that of the first display line segment d1, the brightness value of the first display line segment d1 is equal to the brightness value of the third display line segment d3, the brightness value of the fourth display line segment d4, and the brightness value of the fifth display line segment d5; in a case where the display screen 110 and the dimming screen 120 are in the second alignment state, the brightness value of the second display line segment d2 is greater than that of the third display line segment d3, the brightness value of the third display line segment d3 is greater than the brightness value of the first display line segment d1, the brightness value of the fourth display line segment d4, and the brightness value of the fifth display line segment d5, and the brightness value of the first display line segment d1 is equal to the brightness value of the fourth display line segment d4 and the brightness value of the fifth display line segment d5; in a case where the display screen 110 and the dimming screen 120 are in the third alignment state, the brightness value of the second display line segment d2 is greater than that of the first display line segment d1, the brightness value of the first display line segment d1 is greater than that of the third display line segment d3, and the brightness value of the third display line segment d3 is equal to the brightness value of the fourth display line segment d4 and the brightness value of the fifth display line segment d5.

It should be noted that, in the alignment deviation detection method of the display panel provided by at least one embodiment of this disclosure, as shown in FIG. 7B, in the column direction of the dimming pixels of the dimming screen, the orthographic projection of the fourth display line segment on the dimming screen being offset upward by one row of display pixels relative to the first dimming line segment means that the orthographic projection of the fourth display line segment on the dimming screen falls in the region that is offset upward by one row of display pixels relative to the middle of the first dimming line segment, the orthographic projection of the fourth display line segment on the dimming screen being offset upward by two rows of display pixels relative to the first dimming line segment means that the orthographic projection of the fourth display line segment on the dimming screen falls in the region that is offset upward by two rows of display pixels relative to the middle of the first dimming line segment, and the orthographic projection of the fourth display line segment on the dimming screen being offset upward by three rows of display pixels relative to the first dimming line segment means that the orthographic projection of the fourth display line segment on the dimming screen falls in the region that is offset upward by three rows of display pixels relative to the middle of the first dimming line segment; the orthographic projection of the fifth display line segment on the dimming screen being offset downward by one row of display pixels relative to the first dimming line segment means that the orthographic projection of the fifth display line segment on the dimming screen falls in the region that is offset downward by one row of display pixels relative to the middle of the first dimming line segment, the orthographic projection of the fifth display line segment on the dimming screen being offset downward by two rows of display pixels relative to the first dimming line segment means that the orthographic projection of the fifth display line segment on the dimming screen falls in the region that is offset downward by two rows of display pixels relative to the middle of the first dimming line segment, and the orthographic projection of the fifth display line segment on the dimming screen being offset downward by three rows of display pixels relative to the first dimming line segment means that the orthographic projection of the fifth display line segment on the dimming screen falls in the region that is offset downward by three rows of display pixels relative to the middle of the first dimming line segment.

In addition, it should be noted that, in the alignment deviation detection method of the display panel provided in at least one embodiment of the present disclosure, the brightness of the fourth display line segment refers to the average brightness value of respective display pixels included in the fourth display line segment, and the brightness of the fifth display line segment refers to the average brightness value of respective display pixels included in the fifth display line segment.

For example, in step S140, according to the display situation of the second alignment pattern, determining the alignment state between the display screen and the dimming screen, includes: in a case where a brightness value of the second display line segment is greater than a brightness value of the first display line segment, a brightness value of the third display line segment, a brightness value of the fourth display line segment, and a brightness value of the fifth display line segment, and the brightness value of the first display line segment is equal to the brightness value of the third display line segment, the brightness value of the fourth display line segment is equal to the brightness value of the fifth display line segment, and the brightness value of the first display line segment is greater than the brightness value of the fourth display line segment, determining that the display screen and the dimming screen are in the first alignment state; in a case where the brightness value of the third display line segment is greater than the brightness value of the first display line segment, the brightness value of the second display line segment, the brightness value of the fourth display line segment, and the brightness value of the fifth display line segment, and the brightness value of the second display line segment is equal to the brightness value of the fifth display line segment, the brightness value of the first display line segment is smaller than the brightness value of the second display line segment and is greater than the brightness value of the fourth display line segment, determining that the display screen and dimming screen are in the second alignment state; or, in a case where the brightness value of the first display line segment is greater than the brightness value of the second display line segment, the brightness value of the third display line segment, the brightness value of the fourth display line segment, and the brightness value of the fifth display line segment, and the brightness value of the second display line segment is equal to the brightness value of the fourth display line segment, and the brightness value of the third display line segment is smaller than the brightness value of the second display line segment and is larger than the brightness value of the fifth display line segment, determining that the display screen and the dimming screen are in the third alignment state.

For example, in some embodiments, the first alignment pattern may further include a second part, and the second alignment pattern may further include a fourth part, a fifth part, and a sixth part, the fourth part, the fifth part, and the sixth part are independent of each other. The orthographic projection of the second alignment pattern on the dimming screen being preset to be at least partially aligned with the first alignment pattern and at least partially deviated from the first alignment pattern, further includes: presetting an orthographic projection of the fourth part of the second alignment pattern on the dimming screen to deviate to a first side of the second part of the first alignment pattern in a second alignment direction; presetting an orthographic projection of the fifth part of the second alignment pattern on the dimming screen to be aligned with the second part of the first alignment pattern in the second alignment direction; and presetting an orthographic projection of the sixth part of the second alignment pattern on the dimming screen to deviate to a second side of the second part of the first alignment pattern in the second alignment direction, a direction in which the fourth part of the second alignment pattern deviates from the second part of the first alignment pattern is opposite to a direction in which the sixth part of the second alignment pattern deviates from the second part of the first alignment pattern, and a distance by which the fourth part of the second alignment pattern deviates from the second part of the first alignment pattern is identical with a distance by which the sixth part of the second alignment pattern deviates from the second part of the first alignment pattern; the first side and the second side of the second part of the first alignment pattern are two sides opposite to each other.

In the alignment deviation detection method of the display panel provided by at least one embodiment of the present disclosure, the second part of the first alignment pattern may include a second dimming line segment; the fourth part of the second alignment pattern may include a sixth display line segment, the fifth part of the second alignment pattern may include a seventh display line segment, and the sixth part of the second alignment pattern may include an eighth display line segment.

Figure 8A:
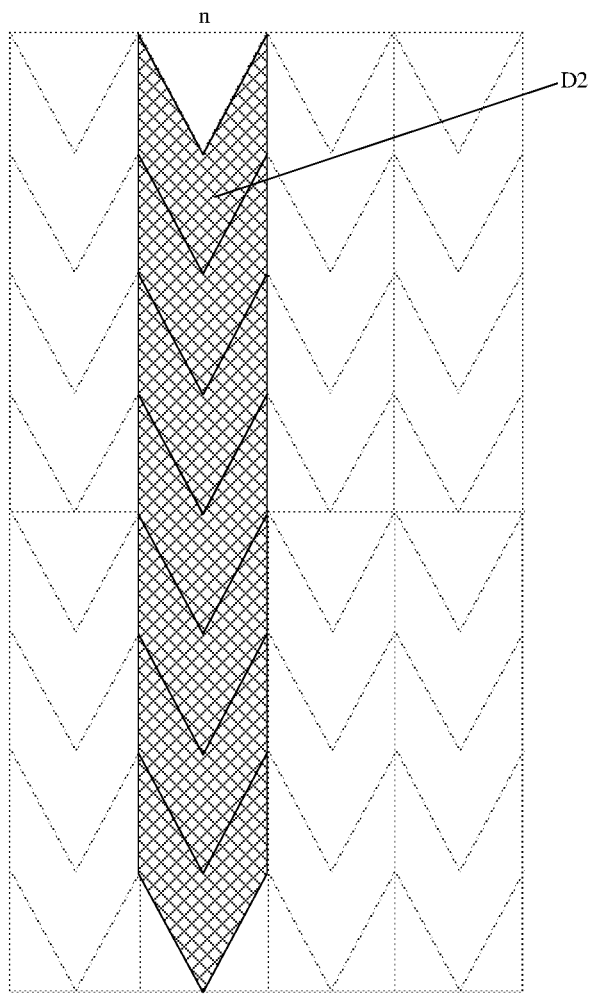
FIG. 8A is another schematic diagram of a first alignment pattern and a second alignment pattern provided by an embodiment of the present disclosure.
Figure 8A:
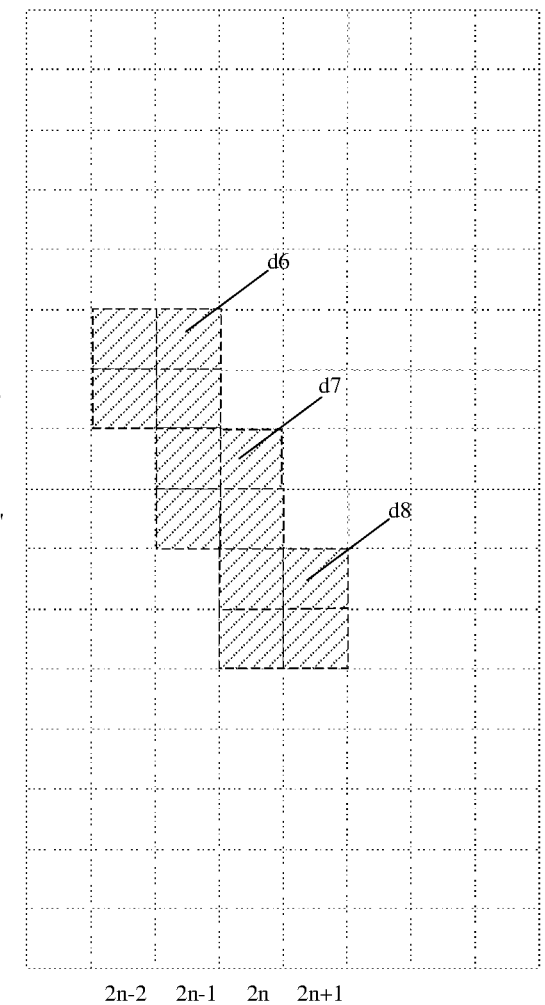

FIG. 8A is another schematic diagram of a first alignment pattern and a second alignment pattern provided by at least one embodiment of the present disclosure.

As shown in FIG. 8A(a), the second part of the first alignment pattern includes a second dimming line segment D2 (equivalent to the straight line segment B1 in FIG. 5A(a)), the second dimming line segment D2 is located at positions of the dimming pixels in the n-th column of the dimming screen 120, where n is a positive integer and $2 \leq n \leq N-1$.

As shown in FIG. 8A(b), the first part of the second alignment pattern includes a sixth display line segment d6 (equivalent to the straight line segment b12 in FIG. 5A(b)), the sixth display line segment d6 is located at positions of display pixels from an mb-th row to an mb'-th row in a $((2*n-2)-\gamma)$-th column and of the display pixels from the mb-th row to the mb'-th row in the $((2*n-1)-\gamma)$-th column of the display screen 110. The second part of the second alignment pattern includes a seventh display line segment d7 (equivalent to the straight line segment b13 in FIG. 5A(b)), the seventh display line segment d7 is located at the position of the display pixels from an mc-th row to an mc'-th row in the $(2*n-1)$-th column and of the display pixels from the mc-th row to the mc'-th row in the $(2*n)$-th column of the display screen 110. The third part of the second alignment pattern includes an eighth display line segment d8 (equivalent to the straight line segment b14 in FIG. 5A(b)), the eighth display line segment d8 is located at the position of display pixels from an md-th row to an md'-th row in the $((2*n)+\gamma)$-th column and of the display pixels from the md-th row to the md'-th row in the $((2*n+1)+\gamma)$-th column of the display screen 110, where $\gamma$ is 0 or 1, mb, mb', mc, mc', md, and md' are positive integers, $1 \leq mb \leq mb' < mc \leq mc' < md \leq md' \leq 2M$.

For example, in the example shown in FIG. 8A(b), $\gamma=0$, mb'=mb+1, mc=mb'+1, mc'=mc+1, md=mc'+1, md'=md+1.

It should be noted that although it is shown in FIG. 8A(a) that the second dimming line segment is located at the positions of the dimming pixels in the n-th column of the dimming screen, that is, the second dimming line segment is continuous and includes all dimming pixels in the n-th column of the dimming screen, the embodiments of the present disclosure are obviously not limited to this, and the second dimming line segment may be disconnected and/or include some dimming pixels in the n-th column of the dimming screen. In addition, although the second dimming line segment shown in FIG. 8A(a) is a straight line segment, the embodiments of the present disclosure are obviously not limited to this, and the second dimming line segment may also be a curve line segment.

It should be noted that although in the embodiment shown in FIG. 8A(a), the second dimming line segment includes one row of dimming pixels, the embodiments of the present disclosure are obviously not limited to this, and the second dimming line segment may also include a plurality of rows of dimming pixels (for example, 5 rows, 50 rows, etc.). Although the sixth display line segment includes two rows and two columns of display pixels in the embodiment shown in FIG. 8A(b), however the present disclosure is not limited to this, the sixth display line segment may also include a plurality of rows (e.g., 10 rows, 100 rows, etc.) and two columns of display pixels, and similarly, the seventh display line segment may also include a plurality of rows (e.g., 10 rows, 100 rows, etc.) and two columns of display pixels, the eighth display line segment may also include a plurality of rows (e.g., 10 rows, 100 rows, etc.) and two columns of display pixels.

Figure 8B:
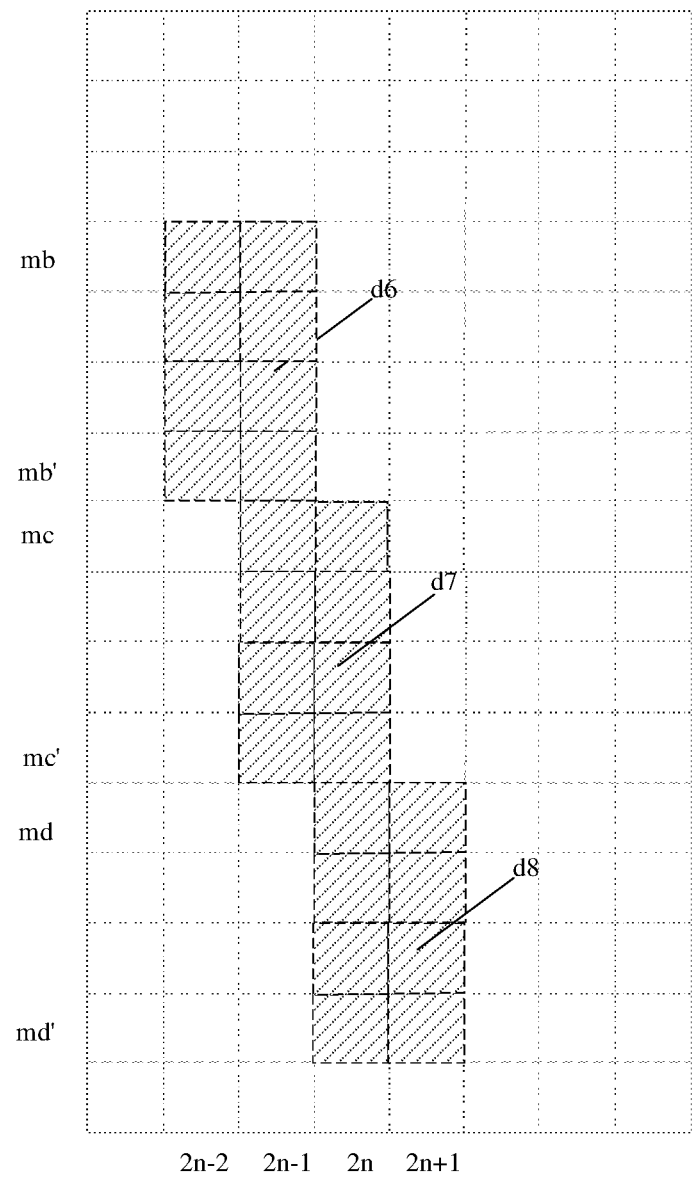
FIG. 8B is another schematic diagram of a second alignment pattern provided by an embodiment of the present disclosure.

FIG. 8B is another schematic diagram of a second alignment pattern provided by at least one embodiment of the present disclosure.

For example, in the example shown in FIG. 8B, $\gamma=0$, mb'=mb+3, mc=mb'+1, mc'=mc+3, md=mc'+1, md'=md+3. In this case, the sixth display line segment includes four rows and two columns of display pixels, similarly, the seventh display line segment d7 includes four rows and two columns of display pixels, and the eighth display line segment d8 includes four rows and two columns of display pixels.

For example, in step S130, under the control of the first data signal, making the dimming screen display the alignment dimming picture, includes: under the control of the first data signal, controlling the dimming pixels in the n-th column of the dimming screen to display the second dimming line segment in the first alignment pattern.

For example, in step S130, under the control of the second data signal, making the display screen display the alignment display picture, includes: under the control of the second data signal, controlling display pixels located in an mb-th row to an mb'-th row of a $((2*n-2)-\gamma)$-th column and in the mb-th row to the mb'-th row of a $((2*n-1)-\gamma)$-th column of the display screen to display the sixth display line segment in the second alignment picture, controlling display pixels located in an mc-th row to an mc'-th row of a $(2*n-1)$-th column and in the mc-th row to the mc'-th row of a $(2*n)$-th column of the display screen to display the seventh display line segment in the second alignment picture, controlling display pixels located in an md-th row to an md'-th row of a $((2*n)+\gamma)$-th column and in the md-th row to the md'-th row of a $((2*n+1)+\gamma)$-th column of the display screen to display the eighth display line segment in the second alignment picture.

Figure 8C:
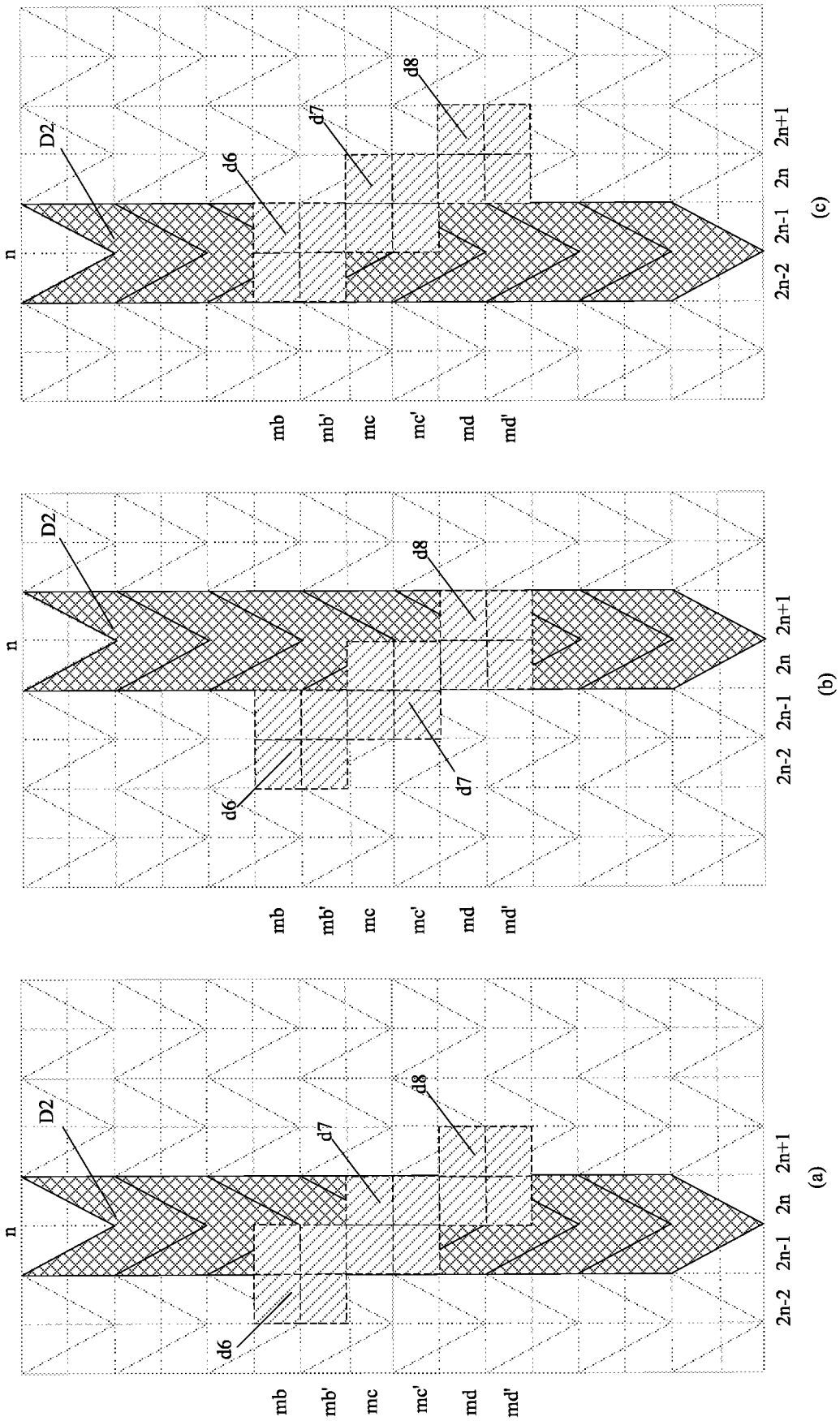
FIG. 8C is a schematic diagram of alignment situations of the first alignment pattern and the second alignment pattern in FIG. 8A in different alignment states.

FIG. 8C is a schematic diagram of alignment situations of the first alignment pattern and the second alignment pattern in FIG. 8A in different alignment states.

As shown in FIG. 8C(a), in a case where the display screen 110 and the dimming screen 120 are in the fourth alignment state, that is, in a case where the alignment between the display screen 110 and the dimming screen 120 in the row direction of the dimming pixels of the dimming screen 120 has no deviation, the orthographic projection of the sixth display line segment d6 on the dimming screen 120 is offset to the left by one column of display pixels relative to the second dimming line segment D2, the orthographic projection of the seventh display line segment d7 on the dimming screen 120 is aligned with the second dimming line segment D2, and the orthographic projection of the eighth display line segment d8 on the dimming screen 120 is offset to the right by one column of display pixels relative to the second dimming line segment D2. In this case, the area of the overlapping region between the orthographic projections of the display pixels included in the seventh display line segment d7 on the dimming screen 120 and the dimming pixels included in the second dimming line segment D2 is greater than the area of the overlapping region between the orthographic projections of the display pixels included in the sixth display line segment d6 or the eighth display line segment d8 on the dimming screen 120 and the dimming pixels included in the second dimming line segment D2, and the area of the overlapping region between the orthographic projections of the display pixels included in the sixth display line segment d6 on the dimming screen 120 and the dimming pixels included in the second dimming line segment D2 is equal to the area of the overlapping region between the orthographic projections of the display pixels included in the eighth display line segment d8 on the dimming screen 120 and the dimming pixels included in the second dimming line segment D2. In this case, the brightness value of the seventh display line segment d7 is greater than that of the sixth display line segment d6 and that of the eighth display line segment d8, and the brightness value of the sixth display line segment d6 is equal to that of the eighth display line segment d8.

As shown in FIG. 8C(b), in a case where the display screen 110 and the dimming screen 120 are in the fifth alignment state, that is, in the row direction of the dimming pixels of the dimming screen 120, in a case where the display screen 110 is offset to the left by one column of display pixels relative to the dimming screen 120, the orthographic projection of the sixth display line segment d6 on the dimming screen 120 is offset to the left by two columns of display pixels relative to the second dimming line segment D2, the orthographic projection of the seventh display line segment d7 on the dimming screen 120 is offset to the left by one column of display pixels relative to the second dimming line segment D2, and the orthographic projection of the eighth display line segment d8 on the dimming screen 120 is aligned with the second dimming line segment D2. In this case, the area of the overlapping region between the orthographic projections of the display pixels included in the eighth display line segment d8 on the dimming screen 120 and the dimming pixels included in the second dimming line segment D2 is greater than the area of the overlapping region between the orthographic projections of the display pixels included in the seventh display line segment d7 on the dimming screen 120 and the dimming pixels included in the second dimming line segment D2, and the area of the overlapping region between the orthographic projections of the display pixels included in the seventh display line segment d7 on the dimming screen 120 and the dimming pixels included in the second dimming line segment D2 is greater than the area of the overlapping region between the orthographic projections of the display pixels included in the sixth display line segment d6 on the dimming screen 120 and the dimming pixels included in the second dimming line segment D2. In this case, the brightness value of the eighth display line segment d8 is greater than that of the seventh display line segment d7, and the brightness value of the seventh display line segment d7 is greater than that of the sixth display line segment d6.

As shown in FIG. 8C(c), in a case where the display screen 110 and the dimming screen 120 are in the sixth alignment state, that is, in the row direction of the dimming pixels of the dimming screen 120, in a case where the display screen 110 is offset to the right by one column of display pixels relative to the dimming screen 120, the orthographic projection of the sixth display line segment d6 on the dimming screen 120 is aligned with the second dimming line segment D2, the orthographic projection of the seventh display line segment d7 on the dimming screen 120 is offset to the right by one column of display pixels relative to the second dimming line segment D2, the orthographic projection of the eighth display line segment d8 on the dimming screen 120 is offset to the right by two columns of display pixels relative to the second dimming line segment D2. In this case, the area of the overlapping region between the orthographic projections of the display pixels included in the sixth display line segment d6 on the dimming screen 120 and the dimming pixels included in the second dimming line segment D2 is greater than the area of the overlapping region between the orthographic projections of the display pixels included in the seventh display line segment d7 on the dimming screen 120 and the dimming pixels included in the second dimming line segment D2, and the area of the overlapping region between the orthographic projections of the display pixels included in the seventh display line segment d7 on the dimming screen 120 and the dimming pixels included in the second dimming line segment D2 is greater than the area of the overlapping region between the orthographic projections of the display pixels included in the eighth display line segment d8 on the dimming screen 120 and the dimming pixels included in the second dimming line segment D2. In this case, the brightness value of the sixth display line segment d6 is greater than that of the seventh display line segment d7, and the brightness value of the seventh display line segment d7 is greater than that of the eighth display line segment d8.

Figure 9A:
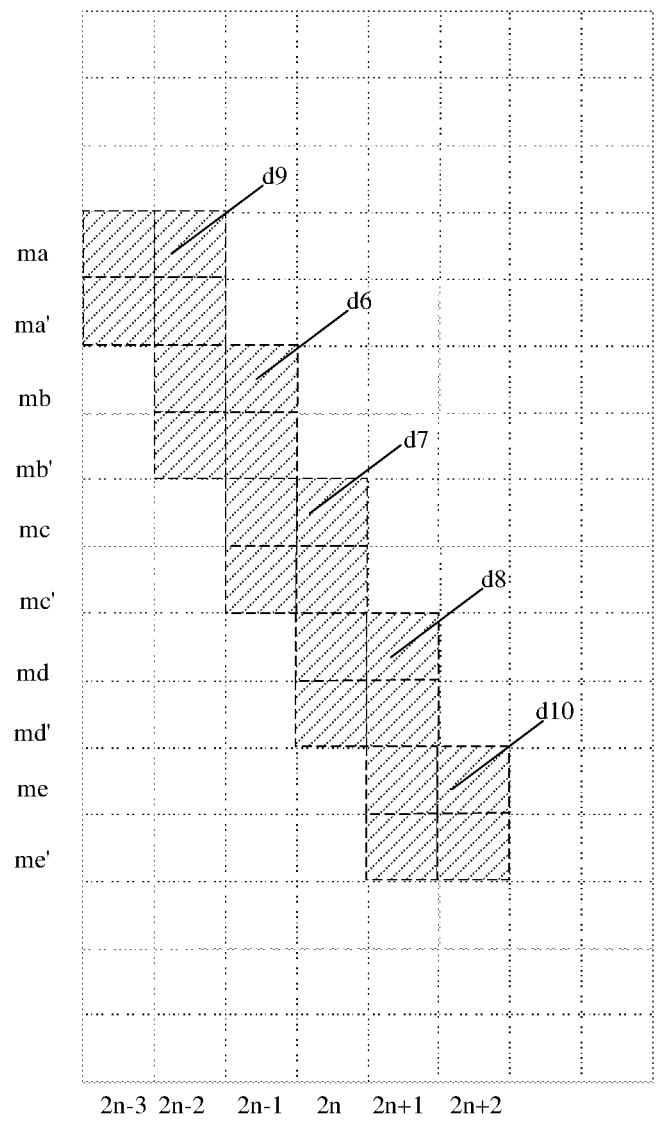
FIG. 9A is another schematic diagram of a second alignment pattern provided by an embodiment of the present disclosure.
Figure 9B:
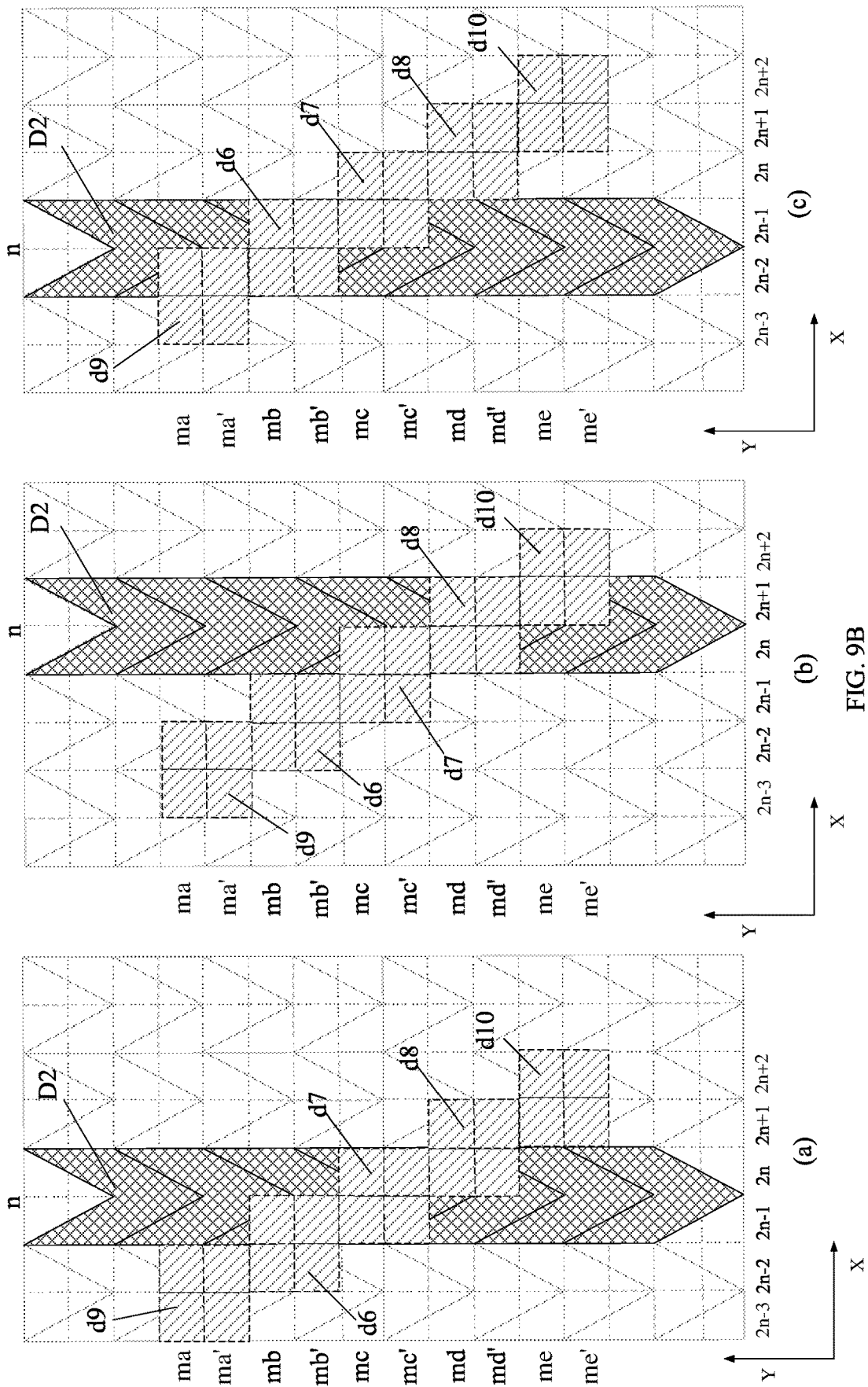
FIG. 9B is a schematic diagram of alignment situations of the first alignment pattern in FIG. 8A and the second alignment pattern in FIG. 9A in different alignment states.

According to at least one embodiment of the present disclosure, referring to FIG. 9B, when γ=0, the brightness situations of the sixth display line segment, the seventh display line segment, and the eighth display line segment in the second alignment pattern in different alignment states are specifically explained, and the situations when γ takes other values are similar to this and will not be described again. For example, when γ=1, in a case where the display screen 110 and the dimming screen 120 are in the fourth alignment state, the brightness value of the seventh display line segment d7 is greater than the brightness value of the sixth display line segment d6 and the brightness value of the eighth display line segment d8, and the brightness value of the sixth display line segment d6 is equal to that of the eighth display line segment d8; in a case where the display screen 110 and the dimming screen 120 are in the fifth alignment state, the brightness value of the seventh display line segment d7 is equal to that of the eighth display line segment d8, and the brightness value of the seventh display line segment d7 is greater than that of the sixth display line segment d6; in a case where the display screen 110 and the dimming screen 120 are in the sixth alignment state, the brightness value of the sixth display line segment d6 is equal to that of the seventh display line segment d7, and the brightness value of the seventh display line segment d7 is greater than that of the eighth display line segment d8.

It should be noted that in the alignment deviation detection method of the display panel provided by at least one embodiment of the present disclosure, as shown in FIG. 8C, the orthographic projection of the sixth display line segment on the dimming screen being aligned with the second dimming line segment in the row direction of the dimming pixels of the dimming screen means that the orthographic projection of the sixth display line segment on the dimming screen coincides with the second dimming line segment. The orthographic projection of the sixth display line segment on the dimming screen being offset to the left by one column of display pixels relative to the second dimming line segment in the row direction of the dimming pixels of the dimming screen means that the orthographic projection of the sixth display line segment on the dimming screen falls in the region that is offset to the left by one column of display pixels relative to the middle of the second dimming line segment. The orthographic projection of the sixth display line segment on the dimming screen being offset to the left by two columns of display pixels relative to the second dimming line segment in the row direction of the dimming pixels of the dimming screen means that the orthographic projection of the sixth display line segment on the dimming screen falls in the region that is offset to the left by two columns of display pixels relative to the middle of the second dimming line segment. The orthographic projection of the seventh display line segment on the dimming screen being aligned with the second dimming line segment means that the orthographic projection of the seventh display line segment on the dimming screen coincides with the second dimming line segment. The orthographic projection of the seventh display line segment on the dimming screen being offset to the left by one column of display pixels relative to the second dimming line segment means that the orthographic projection of the seventh display line segment on the dimming screen falls in the region that is offset to the left by one column of display pixels relative to the middle of the second dimming line segment. The orthographic projection of the seventh display line segment on the dimming screen being offset to the right by one column of display pixels relative to the second dimming line segment means that the orthographic projection of the seventh display line segment on the dimming screen falls in the region that is offset to the right by one column of display pixels relative to the middle of the second dimming line segment. The orthographic projection of the eighth display line segment on the dimming screen being aligned with the second dimming line segment means that the orthographic projection of the eighth display line segment on the dimming screen coincides with the second dimming line segment. The orthographic projection of the eighth display line segment on the dimming screen being offset to the right by one column of display pixels relative to the second dimming line segment means that the orthographic projection of the eighth display line segment on the dimming screen falls in the region that is offset to the right by one column of display pixels relative to the middle of the second dimming line segment. The orthographic projection of the eighth display line segment on the dimming screen being offset to the right by two columns of display pixels relative to the second dimming line segment means that the orthographic projection of the eighth display line segment on the dimming screen falls in the region that is offset to the right by two column of display pixels relative to the middle of the second dimming line segment.

It is should be noted that "being offset to the left" means deviating to a direction of the sixth display line segment d6 away from the seventh display line segment d7 in the X direction, and "being offset to the right" means deviating to a direction of the sixth display line segment d6 close to the seventh display line segment d7 in the X direction.

In addition, it should be noted that, in the alignment deviation detection method of the display panel provided in at least one embodiment of the present disclosure, the brightness of the sixth display line segment refers to the average brightness value of respective display pixels included in the sixth display line segment, the brightness of the seventh display line segment refers to the average brightness value of respective display pixels included in the seventh display line segment, the brightness of the eighth display line segment refers to the average brightness value of respective display pixels included in the eighth display line segment.

For example, in step S140, according to the display situation of the second alignment pattern, determining the alignment state between the display screen and the dimming screen, includes: in a case where the brightness value of the seventh display line segment is greater than the brightness value of the sixth display line segment and the brightness value of the eighth display line segment, and the brightness value of the sixth display line segment is equal to the brightness value of the eighth display line segment, determining that the display screen and the dimming screen are in the fourth alignment state; in a case where the brightness value of the eighth display line segment is greater than the brightness value of the seventh display line segment, and the brightness value of the seventh display line segment is greater than the brightness value of the sixth display line segment, determining that the display screen and the dimming screen are in the fifth alignment state; or, in a case where the brightness value of the sixth display line segment is greater than the brightness value of the seventh display line segment, and the brightness value of the seventh display line segment is greater than the brightness value of the eighth display line segment, determining that the display screen and the dimming screen are in the sixth alignment state.

For example, in some embodiments of the present disclosure, the fourth part of the second alignment pattern may further include a ninth display line segment, and the sixth part of the second alignment pattern may further include a tenth display line segment.

FIG. 9A is another schematic diagram of a second alignment pattern provided by at least one embodiment of the present disclosure.

As shown in FIG. 9A, the fourth part of the second alignment pattern also includes a ninth display line segment d9 (equivalent to the straight line segment b11 in FIG. 5A(b)), the ninth display line segment d9 is located at positions of display pixels from an ma-th row to an ma'-th row in a $((2*n-3)-\gamma)$-th column and of display pixels from the ma-th row to the ma'-th row in a $((2*n-2)-\gamma)$-th column of the display screen 110. The sixth part of the second alignment pattern also includes a tenth display line segment d10 (equivalent to the straight line segment b15 in FIG. 5A(b)), the tenth display line segment d10 is located at positions of display pixels from an me-th row to an me'-th row in a $((2*n+1)+\gamma)$-th column and of display pixels from the me-th row to the me'-th row in a $((2*n+2)+\gamma)$-th column of the display screen 110, where ma, ma', me, and me' are positive integers, $\gamma$ is 0 or 1, $1 \leq ma \leq ma' < mb \leq mb' < mc \leq mc' < md \leq md' < me \leq me' \leq 2M$.

For example, in the example shown in FIG. 9A, $\gamma=0$, ma'=ma+1, mb=ma'+1, mb'=mb+1, mc=mb'+1, mc'=mc+1, md=mc'+1, md'=md+1, me=md'+1, me'=me+1. It should be noted that in the embodiment shown in FIG. 9A, the sixth display line segment includes two rows and two columns of display pixels, but the present disclosure is not limited to this, the sixth display line segment may also include a plurality of rows (e.g., 10 rows, 100 rows, etc.) and two columns of display pixels, and similarly, the second display line segment may also include a plurality of rows (e.g., 10 rows, 100 rows, etc.) and two columns of display pixels, the third display line segment may also include a plurality of rows (e.g., 10 rows, 100 rows, etc.) and two columns of display pixels, the fourth display line segment may also include a plurality of rows (e.g., 10 rows, 100 rows, etc.) and two columns, and the fifth display line segment may also include a plurality of rows (e.g., 10 rows, 100 rows, etc.) and two columns.

For example, in step S130, under the control of the second data signal, making the display screen display the alignment display picture, further comprises: under the control of the second data signal, controlling display pixels located in an ma-th row to an ma'-th row of a $((2*n-3)-\gamma)$-th column and in the ma-th row to the ma'-th row of a $((2*n-2)-\gamma)$-th column of the display screen to display the ninth display line segment in the second alignment pattern, and controlling display pixels located in an me-th row to an me'-th row of a $((2*n+1)+\gamma)$-th column and in the me-th row to the me'-th row of a $((2*n+2)+\gamma)$-th column of the display screen to display the tenth display line segment in the second alignment pattern.

FIG. 9B is a schematic diagram of alignment situations of the first alignment pattern in FIG. 8A and the second alignment pattern in FIG. 9A in different alignment states.

As shown in FIG. 9B(a), in a case where the display screen 110 and the dimming screen 120 are in the fourth alignment state, that is, in a case where the alignment between the display screen 110 and the dimming screen 120 in the row direction of the dimming pixels of the dimming screen 120 has no deviation, the orthographic projection of the ninth display line segment d9 on the dimming screen 120 is offset to the left by two columns of display pixels relative to the second dimming line segment D2, and the orthographic projection of the tenth display line segment d10 on the dimming screen 120 is offset to the right by two columns of display pixels relative to the second dimming line segment D2. In this case, the area of the overlapping region between the orthographic projections of the display pixels included in the seventh display line segment d7 on the dimming screen 120 and the dimming pixels included in the second dimming line segment D2 is greater than the area of the overlapping region between the orthographic projections of the display pixels included in the sixth display line segment d6, the eighth display line segment d8, the ninth display line segment d9, or the tenth display line segment d10 on the dimming screen 120 and the dimming pixels included in the second dimming line segment D2, the area of the overlapping region between the orthographic projections of the display pixels included in the sixth display line segment d6 on the dimming screen 120 and the dimming pixels included in the second dimming line segment D2 is equal to the area of the overlapping region between the orthographic projections of the display pixels included in the eighth display line segment d8 on the dimming screen 120 and the dimming pixels included in the second dimming line segment D2, the area of the overlapping region between the orthographic projections of the display pixels included in the ninth display line segment d9 on the dimming screen 120 and the dimming pixels included in the second dimming line segment D2 is equal to the area of the overlapping region between the orthographic projections of the display pixels included in the tenth display line segment d10 on the dimming screen 120 and the dimming pixels included in the second dimming line segment D2, and the area of the overlapping region between the orthographic projections of the display pixels included in the sixth display line segment d6 on the dimming screen 120 and the dimming pixels included in the second dimming line segment D2 is greater than the area of the overlapping region between the orthographic projections of the display pixels included in the ninth display line segment d9 on the dimming screen 120 and the dimming pixels included in the second dimming line segment D2. In this case, the brightness value of the seventh display line segment d7 is greater than the brightness value of the sixth display line segment d6, the brightness value of the eighth display line segment d8, the brightness value of the ninth display line segment d9, and the brightness value of the tenth display line segment d10, the brightness value of the sixth display line segment d6 is equal to that of the eighth display line segment d8, the brightness value of the ninth display line segment d9 is equal to that of the tenth display line segment d10, and the brightness value of the sixth display line segment d6 is greater than that of the ninth display line segment d9.

As shown in FIG. 9B(b), in a case where the display screen 110 and the dimming screen 120 are in the fifth alignment state, that is, in the row direction of the dimming pixels of the dimming screen 120, in a case where the display screen 110 is offset to the left by one column of display pixels relative to the dimming screen 120, the orthographic projection of the ninth display line segment d9 on the dimming screen 120 is offset to the left by three columns of display pixels relative to the second dimming line segment D2, and the orthographic projection of the tenth display line segment d10 on the dimming screen 120 is offset to the right by one column of display pixels relative to the second dimming line segment D2. In this case, the area of the overlapping region between the orthographic projections of the display pixels included in the eighth display line segment d8 on the dimming screen 120 and the dimming pixels included in the second dimming line segment D2 is greater than the area of the overlapping region between the orthographic projections of the display pixels included in the sixth display line segment d6, the seventh display line segment d7, the ninth display line segment d9, or the tenth display line segment d10 on the dimming screen 120 and the dimming pixels included in the second dimming line segment D2, the area of the overlapping region between the orthographic projections of the display pixels included in the seventh display line segment d7 on the dimming screen 120 and the dimming pixels included in the second dimming line segment D2 is equal to the area of the overlapping region between the orthographic projections of the display pixels included in the tenth display line segment d10 on the dimming screen 120 and the dimming pixels included in the second dimming line segment D2, the area of the overlapping region between the orthographic projections of the display pixels included in the seventh display line segment d7 on the dimming screen 120 and the dimming pixels included in the second dimming line segment D2 is greater than the area of the overlapping region between the orthographic projections of the display pixels included in the sixth display line segment d6 on the dimming screen 120 and the dimming pixels included in the second dimming line segment D2, and the area of the overlapping region between the orthographic projections of the display pixels included in the sixth display line segment d6 on the dimming screen 120 and the dimming pixels included in the second dimming line segment D2 is equal to the area of the overlapping region between the orthographic projections of the display pixels included in the ninth display line segment d9 on the dimming screen 120 and the dimming pixels included in the second dimming line segment D2. In this case, the brightness value of the eighth display line segment d8 is greater than the brightness value of the sixth display line segment d6, the brightness value of the seventh display line segment d7, the brightness value of the ninth display line segment d9, and the brightness value of the tenth display line segment d10, the brightness value of the seventh display line segment d7 is equal to that of the tenth display line segment d10, the brightness value of the sixth display line segment d6 is smaller than that of the seventh display line segment d7 and is equal to that of the ninth display line segment d9.

As shown in FIG. 9B(c), in a case where the display screen 110 and the dimming screen 120 are in the sixth alignment state, that is, in the row direction of the dimming pixels of the dimming screen 120, in a case where the display screen 110 is offset to the right by one column of display pixels relative to the dimming screen 120, the orthographic projection of the ninth display line segment d9 on the dimming screen 120 is offset to the left by one column of display pixels relative to the second dimming line segment D2, and the orthographic projection of the fifth display line segment d5 on the dimming screen 120 is offset to the right by three columns of display pixels relative to the second dimming line segment D2. In this case, the area of the overlapping region between the orthographic projections of the display pixels included in the sixth display line segment d6 on the dimming screen 120 and the dimming pixels included in the second dimming line segment D2 is greater than the area of the overlapping region between the orthographic projections of the display pixels included in the seventh display line segment d7, the eighth display line segment d8, the ninth display line segment d9, or the tenth display line segment d10 on the dimming screen 120 and the dimming pixels included in the second dimming line segment D2, the area of the overlapping region between the orthographic projections of the display pixels included in the seventh display line segment d7 on the dimming screen 120 and the dimming pixels included in the second dimming line segment D2 is equal to the area of the overlapping region between the orthographic projections of the display pixels included in the ninth display line segment d9 on the dimming screen 120 and the dimming pixels included in the second dimming line segment D2, the area of the overlapping region between the orthographic projections of the display pixels included in the seventh display line segment d7 on the dimming screen 120 and the dimming pixels included in the second dimming line segment D2 is greater than the area of the overlapping region between the orthographic projections of the display pixels included in the eighth display line segment d8 on the dimming screen 120 and the dimming pixels included in the second dimming line segment D2, and the area of the overlapping region between the orthographic projections of the display pixels included in the eighth display line segment d8 on the dimming screen 120 and the dimming pixels included in the second dimming line segment D2 is equal to the area of the overlapping region between the orthographic projections of the display pixels included in the tenth display line segment d10 on the dimming screen 120 and the dimming pixels included in the second dimming line segment D2. In this case, the brightness value of the sixth display line segment d6 is greater than the brightness value of the seventh display line segment d7, the brightness value of the eighth display line segment d8, the brightness value of the ninth display line segment d9, and the brightness value of the tenth display line segment d10, the brightness value of the seventh display line segment d7 is equal to that of the ninth display line segment d9, the brightness value of the eighth display line segment d8 is smaller than that of the seventh display line segment d7 and is equal to that of the tenth display line segment d10.

According to at least one embodiment of the present disclosure, referring to FIG. 9B, when γ=0, the brightness situations of the sixth display line segment, the seventh display line segment, the eighth display line segment, the ninth display line segment, and the tenth display line segment in the second alignment pattern in different alignment states are specifically described, and the situations when γ takes other values are similar and will not be described again. When γ=1, in a case where the display screen 110 and the dimming screen 120 are in the fourth alignment state, the brightness value of the seventh display line segment d7 is greater than the brightness value of the sixth display line segment d6, the brightness value of the eighth display line segment d8, the brightness value of the ninth display line segment d9, and the brightness value of the tenth display line segment d10, and the brightness value of the sixth display line segment d6 is equal to the brightness value of the eighth display line segment d8, the brightness value of the ninth display line segment d9, and the brightness value of the tenth display line segment d10; in a case where the display screen 110 and the dimming screen 120 are in the fifth alignment state, the brightness value of the seventh display line segment d7 is equal to that of the eighth display line segment d8, the brightness value of the seventh display line segment d7 is greater than the brightness value of the sixth display line segment d6, the brightness value of the ninth display line segment d9, and the brightness value of the tenth display line segment d10, and the brightness value of the sixth display line segment d6 is equal to the brightness value of the ninth display line segment d9 and the brightness value of the tenth display line segment d10; in a case where the display screen 110 and the dimming screen 120 are in the sixth alignment state, the brightness value of the sixth display line segment d6 is equal to that of the seventh display line segment d7, the brightness value of the seventh display line segment d7 is greater than the brightness value of the eighth display line segment d8, the brightness value of the ninth display line segment d9, and the brightness value of the tenth display line segment d10, and the brightness value of the eighth display line segment d8 is equal to the brightness value of the ninth display line segment d9 and the brightness value of the tenth display line segment d10.

It should be noted that in the alignment deviation detection method of the display panel provided by at least one embodiment of the present disclosure, as shown in FIG. 9B, in the row direction of the dimming pixels of the dimming screen, the orthographic projection of the ninth display line segment on the dimming screen being offset to the left by one column of display pixels relative to the second dimming line segment means that the orthographic projection of the ninth display line segment on the dimming screen falls in the region that is offset to the left by one column of display pixels relative to the middle of the second dimming line segment. The orthographic projection of the ninth display line segment on the dimming screen being offset to the left by two columns of display pixels relative to the second dimming line segment means that the orthographic projection of the ninth display line segment on the dimming screen falls in the region that is offset to the left by two columns of display pixels relative to the middle of the second dimming line segment. The orthographic projection of the ninth display line segment on the dimming screen being offset to the left by three columns of display pixels relative to the second dimming line segment means that the orthographic projection of the ninth display line segment on the dimming screen falls in the region that is offset to the left by three columns of display pixels relative to the middle of the second dimming line segment. The orthographic projection of the tenth display line segment on the dimming screen being offset to the right by one column of display pixels relative to the second dimming line segment means that the orthographic projection of the tenth display line segment on the dimming screen falls in the region that is offset to the right by one column of display pixels relative to the middle of the second dimming line segment. The orthographic projection of the tenth display line segment on the dimming screen being offset to the right by two columns of display pixels relative to the second dimming line segment means that the orthographic projection of the tenth display line segment on the dimming screen falls in the region that is offset to the right by two columns of display pixels relative to the middle of the second dimming line segment. The orthographic projection of the tenth display line segment on the dimming screen being offset to the right by three columns of display pixels relative to the second dimming line segment means that the orthographic projection of the tenth display line segment on the dimming screen falls in the region that is offset to the right by three columns of display pixels relative to the middle of the second dimming line segment.

In addition, it should be noted that, in the alignment deviation detection method of the display panel provided in at least one embodiment of the present disclosure, the brightness of the ninth display line segment refers to the average brightness value of respective display pixels occupied by the ninth display line segment, and the brightness of the tenth display line segment refers to the average brightness value of respective display pixels occupied by the tenth display line segment.

For example, in step S140, according to the display situation of the second alignment pattern, determining the alignment state between the display screen and the dimming screen, includes: in a case where the brightness value of the seventh display line segment is greater than the brightness value of the sixth display line segment, the brightness value of the eighth display line segment, the brightness value of the ninth display line segment, and the brightness value of the tenth display line segment, the brightness value of the sixth display line segment is equal to the brightness value of the eighth display line segment, the brightness value of the ninth display line segment is equal to the brightness value of the tenth display line segment, and the brightness value of the sixth display line segment is greater than the brightness value of the ninth display line segment, determining that the display screen and the dimming screen are in the fourth alignment state; in a case where the brightness value of the eighth display line segment is greater than the brightness value of the sixth display line segment, the brightness value of the seventh display line segment, the brightness value of the ninth display line segment, and the brightness value of the tenth display line segment, the brightness value of the seventh display line segment is equal to the brightness value of the tenth display line segment, and the brightness value of the sixth display line segment is smaller than the brightness value of the seventh display line segment and is greater than the brightness value of the ninth display line segment, determining that the display screen and dimming screen are in the fifth alignment state; or, in a case where the brightness value of the sixth display line segment is greater than the brightness value of the seventh display line segment, the brightness value of the eighth display line segment, the brightness value of the ninth display line segment, and the brightness value of the tenth display line segment, the brightness value of the seventh display line segment is equal to the brightness value of the ninth display line segment, and the brightness value of the eighth display line segment is smaller than the brightness value of the seventh display line segment and is greater than the brightness value of the tenth display line segment, determining that the display screen and the dimming screen are in the sixth alignment state.

At least one embodiment of the present disclosure also provides a data compensation method for a display panel. Referring to FIG. 1, the display panel comprises a dimming screen and a display screen, and the dimming screen is provided on a backlight side of the display screen and is configured to perform backlight modulation on the display screen, the dimming screen includes a plurality of dimming pixels and the display screen includes a plurality of display pixels. The method comprises: determining an alignment state between the display screen and the dimming screen; acquiring an image signal of an input image to be displayed; according to the alignment state between the display screen and the dimming screen, determining, based on the image signal, dimming pixel data of a dimming picture to be displayed on the dimming screen; according to the alignment state between the display screen and the dimming screen, determining, based on the image signal and the dimming pixel data of the dimming picture, display pixel data of a display picture to be displayed on the display screen. For example, the alignment state between the display screen and the dimming screen is determined according to the alignment deviation detection method described in any of the above embodiments.

Figure 10:
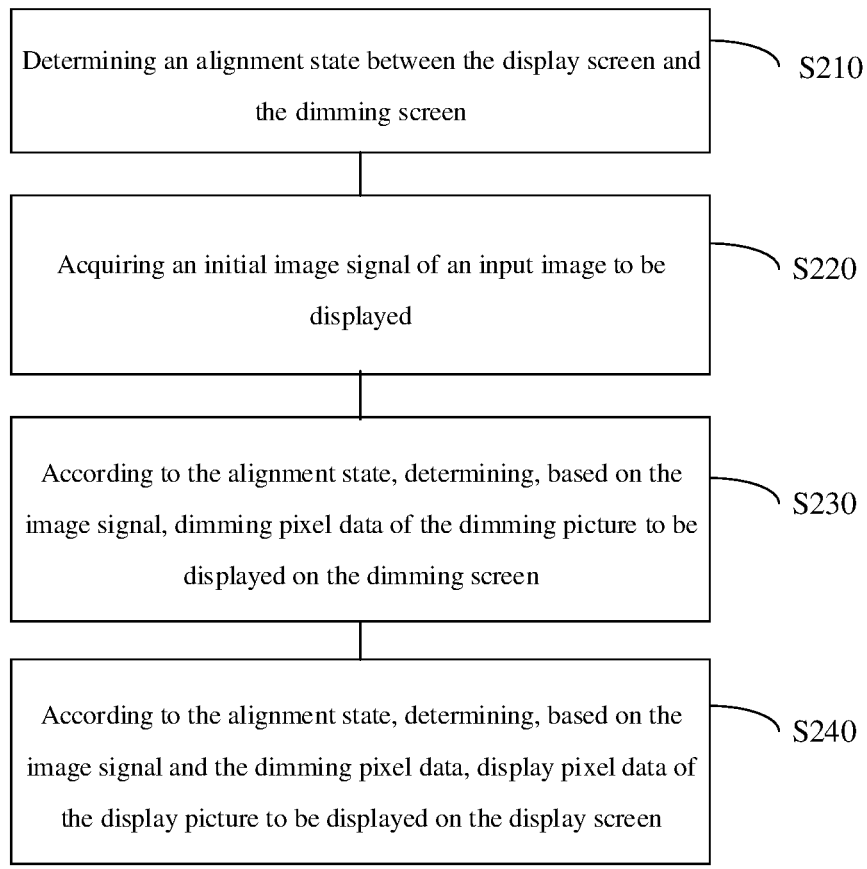
FIG. 10 is a flowchart of a data compensation method for a display panel provided by an embodiment of the present disclosure.

FIG. 10 is a flowchart of a data compensation method for a display panel provided by an embodiment of the present disclosure. As shown in FIG. 10, the data compensation method for the display panel may include the following steps:

Step S210: determining an alignment state between the display screen 110 and the dimming screen 120.

Step S220: acquiring an image signal of an input image to be displayed.

Step S230: according to the alignment state between the display screen 110 and the dimming screen 120, determining, based on the image signal, dimming pixel data of the dimming picture to be displayed on the dimming screen 120.

Step S240: according to the alignment state between the display screen 110 and the dimming screen 120, determining, based on the image signal and the dimming pixel data of the dimming screen, display pixel data of the display picture to be displayed on the display screen 110.

For example, in step S210, the alignment state between the display screen 110 and the dimming screen 120 may be determined by using the alignment deviation detection method of the display panel provided in the above embodiment.

For example, step S230 includes the following steps:

S231: according to a pixel corresponding relationship between the image signal of the input image and the display screen 110, determining initial pixel data corresponding to each display pixel of the display screen 110 in the image signal;

S232: according to the alignment state between the display screen 110 and the dimming screen 120, determining a pixel corresponding relationship between the display screen 110 and the dimming screen 120 in physical position;

S233: according to the pixel corresponding relationship between the display screen 110 and the dimming screen 120 in physical position, determining one or more display pixels of the display screen 110 corresponding to a dimming pixel of the dimming screen 120 in physical position;

S234: based on initial pixel data corresponding to each of the one or more display pixels, determining dimming pixel data of the dimming pixel of the dimming screen 120 corresponding to the one or more display pixels in physical position.

For example, step 234 includes: in some alignment states, for one dimming pixel of the dimming screen 120 corresponding to one display pixel of the display screen 110 in physical position, taking initial pixel data corresponding to the one display pixel of the display screen 110 as dimming pixel data of the one dimming pixel of the dimming screen 120 corresponding to the one display pixel of the display screen 110 in physical position; in some alignment states, for one dimming pixel of the dimming screen 120 corresponding to a plurality of display pixels of the display screen 110 in physical position, selecting a maximum value among initial pixel data corresponding to each of the plurality of display pixels of the display screen 110 as dimming pixel data of the one dimming pixel of the dimming screen 120 corresponding to the plurality of display pixels of the display screen 110 in physical position.

For example, when there is no alignment deviation between the display screen 110 and the dimming screen 120, one dimming pixel of the dimming screen 120 may correspond to four display pixels of the display screen 110 in physical position; when there is an alignment deviation between the display screen 110 and the dimming screen 120, one dimming pixel of the dimming screen 120 may correspond to one, two, or four display pixels of the display screen 110 in physical position.

For example, step S240 includes: in some alignment states, for one or more display pixels, which do not correspond to any dimming pixel of the dimming screen 120 in physical position, of the display screen 110, taking initial pixel data corresponding to each of the one or more display pixels of the display screen 110 as display pixel data of the one or more display pixels of the display screen 110; in some alignment states, for one or more display pixels of the display screen 110 corresponding to one dimming pixel of the dimming screen 120 in physical position, determining display pixel data of one or more display pixels of the display screen 110 based on initial pixel data corresponding to each of the one or more display pixels of the display screen 110 and dimming pixel data of one dimming pixel of the dimming screen 120 corresponding to the one or more display pixels of the display screen 110 in physical position.

For example, when there is no alignment deviation between the display screen 110 and the dimming screen 120, in physical position, a dimming pixel of the dimming screen 120 corresponding to each display pixel of the display screen 110 exists. When there is an alignment deviation between the display screen 110 and the dimming screen 120, in physical position, there may be no dimming pixel of the dimming screen 120 corresponding to one or some display pixels of the display screen 110, that is, some display pixels on the display screen 110 do not correspond to any dimming pixel on the dimming screen 120 in physical position. It should be noted that "the dimming pixel corresponds to the display pixel in physical position" means that the dimming pixel can perform backlight modulation on the display pixel.

For example, in step S240, in some alignment states, in physical position, in a case where the dimming pixel of the dimming screen 120 corresponding to one or more display pixels of the display screen 110 exists, the display pixel data of one or more display pixels of the display screen 110 may be calculated according to the following formula:

$$Main=h(f(In)*g(Sub))$$

where Main represents the display pixel data of the one or more display pixels of the display screen, Sub represents the dimming pixel data of the one dimming pixel of the dimming screen corresponding to the one or more display pixels of the display screen in physical position, In represents initial pixel data corresponding to the one or more display pixels of the display screen, and $h(x)=x^{1/2.2}$, $f(x)=x^{2.2}$, and $g(x)=x^{-1}$.

Next, in a case that the display screen 110 and the dimming screen 120 are in various alignment states, the methods for determining the dimming pixel data of each dimming pixel of the dimming screen 120 are summarized.

When the display screen 110 and the dimming screen 120 are in the first alignment state and in the fourth alignment state, each dimming pixel data of the dimming screen 120 is determined according to the following formula:

$$Sub(j,k)=Max(In(2j-1:2j,2k-1:2k)), \text{ where } 1 \leq j \leq M, 1 \leq k \leq N.$$

In the above formula, Sub(j,k) represents the dimming pixel data of the dimming pixel in the j-th row and k-th column of the dimming screen 120, and In(2j−1:2j, 2k−1:2k) represents the initial pixel data corresponding to the display pixels located in the (2k−1)-th column to the 2k-th column of the (2j−1)-th row and in the (2k−1)-th column to the 2k-th column of the (2j)-th row of the display screen 110. The meanings of Sub and In in the following formulas are similar, which will not be repeated again.

When the display screen 110 and the dimming screen 120 are in the second alignment state and in the fourth alignment state, the dimming pixel data of the dimming screen 120 is determined according to the following formula:

$$Sub(j,k)=Max(In(2j:2j+1,2k-1:2k)), \text{ where } 1\le j\le M-1, 1\le k\le N;$$

$$Sub(j,k)=Max(In(2j,2k-1:2k)), \text{ where } j=M, 1\le k\le N.$$

When the display screen 110 and the dimming screen 120 are in the third alignment state and in the fourth alignment state, the dimming pixel data of the dimming screen 120 is determined according to the following formula:

$$Sub(j,k)=Max(In(j,2k-1:2k)), \text{ where } j=1, 1\le k\le N;$$

$$Sub(j,k)=Max(In(2j-2:2j-1,2k-1:2k)), \text{ where } 2\le j\le M, 1\le k\le N.$$

When the display screen 110 and the dimming screen 120 are in the first alignment state and in the fifth alignment state, the dimming pixel data of the dimming screen 120 is determined according to the following formula:

$$Sub(j,k)=Max(In(2j-1:2j,2k:2k+1)), \text{ where } 1\le j\le M, 1\le k\le N-1;$$

$$Sub(j,k)=Max(In(2j-1:2j,2k)), \text{ where } 1\le j\le M-1, k=N.$$

When the display screen 110 and the dimming screen 120 are in the first alignment state and in the sixth alignment state, the dimming pixel data of the dimming screen 120 is determined according to the following formula:

$$Sub(j,k)=Max(In(2j-1:2j,k)), \text{ where } 1\le j\le M-1, k=1;$$

$$Sub(j,k)=Max(In(2j-1:2j,2k-2:2k-1)), \text{ where } 1\le j\le M-1, 2\le k\le N.$$

When the display screen 110 and the dimming screen 120 are in the second alignment state and in the fifth alignment state, the dimming pixel data of the dimming screen 120 is determined according to the following formula:

$$Sub(j,k)=Max(In(2j:2j+1,2k:2k+1)), \text{ where } 1\le j\le M-1, 1\le k\le N-1;$$

$$Sub(j,k)=Max(In(2j,2k:2k+1)), \text{ where } j=M, 1\le k\le N-1;$$

$$Sub(j,k)=Max(In(2j:2j+1,2k)), \text{ where } 1\le j\le M-1, k=N;$$

$$Sub(j,k)=In(2j,2k), \text{ where } j=M, k=N.$$

When the display screen 110 and the dimming screen 120 are in the second alignment state and in the sixth alignment state, the dimming pixel data of the dimming screen 120 is determined according to the following formula:

$$Sub(j,k)=Max(In(2j:2j+1,2k-2:2k-1)), \text{ where } 1\le j\le M-1, 2\le k\le N;$$

$$Sub(j,k)=Max(In(2j,2k-2:2k-1)), \text{ where } j=M, 2\le k\le N;$$

$$Sub(j,k)=Max(In(2j:2j+1,k)), \text{ where } 1\le j\le M-1, k=1;$$

$$Sub(j,k)=In(2j,k), \text{ where } j=M, k=1.$$

When the display screen 110 and the dimming screen 120 are in the third alignment state and in the fifth alignment state, the dimming pixel data of the dimming screen 120 is determined according to the following formula:

$$Sub(j,k)=Max(In(2j-2:2j-1,2k:2k+1)), \text{ where } 2\le j\le M, 1\le k\le N-1;$$

$$Sub(j,k)=Max(In(j,2k:2k+1)), \text{ where } j=1, 1\le k\le N-1;$$

$$Sub(j,k)=Max(In(2j-2:2j-1,2k)), \text{ where } 2\le j\le M, k=N;$$

$$Sub(j,k)=In(j,2k), \text{ where } j=1, k=N.$$

When the display screen 110 and the dimming screen 120 are in the third alignment state and in the sixth alignment state, the dimming pixel data of the dimming screen 120 is determined according to the following formula:

$$Sub(j,k)=Max(In(2j-2:2j-1,2k-2:2k-1)), \text{ where } 2\le j\le M, 2\le k\le N;$$

$$Sub(j,k)=Max(In(j,2k-2:2k-1)), \text{ where } j=1, 2\le k\le N;$$

$$Sub(j,k)=Max(In(2j-2:2j-1,k)), \text{ where } 2\le j\le M, k=1;$$

$$Sub(j,k)=In(j,k), \text{ where } j=1, k=1.$$

Next, when the display screen 110 and the dimming screen 120 are in various alignment states, the methods for determining the display pixel data of one or more display pixels of the display screen 110 are summarized.

When the display screen 110 and the dimming screen 120 are in the first alignment state and in the fourth alignment state, the display pixel data of one or more display pixels of the display screen 110 is determined according to the following formula:

$$Main(2j-1:2j,2k-1:2k)=h(f(In(2j-1:2j,2k-1:2k))*g(Sub(j,k))), \text{ where } 1\le j\le M, 1\le k\le N.$$

In the above formula, Main(2j−1:2j,2k−1:2k) indicates the display pixel data of the display pixels located in the (2k−1)-th column to the 2k-th column of the (2j−1)-th row and in the (2k−1)-th column to the 2k-th column of the 2j-th row of the display screen 110, function $h(x)=x^{1/2.2}$, function $f(x)=x^{2.2}$, function $g(x)=x^{-1}$. The meanings of the Main, the function h, the function f, and the function g in the following formulas are similar to those described herein, and will not be described again.

When the display screen 110 and the dimming screen 120 are in the second alignment state and in the fourth alignment state, the display pixel data of one or more display pixels of the display screen 110 is determined according to the following formula:

$$Main(2j:2j+1,2k-1:2k)=h(f(In(2j:2j+1,2k-1:2k))*g(Sub(j,k))), \text{ where } 2\le j\le M-1, 1\le k\le N;$$

$$Main(j,2k-1:2k)=In(j,2k-1:2k), \text{ where } j=1, 1\le k\le N;$$

$$Main(2j,2k-1:2k)=h(f(In(2j,2k-1:2k))*g(Sub(j,k))), \text{ where } j=M, 1\le k\le N.$$

When the display screen 110 and the dimming screen 120 are in the third alignment state and in the fourth alignment state, the display pixel data of one or more display pixels of the display screen 110 is determined according to the following formula:

$$Main(2j-2:2j-1,2k-1:2k)=h(f(In(2j-2:2j-1,2k-1:2k))*g(Sub(j,k))), \text{ where } 2\le j\le M-1, 1\le k\le N;$$

$$Main(j,2k-1:2k)=h(f(In(j,2k-1:2k))*g(Sub(j,k))), \text{ where } j=1, 1\le k\le N;$$

$$Main(2j,2k-1:2k)=In(2j,2k-1:2k), \text{ where } j=M, 1\le k\le N.$$

When the display screen 110 and the dimming screen 120 are in the first alignment state and in the fifth alignment state, the display pixel data of one or more display pixels of the display screen 110 is determined according to the following formula:

$$Main(2j-1:2j,2k:2k+1)=h(f(In(2j-1:2j,2k:2k+1))*g(Sub(j,k))), \text{ where }$$

$$1\le j\le M, 2\le k\le N-1;$$

$Main(2j-1:2j,k)=In(2j-1:2j,k)$, where $1 \leq j \leq M, k=1$;

$Main(2j-1:2j,2k)=h(f(In(2j-1:2j,2k))*g(Sub(j,k)))$, where $1 \leq j \leq M, k=N$.

When the display screen 110 and the dimming screen 120 are in the first alignment state and in the sixth alignment state, the display pixel data of one or more display pixels of the display screen 110 is determined according to the following formula:

$Main(2j-1:2j,2k-2:2k-1)=h(f(In(2j-1:2j,2k-2:2k-1))*g(Sub(j,k)))$, where $1 \leq j \leq M, 2 \leq k \leq N-1$;

$Main(2j-1:2j,k)=h(f(In(2j-1:2j,k))*g(Sub(j,k)))$, where $1 \leq j \leq M, k=1$;

$Main(2j-1:2j,2k)=In(2j-1:2j,2k)$, where $1 \leq j \leq M, k=N$.

When the display screen 110 and the dimming screen 120 are in the second alignment state and in the fifth alignment state, the display pixel data of one or more display pixels of the display screen 110 is determined according to the following formula:

$Main(2j:2j+1,2k:2k+1)=h(f(In(2j:2j+1,2k:2k+1))*g(Sub(j,k)))$, where $2 \leq j \leq M-1, 2 \leq k \leq N-1$;

$Main(j,k)=In(j,k)$, where $j=1, k=1$;

$Main(j,2k:2k+1)=In(j,2k:2k+1)$, where $j=1, 2 \leq k \leq N-1$;

$Main(j,2k)=In(j,2k)$, where $j=1, k=N$;

$Main(2j:2j+1,k)=In(2j:2j+1,k)$, where $2 \leq j \leq M-1, k=1$;

$Main(2j,k)=In(2j,k)$, where $j=M, k=1$;

$Main(2j,2k:2k+1)=h(f(In(2j,2k:2k+1))*g(Sub(j,k)))$, where $j=M, 2 \leq k \leq N-1$;

$Main(2j:2j+1,2k)=h(f(In(2j:2j+1,2k))*g(Sub(j,k)))$, where $2 \leq j \leq M-1, k=N$;

$Main(2j,2k)=h(f(In(2j,2k))*g(Sub(j,k)))$, where $j=M, k=N$.

When the display screen 110 and the dimming screen 120 are in the second alignment state and in the sixth alignment state, the display pixel data of one or more display pixels of the display screen 110 is determined according to the following formula:

$Main(2j:2j+1,2k-2:2k-1)=h(f(In(2j:2j+1,2k-2:2k-1))*g(Sub(j,k)))$, where $2 \leq j \leq M-1, 2 \leq k \leq N-1$;

$Main(j,k)=In(j,k)$, where $j=1, k=1$;

$Main(j,2k-2:2k-1)=In(j,2k-2:2k-1)$, where $j=1, 2 \leq k \leq N-1$;

$Main(j,2k)=In(j,2k)$, where $j=1, k=N$;

$Main(2j:2j+1,k)=h(f(In(2j:2j+1,k))*g(Sub(j,k)))$, where $2 \leq j \leq M-1, k=1$;

$Main(2j,k)=h(f(In(2j,k))*g(Sub(j,k)))$, where $j=M, k=1$;

$Main(2j,2k-2:2k-1)=h(f(In(2j,2k-2:2k-1))*g(Sub(j,k)))$, where $j=M, 2 \leq k \leq N-1$;

$Main(2j:2j+1,2k)=In(2j:2j+1,2k)$, where $2 \leq j \leq M-1, k=N$;

$Main(2j,2k)=In(2j,2k)$, where $j=M, k=N$.

When the display screen 110 and the dimming screen 120 are in the third alignment state and in the fifth alignment state, the display pixel data of one or more display pixels of the display screen 110 is determined according to the following formula:

$Main(2j-2:2j-1,2k:2k+1)=h(f(In(2j-2:2j-1,2k:2k+1))*g(Sub(j,k)))$, where $2 \leq j \leq M-1, 2 \leq k \leq N-1$;

$Main(j,k)=In(j,k)$, where $j=1, k=1$;

$Main(j,2k:2k+1)=h(f(In(j,2k:2k+1))*g(Sub(j,k)))$, where $j=1, 2 \leq k \leq N-1$;

$Main(j,2k)=h(f(In(j,2k))*g(Sub(j,k)))$, where $j=1, k=N$;

$Main(2j-2:2j-1,k)=In(2j-2:2j-1,k)$, where $2<j \leq M-1, k=1$;

$Main(2j,k)=In(2j,k)$, where $j=M, k=1$;

$Main(2j,2k:2k+1)=In(2j,2k:2k+1)$, where $j=M, 2 \leq k \leq N-1$;

$Main(2j-2:2j-1,2k)=h(f(In(2j-2:2j-1,2k))*g(Sub(j,k)))$, where $2<j \leq M-1, k=N$;

$Main(2j,2k)=In(2j,2k)$, where $j=M, k=N$.

When the display screen 110 and the dimming screen 120 are in the third alignment state and in the sixth alignment state, the display pixel data of one or more display pixels of the display screen 110 is determined according to the following formula:

$Main(2j-2:2j-1,2k-2:2k-1)=h(f(In(2j-2:2j-1,2k-2:2k-1))*g(Sub(j,k)))$, where $2 \leq j \leq M-1, 2 \leq k \leq N-1$;

$Main(j,k)=h(f(In(j,k))*g(Sub(j,k)))$, where $j=1, k=1$;

$Main(j,2k-2:2k-1)=h(f(In(j,2k-2:2k-1))*g(Sub(j,k)))$, where $j=1, 2 \leq k \leq N-1$;

$Main(j,2k)=In(j,2k)$, where $j=1, k=N$;

$Main(2j-2:2j-1,k)=h(f(In(2j-2:2j-1,k))*g(Sub(j,k)))$, where $2 \leq j \leq M-1, k=1$;

$Main(2j,k)=In(2j,k)$, where $j=M, k=1$;

$Main(2j,2k-2:2k-1)=In(2j,2k-2:2k-1)$, where $j=M, 2 \leq k \leq N-1$;

$Main(2j-2:2j-1,2k)=In(2j-2:2j-1,2k)$, where $2 \leq j \leq M-1, k=N$;

$Main(2j,2k)=In(2j,2k)$, where $j=M, k=N$.

In the following, taking a case that the dimming screen 120 includes 1080*1920 dimming pixels and the display screen 110 includes 2160*3840 display pixels as an example, when the display screen 110 and the dimming screen 120 are in various alignment states, the pixel corresponding relationship among the input image, the dimming screen, and the display screen in physical position will be explained in detail.

Table 1 shows a pixel corresponding relationship among the input image, the dimming screen, and the display screen in physical position in the row direction of the dimming pixels of the dimming screen when the display screen and the dimming screen are in the first alignment state.

TABLE 1

| Input image | Dimming screen | Display screen |
|---|---|---|
| 1 | 1 | 1 |
| 2 |   | 2 |
| 3 | 2 | 3 |
| 4 |   | 4 |
| 5 | 3 | 5 |
| 6 |   | 6 |
| 7 | 4 | 7 |
| 8 |   | 8 |
| ... | ... | ... |
| 2153 | 1077 | 2153 |
| 2154 |   | 2154 |
| 2155 | 1078 | 2155 |
| 2156 |   | 2156 |
| 2157 | 1079 | 2157 |
| 2158 |   | 2158 |
| 2159 | 1080 | 2159 |
| 2160 |   | 2160 |

TABLE 2

| Input image | Dimming screen | Display screen |
|---|---|---|
| 1 |   | 1 |
| 2 | 1 | 2 |
| 3 |   | 3 |
| 4 | 2 | 4 |
| 5 |   | 5 |
| 6 | 3 | 6 |
| 7 |   | 7 |
| 8 | 4 | 8 |
| 9 |   | 9 |
| ... | ... | ... |
| 2154 | 1077 | 2154 |
| 2155 |   | 2155 |
| 2156 | 1078 | 2156 |
| 2157 |   | 2157 |
| 2158 | 1079 | 2158 |
| 2159 |   | 2159 |
| 2160 | 1080 | 2160 |

As shown in Table 1, when the display screen 110 and the dimming screen 120 are in the first alignment state, that is, when there is no alignment deviation between the display screen 110 and the dimming screen 120 in the column direction of the plurality of dimming pixels of the dimming screen 120, in physical position, the dimming pixels in the j-th row of the dimming screen correspond to the display pixels in the (2j−1)-th row and the display pixels in the 2j-th row of the display screen, where $1 \leq j \leq 1080$.

For example, in a case where the display screen 110 and the dimming screen 120 are in the first alignment state and the display screen 110 and the dimming screen 120 are also in the fourth alignment state, the dimming pixel data of the dimming pixels located in the first row to the 1080-th row of the first column of the dimming screen 120 is set as follows:

$$\mathrm{Sub}(1, 1) = \mathrm{Max}(\mathrm{In}(1:2, 1:2))$$

$$\mathrm{Sub}(2, 1) = \mathrm{Max}(\mathrm{In}(3:4, 1:2))$$

$$\ldots$$

$$\mathrm{Sub}(1079, 1) = \mathrm{Max}(\mathrm{In}(2157:2158, 1:2))$$

$$\mathrm{Sub}(1080, 1) = \mathrm{Max}(\mathrm{In}(2159:2160, 1:2))$$

For example, when the display screen 110 and the dimming screen 120 are in the first alignment state and the display screen 110 and the dimming screen 120 are also in the fourth alignment state, the display pixel data of the display pixels located in the first row to the 2160-th row of the first column and in the first row to the 2160-th row of the second column of the display screen 110 is set as follows:

$$\mathrm{Main}(1:2, 1:2) = h(f(\mathrm{In}(1:2, 1:2))^{*}g(\mathrm{Sub}(1, 1)))$$

$$\mathrm{Main}(3:4, 1:2) = h(f(\mathrm{In}(3:4, 1:2))^{*}g(\mathrm{Sub}(2, 1)))$$

$$\ldots$$

$$\mathrm{Main}(2157:2158, 1:2) = h(f(\mathrm{In}(2157:2158, 1:2))^{*}g(\mathrm{Sub}(1079, 1)))$$

$$\mathrm{Main}(2159:2160, 1:2) = h(f(\mathrm{In}(2159:2160, 1:2))^{*}g(\mathrm{Sub}(1080, 1)))$$

Table 2 shows a pixel corresponding relationship among the input image, the dimming screen, and the display screen in physical position in the row direction of the dimming pixels of the dimming screen when the display screen and the dimming screen are in the second alignment state.

As shown in Table 2, when the display screen 110 and the dimming screen 120 are in the second alignment state, that is, when the display screen 110 is offset upward by one row of display pixels relative to the dimming screen 120 in the column direction of the plurality of dimming pixels of the dimming screen 120, the dimming pixels in the j-th row of the dimming screen 120 correspond to the display pixels in the 2j-th row and the display pixels in the (2j+1)-th row of the display screen 110 in physical position, where $1 \leq j \leq 1079$. In addition, in physical position, the dimming pixel in the 1080-th row of the dimming screen 120 correspond to the display pixels in the 2160-th row of the display screen. In this case, as shown in Table 2, in physical position, dimming pixels of the dimming screen 120 corresponding to the display pixels in the first row of the display screen 110 may not exist.

For example, when the display screen 110 and the dimming screen 120 are in the second alignment state, and the display screen 110 and the dimming screen 120 are still in the fourth alignment state, the dimming pixel data of the dimming pixels located in the first row to the 1080-th row of the first column of the dimming screen 120 is set as follows:

$$\mathrm{Sub}(1, 1) = \mathrm{Max}(\mathrm{In}(2:3, 1:2))$$

$$\mathrm{Sub}(2, 1) = \mathrm{Max}(\mathrm{In}(4:5, 1:2))$$

$$\ldots$$

$$\mathrm{Sub}(1079, 1) = \mathrm{Max}(\mathrm{In}(2158:2159, 1:2))$$

$$\mathrm{Sub}(1080, 1) = \mathrm{Max}(\mathrm{In}(2160, 1:2))$$

For example, when the display screen 110 and the dimming screen 120 are in the second alignment state and the display screen 110 and the dimming screen 120 are still in the fourth alignment state, the display pixel data of the display pixels located in the first row to the 2160-th row of the first column and in the first row to the 2160-th row of the second column of the display screen 110 is set as follows:

$$\mathrm{Main}(1, 1:2) = \mathrm{In}(1, 1:2)$$

$$\mathrm{Main}(2:3, 1:2) = h(f(\mathrm{In}(2:3, 1:2))^{*}g(\mathrm{Sub}(1, 1)))$$

$$\ldots$$

-continued $$\text{Main}(2158:2159, 1:2) = h(f(\text{In}(2158:2159, 1:2))^*g(\text{Sub}(1079, 1)))$$

$$\text{Main}(2160, 1:2) = h(f(\text{In}(2160, 1:2))^*g(\text{Sub}(1080, 1)))$$

Table 3 shows a pixel corresponding relationship among the input image, the dimming screen, and the display screen in physical position in the row direction of the dimming pixels of the dimming screen when the display screen and the dimming screen are in the third alignment state.

TABLE 3

| Input image | Dimming screen | Display screen |
|---|---|---|
|  | 1 |  |
| 1 |  | 1 |
| 2 | 2 | 2 |
| 3 |  | 3 |
| 4 | 3 | 4 |
| 5 |  | 5 |
| 6 | 4 | 6 |
| 7 |  | 7 |
| ... | ... | ... |
| 2152 | 1077 | 2152 |
| 2153 |  | 2153 |
| 2154 | 1078 | 2154 |
| 2155 |  | 2155 |
| 2156 | 1079 | 2156 |
| 2157 |  | 2157 |
| 2158 | 1080 | 2158 |
| 2159 |  | 2159 |
| 2160 |  | 2160 |

As shown in Table 3, when the display screen 110 and the dimming screen 120 are in the third alignment state, that is, when the display screen 110 is offset downward by one row of display pixels relative to the dimming screen 120 in the column direction of the dimming pixels of the dimming screen 120. In physical position, the dimming pixels in the j-th row of the dimming screen 120 correspond to the display pixels in the (2j−2)-th row and the display pixels in the (2j−1)-th row of the display screen 110, where 2≤j≤1080. In addition, in physical position, the dimming pixels in the first row of the dimming screen 120 correspond to the display pixels in the first row of the display screen. In this case, as shown in Table 3, there is no dimming pixel of the dimming screen 120 corresponding to the display pixels in the 2160-th row of the display screen 110 in physical position.

For example, when the display screen 110 and the dimming screen 120 are in the third alignment state and the display screen 110 and the dimming screen 120 are still in the fourth alignment state, the dimming pixel data of the dimming pixels located in the first row to the 1080-th row of the first column of the dimming screen 120 is set as follows:

$$\text{Sub}(1, 1) = \text{Max}(\text{In}(1, 1:2))$$

$$\text{Sub}(2, 1) = \text{Max}(\text{In}(2:3, 1:2))$$

...

$$\text{Sub}(1079, 1) = \text{Max}(\text{In}(2156:2157, 1:2))$$

$$\text{Sub}(1080, 1) = \text{Max}(\text{In}(2158:2159, 1:2))$$

For example, when the display screen 110 and the dimming screen 120 are in the third alignment state and the display screen 110 and the dimming screen 120 are still in the fourth alignment state, the display pixel data of the display pixels located in the first row to the 2160-th row of the first column and in the first row to the 2160-th row of the second column of the display screen 110 is set as follows:

$$\text{Main}(1, 1:2) = h(f(\text{In}(1, 1:2))*g(\text{Sub}(1, 1)))$$

$$\text{Main}(2:3, 1:2) = h(f(\text{In}(2:3, 1:2))^*g(\text{Sub}(2, 1)))$$

...

$$\text{Main}(2158:2159, 1:2) = h(f(\text{In}(2158:2159, 1:2))^*g(\text{Sub}(1080, 1)))$$

$$\text{Main}(2160, 1:2) = \text{In}(2160, 1:2)$$

Table 4 shows a pixel corresponding relationship among the input image, the dimming screen, and the display screen in physical position in the row direction of the dimming pixels of the dimming screen when the display screen and the dimming screen are in the fourth alignment state.

TABLE 4

| Input image | 1 | 2 | 3 | 4 | 5 | 6 | 7 | 8 | ... | 3833 | 3834 | 3835 | 3836 | 3837 | 3838 | 3839 | 3840 |
|---|---|---|---|---|---|---|---|---|---|---|---|---|---|---|---|---|---|
| Dimming screen | 1 |  | 2 |  | 3 |  | 4 |  | ... | 1917 |  | 1918 |  | 1919 |  | 1920 |  |
| Display screen | 1 | 2 | 3 | 4 | 5 | 6 | 7 | 8 | ... | 3833 | 3834 | 3835 | 3836 | 3837 | 3838 | 3839 | 3840 |

As shown in Table 4, when the display screen 110 and the dimming screen 120 are in the fourth alignment state, that is, when there is no alignment deviation between the display screen 110 and the dimming screen 120 in the row direction of the dimming pixels of the dimming screen 120, the dimming pixels in the k-th column of the dimming screen correspond to the display pixels in the (2k−1)-th column and the display pixels in the 2k-th column of the display screen in physical position, where 1≤k≤1920.

For example, when the display screen 110 and the dimming screen 120 are in the fourth alignment state and the display screen 110 and the dimming screen 120 are still in the first alignment state, the dimming pixel data of the dimming pixels located in the first column to the 1920-th column of the first row of the dimming screen 120 is set as follows:

$$\text{Sub}(1, 1) = \text{Max}(\text{In}(1:2, 1:2))$$

$$\text{Sub}(1, 2) = \text{Max}(\text{In}(1:2, 3:4))$$

...

$$\text{Sub}(1, 1919) = \text{Max}(\text{In}(1:2, 3837:3838))$$

$$\text{Sub}(1, 1920) = \text{Max}(\text{In}(1:2, 3839:3840))$$

For example, when the display screen 110 and the dimming screen 120 are in the fourth alignment state and the display screen 110 and the dimming screen 120 are still in the first alignment state, the display pixel data of the display pixels located in the first column to the 3840-th column of the first row and in the first column to the 3840-th column of the second row of the display screen 110 is set as follows:

$$\text{Main}(1:2, 1:2) = h(f(\text{In}(1:2, 1:2))^*g(\text{Sub}(1, 1)))$$

$$\text{Main}(1:2, 3:4) = h(f(\text{In}(1:2, 3:4))^*g(\text{Sub}(1, 2)))$$

...

$$\text{Main}(1:2, 3837:3838) = h(f(\text{In}(1:2, 3837:3838))^*g(\text{Sub}(1, 1919)))$$

$$\text{Main}(1:2, 3839:3840) = h(f(\text{In}(1:2, 3839:3840))^*g(\text{Sub}(1, 1920)))$$

Table 5 shows a pixel corresponding relationship among the input image, the dimming screen, and the display screen in the physical position in the row direction of the dimming pixels of the dimming screen when the display screen and the dimming screen are in the fifth alignment state.

TABLE 5

| Input image | 1 | 2 | 3 | 4 | 5 | 6 | 7 | 8 | 9 | ... | 3834 | 3835 | 3836 | 3837 | 3838 | 3839 | 3840 |
|---|---|---|---|---|---|---|---|---|---|---|---|---|---|---|---|---|---|
| Dimming screen | | 1 | | 2 | | 3 | | 4 | | ... | | 1917 | | 1918 | | 1919 | 1920 |
| Display screen | 1 | 2 | 3 | 4 | 5 | 6 | 7 | 8 | 9 | ... | 3834 | 3835 | 3836 | 3837 | 3838 | 3839 | 3840 |

As shown in Table 5, when the display screen 110 and the dimming screen 120 are in the fifth alignment state, that is, when the display screen 110 is offset to the left by one column relative to the dimming screen 120 in the row direction of the dimming pixels of the dimming screen 120, the dimming pixels in the k-th column of the dimming screen 120 correspond to the display pixels in the 2k-th column and the display pixels in the (2k+1)-th column of the display screen 110 in physical position. In addition, in physical position, the dimming pixels in the 1920-th column of the dimming screen 120 correspond to the display pixels in the 3840-th column of the display screen. In this case, as shown in Table 5, there is no dimming pixel of the dimming screen 120 corresponding to the display pixels in the first column of the display screen 110 in physical position.

For example, when the display screen 110 and the dimming screen 120 are in the fifth alignment state and the display screen 110 and the dimming screen 120 are still in the first alignment state, the dimming pixel data of the dimming pixels located in the first column to the 1920-th column of the first row of the dimming screen 120 is set as follows:

$$\text{Sub}(1, 1) = \text{Max}(\text{In}(1:2, 2:3))$$

$$\text{Sub}(1, 2) = \text{Max}(\text{In}(1:2, 4:5, 1:2))$$

...

$$\text{Sub}(1, 1919) = \text{Max}(\text{In}(1:2, 3838:3839))$$

$$\text{Sub}(1, 1920) = \text{Max}(\text{In}(1:2, 3840))$$

For example, when the display screen 110 and the dimming screen 120 are in the fifth alignment state and the display screen 110 and the dimming screen 120 are still in the first alignment state, the display pixel data of the display pixels located in the first column to the 3840-th column of the first row and in the first column to the 3840-th column of the second row of the display screen 110 is set as follows:

$$\text{Main}(1:2, 1) = \text{In}(1:2, 1)$$

$$\text{Main}(1:2, 2:3) = h(f(\text{In}(1:2, 2:3))^*g(\text{Sub}(1, 1)))$$

...

$$\text{Main}(1:2, 3838:3839) = h(f(\text{In}(1:2, 3838:3839))^*g(\text{Sub}(1, 1919)))$$

$$\text{Main}(1:2, 3840) = h(f(\text{In}(1:2, 3840))^*g(\text{Sub}(1, 1920)))$$

Table 6 shows a pixel corresponding relationship among the input image, the dimming screen, and the display screen in physical position in the row direction of the dimming pixels of the dimming screen when the display screen and the dimming screen are in the sixth alignment state.

As shown in Table 6, when the display screen 110 and the dimming screen 120 are in the sixth alignment state, that is, when the display screen 110 is offset to the right by one column relative to the dimming screen 120 in the row direction of the dimming pixels of the dimming screen 120, the dimming pixels in the k-th column of the dimming screen correspond to the display pixels in the (2k−2)-th column and the display pixels in the (2k−1)-th column of the display screen in physical position, where 2≤k≤1920. In addition, in physical position, the dimming pixels in the first column of the dimming screen correspond to the display pixels in the first column of the display screen. In this case, as shown in Table 6, there is no dimming pixel of the dimming screen 120 corresponding to the display pixels in the 3840-th column of the display screen 110 in physical position.

For example, when the display screen 110 and the dimming screen 120 are in the sixth alignment state and the display screen 110 and the dimming screen 120 are still in the first alignment state, the dimming pixel data of the dimming pixels located in the first column to the 1920-th column of the first row of the dimming screen 120 is set as follows:

$$\text{Sub}(1, 1) = \text{Max}(\text{In}(1:2, 1))$$

$$\text{Sub}(1, 2) = \text{Max}(\text{In}(1:2, 2:3))$$

...

$$\text{Sub}(1, 1919) = \text{Max}(\text{In}(1:2, 3836:3837))$$

$$\text{Sub}(1, 1920) = \text{Max}(\text{In}(1:2, 3838:3839))$$

For example, when the display screen 110 and the dimming screen 120 are in the sixth alignment state and the display screen 110 and the dimming screen 120 are still in the first alignment state, the display pixel data of the display pixels located in the first column to the 3840-th column of the first row and in the first column to the 3840-th column of the second row of the dimming screen 120 is set as follows:

$$\text{Main}(1:2, 1) = h(f(\text{In}(1:2, 1))^*g(\text{Sub}(1, 1)))$$

$$\text{Main}(1:2, 2:3) = h(f(\text{In}(1:2, 2:3))^*g(\text{Sub}(1, 2)))$$

$$\ldots$$

$$\text{Main}(1:2, 3838:3839) = h(f(\text{In}(1:2, 3838:3839))^*g(\text{Sub}(1, 1920)))$$

$$\text{Main}(1:2, 3840) = \text{In}(1:2, 3840)$$

TABLE 6

| Input image | 1 | 2 | 3 | 4 | 5 | 6 | 7 | ... | 3832 | 3833 | 3834 | 3835 | 3836 | 3837 | 3838 | 3839 | 3840 |
|---|---|---|---|---|---|---|---|---|---|---|---|---|---|---|---|---|---|
| Dimming screen | 1 | | 2 | | 3 | | 4 | ... | 1917 | | 1918 | | 1919 | | 1920 | | |
| Display screen | 1 | 2 | 3 | 4 | 5 | 6 | 7 | ... | 3832 | 3833 | 3834 | 3835 | 3836 | 3837 | 3838 | 3839 | 3840 |

At least one embodiment of the present disclosure also provides an alignment deviation detection apparatus, the apparatus comprises a processor, a memory configured to store computer executable instructions, and when the computer executable instructions are executed by the processor, causing the processor to perform the alignment deviation detection method of the display panel provided in the above embodiment.

Figure 11:
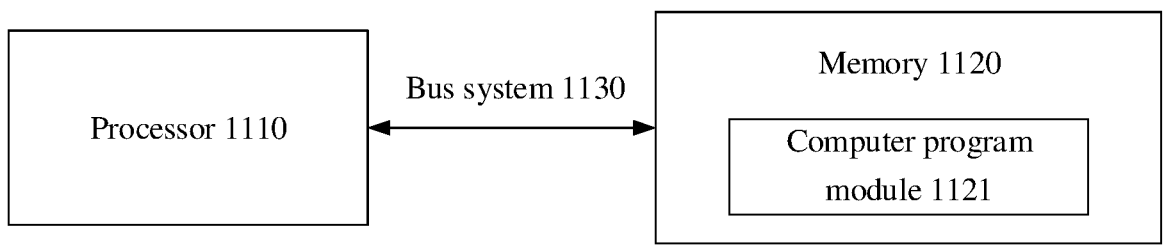
FIG. 11 is a structural schematic diagram of an alignment deviation detection apparatus provided by an embodiment of the present disclosure.

FIG. 11 is a structural schematic diagram of an alignment deviation detection apparatus according to at least one embodiment of the present disclosure.

As shown in FIG. 11, the alignment deviation detection apparatus includes a processor 1110, a memory 1120, and a bus system 1130. The processor 1110 and the memory 1120 are connected by the bus system 1130. One or more computer program modules 1121 may be stored in the memory 1120. For example, the one or more computer program modules 1121 may include instructions for executing the alignment deviation detection method of the display panel provided in the above-mentioned embodiments of the present disclosure, so as to detect the alignment deviation between the display screen and the dimming screen in the display panel. For example, instructions in the one or more computer program modules 1121 may be executed by the processor 1110.

At least one embodiment of the present disclosure also provides a data compensation apparatus. The data compensation apparatus comprises a processor and a memory configured to store computer executable instructions, and when the computer executable instructions are executed by the processor, causing the processor to perform the data compensation method of the display panel provided by the above-mentioned embodiment.

Figure 12:
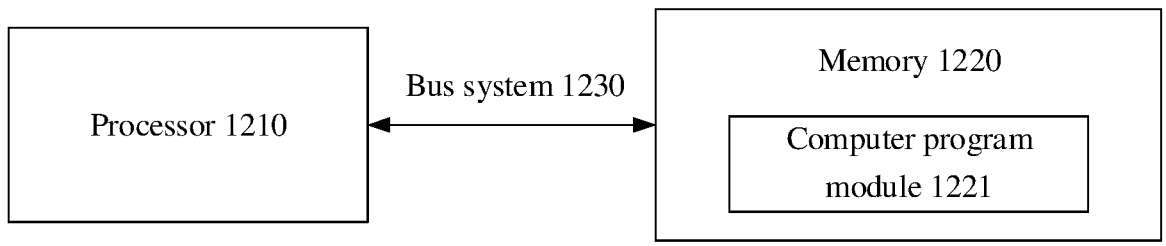
FIG. 12 is a structural schematic diagram of a data compensation apparatus provided by an embodiment of the present disclosure.

FIG. 12 is a structural schematic diagram of a data compensation apparatus provided by an embodiment of the present disclosure.

As shown in FIG. 12, the data compensation apparatus includes a processor 1210, a memory 1220, and a bus system 1230. The processor 1210 and the memory 1220 are connected by the bus system 1230. One or more computer program modules 1221 may be stored in the memory 1220. For example, the one or more computer program modules 1221 may include instructions for executing the data compensation method of the display panel provided in the above-mentioned embodiments of the present disclosure, so as to compensate the display pixel data of the display screen according to the alignment deviation between the display screen and the dimming screen in the display panel. For example, instructions in the one or more computer program modules 1221 may be executed by the processor 1210.

In various embodiments of the present disclosure, the processor 1210 may be implemented by an application specific integrated circuit chip, for example, the application specific integrated circuit chip may be disposed on a mainboard, for example, a memory, a power supply circuit, and the like may also be disposed on the mainboard; the processor 1210 can also be implemented by a circuit or by software, hardware (circuit), firmware, or any combination thereof. In an embodiment of the present disclosure, the processor 1210 may include various computing structures, such as a complex instruction set computer (CISC) structure, a reduced instruction set computer (RISC) structure, or a structure that implements a variety of instruction set combinations. In some embodiments, the processor may also be a microprocessor, such as an X86 processor or an ARM processor, or may be a digital processor (DSP) or the like.

In at least one embodiment of the present disclosure, the memory 1220 may be disposed on the above-mentioned mainboard, for example, the memory may store instructions and/or data executed by the processor. For example, the memory may include one or more computer program products, the computer program products may include various forms of computer-readable memory, such as volatile memory and/or non-volatile memory. The volatile memory may include random access memory (RAM) and/or cache, for example. The non-volatile memory may include, for example, a read-only memory (ROM), a hard disk, a flash memory, and the like. One or more computer program instructions may be stored on the computer-readable memory, and the processor 1210 may execute the program instructions to implement the desired functions (implemented by the processor) in the embodiments of the present disclosure.

In various embodiments of the present disclosure, the bus system may be a commonly used serial and parallel communication bus, etc., and the embodiments of the present disclosure are not limited to this.

What have been described above are only exemplary implementations of the present disclosure, are not intended to limit the protection scope of the present disclosure. The protection scope of the present disclosure should be determined by the appended claims.

What is claimed is:

1. An alignment deviation detection method of a display panel, wherein the display panel comprises a dimming screen and a display screen, and the dimming screen is on a backlight side of the display screen and is configured to perform backlight modulation on the display screen, the alignment deviation detection method comprises:

providing a first data signal for causing the dimming screen to display an alignment dimming picture comprising a first alignment pattern;

providing a second data signal for causing the display screen to display an alignment display picture comprising a second alignment pattern;

under a control of the first data signal, making the dimming screen display the alignment dimming picture, and under a control of the second data signal, making the display screen display the alignment display picture;

according to a display situation of the second alignment pattern in the alignment display picture, determining an alignment state between the display screen and the dimming screen, wherein an orthographic projection of the second alignment pattern on the dimming screen is preset to be at least partially aligned with the first alignment pattern and at least partially deviated from the first alignment pattern.

2. The method according to claim 1, wherein the first alignment pattern comprises a first part, and the second alignment pattern comprises a first part, a second part, and a third part, and the first part, the second part, and the third part of the second alignment pattern are independent of each other, the orthographic projection of the second alignment pattern on the dimming screen being preset to be at least partially aligned with the first alignment pattern and at least partially deviated from the first alignment pattern, comprises:

presetting an orthographic projection of the first part of the second alignment pattern on the dimming screen to deviate to a first side of the first part of the first alignment pattern in a first alignment direction;

presetting an orthographic projection of the second part of the second alignment pattern on the dimming screen to be aligned with the first part of the first alignment pattern in the first alignment direction;

presetting an orthographic projection of the third part of the second alignment pattern on the dimming screen to deviate to a second side of the first part of the first alignment pattern in the first alignment direction, wherein a direction in which the first part of the second alignment pattern deviates from the first part of the first alignment pattern is opposite to a direction in which the third part of the second alignment pattern deviates from the first part of the first alignment pattern, and a distance by which the first part of the second alignment pattern deviates from the first part of the first alignment pattern is identical with a distance by which the third part of the second alignment pattern deviates from the first part of the first alignment pattern, and the first side and the second side of the first part of the first alignment pattern are two sides opposite to each other.

3. The method according to claim 2, wherein the dimming screen comprises a plurality of dimming pixels, and the plurality of dimming pixels are arranged in M rows and N columns; the display screen comprises a plurality of display pixels, and the plurality of display pixels are arranged in $\alpha M$ rows and $\alpha N$ columns, wherein M and N are positive integers, $3 \leq M$, $3 \leq N$, and $\alpha$ is a positive integer, the first part of the first alignment pattern comprises a first dimming line segment, under the control of the first data signal, making the dimming screen display the alignment dimming picture, comprises:

under the control of the first data signal, controlling at least part of dimming pixels located in an m-th row of the dimming screen to display the first dimming line segment, wherein m is a positive integer, and $2 \leq m \leq M-1$.

4. The method according to claim 3, wherein $\alpha=2$, the first part of the second alignment pattern comprises a first display line segment, the second part of the second alignment pattern comprises a second display line segment, and the third part of the second alignment pattern comprises a third display line segment, under the control of the second data signal, making the display screen display the alignment display picture, comprises:

under the control of the second data signal, controlling display pixels located in an nb-th column to an nb'-th column of a $((2*m-2)\beta)$-th row and in the nb-th column to the nb'-th column of a $((2*m-1)\beta)$-th row of the display screen to display the first display line segment, controlling display pixels located in nc-th column to an nc'-th column of a $(2*m-1)$-th row and in the nc-th column to the nc'-th column of a $(2*m)$-th row of the display screen to display the second display line segment, and controlling display pixels located in an nd-th column to an nd'-th column of a $((2*m)+\beta)$-th row and in the nd-th column to the nd'-th column of a $((2*m+1)+\beta)$-th row of the display screen to display the third display line segment, wherein $\beta$ is 0, 1, or 2, nb, nb', nc, nc', nd, and nd' are positive integers, and $1 \leq nb \leq nb' < nc \leq nc' < nd \leq nd' \leq 2N$.

5. The method according to claim 3, wherein the first alignment direction is a column direction of the plurality of dimming pixels of the dimming screen, and the alignment state comprises a first alignment state, a second alignment state, and a third alignment state, the first alignment state indicates that an alignment between the display screen and the dimming screen has no deviation in the column direction of the plurality of dimming pixels of the dimming screen, the second alignment state indicates that the display screen is offset upward by one row of display pixels relative to the dimming screen in the column direction of the plurality of dimming pixels of the dimming screen, the third alignment state indicates that the display screen is offset downward by one row of display pixels relative to the dimming screen in the column direction of the plurality of dimming pixels of the dimming screen.

6. The method according to claim 5, wherein $\beta=0$, according to the display situation of the second alignment pattern, determining the alignment state between the display screen and the dimming screen, comprises:

in a case where a brightness value of the second display line segment is greater than a brightness value of the first display line segment and a brightness value of the third display line segment, and the brightness value of the first display line segment is equal to the brightness value of the third display line segment, determining that the display screen and the dimming screen are in the first alignment state;

in a case where the brightness value of the third display line segment is greater than the brightness value of the second display line segment, and the brightness value of the second display line segment is greater than the brightness value of the first display line segment, determining that the display screen and the dimming screen are in the second alignment state; or, in a case where the brightness value of the first display line segment is greater than the brightness value of the second display line segment, and the brightness value of the second display line segment is greater than the brightness value of the third display line segment, determining that the display screen and the dimming screen are in the third alignment state.

7. The method according to claim 5, wherein the first part of the second alignment pattern further comprises a fourth display line segment, and the third part of the second alignment pattern further comprises a fifth display line segment, under the control of the second data signal, making the display screen display the alignment display picture, further comprises:

under the control of the second data signal, controlling display pixels located in an na-th column to an na'-th column of a $((2*m-3)-\beta)$-th row and in the na-th column to the na'-th column of the $((2*m-2)-\beta)$-th row of the display screen to display the fourth display line segment in the second alignment picture, and controlling display pixels located in an ne-th column to an ne'-th column of the $((2*m+1)+\beta)$-th row and in the ne-th column to the ne'-th column of a $((2*m+2)+\beta)$-th row of the display screen to display the fifth display line segment in the second alignment picture, wherein na, na', ne, and ne' are positive integers, $1 \leq na \leq na' < nb \leq nb' < nc \leq nc' < nd \leq nd' < ne \leq ne' \leq 2N$.

8. The method according to claim 7, wherein $\beta=0$, according to the display situation of the second alignment pattern, determining the alignment state between the display screen and the dimming screen, comprises:

in a case where a brightness value of the second display line segment is greater than a brightness value of the first display line segment, a brightness value of the third display line segment, a brightness value of the fourth display line segment, and a brightness value of the fifth display line segment, and the brightness value of the first display line segment is equal to the brightness value of the third display line segment, the brightness value of the fourth display line segment is equal to the brightness value of the fifth display line segment, and the brightness value of the first display line segment is greater than the brightness value of the fourth display line segment, determining that the display screen and the dimming screen are in the first alignment state;

in a case where the brightness value of the third display line segment is greater than the brightness value of the first display line segment, the brightness value of the second display line segment, the brightness value of the fourth display line segment, and the brightness value of the fifth display line segment, and the brightness value of the second display line segment is equal to the brightness value of the fifth display line segment, the brightness value of the first display line segment is smaller than the brightness value of the second display line segment and is greater than the brightness value of the fourth display line segment, determining that the display screen and the dimming screen are in the second alignment state; or, in a case where the brightness value of the first display line segment is greater than the brightness value of the second display line segment, the brightness value of the third display line segment, the brightness value of the fourth display line segment, and the brightness value of the fifth display line segment, and the brightness value of the second display line segment is equal to the brightness value of the fourth display line segment, and the brightness value of the third display line segment is smaller than the brightness value of the second display line segment and is greater than the brightness value of the fifth display line segment, determining that the display screen and the dimming screen are in the third alignment state.

9. The method according to claim 3, wherein the first alignment pattern further comprises a second part, and the second alignment pattern further comprises a fourth part, a fifth part, and a sixth part, and the fourth part, the fifth part, and the sixth part are independent of each other, the orthographic projection of the second alignment pattern on the dimming screen being preset to be at least partially aligned with the first alignment pattern and at least partially deviated from the first alignment pattern, further comprises:

presetting an orthographic projection of the fourth part of the second alignment pattern on the dimming screen to deviate to a first side of the second part of the first alignment pattern in a second alignment direction;

presetting an orthographic projection of the fifth part of the second alignment pattern on the dimming screen to be aligned with the second part of the first alignment pattern in the second alignment direction; and presetting an orthographic projection of the sixth part of the second alignment pattern on the dimming screen to deviate to a second side of the second part of the first alignment pattern in the second alignment direction, wherein a direction in which the fourth part of the second alignment pattern deviates from the second part of the first alignment pattern is opposite to a direction in which the sixth part of the second alignment pattern deviates from the second part of the first alignment pattern, and a distance by which the fourth part of the second alignment pattern deviates from the second part of the first alignment pattern is identical with a distance by which the sixth part of the second alignment pattern deviates from the second part of the first alignment pattern;

the first side and the second side of the second part of the first alignment pattern are two sides opposite to each other; and the first alignment direction and the second alignment direction are perpendicular to each other on a plane parallel to the dimming screen.

10. The method according to claim 9, wherein the second part of the first alignment pattern comprises a second dimming line segment, under the control of the first data signal, making the dimming screen display the alignment dimming picture, further comprises:

under the control of the first data signal, controlling at least part of dimming pixels located in an n-th column of the dimming screen to display the second dimming line segment, wherein n is a positive integer, $2 \leq n \leq N-1$, $\alpha=2$, the fourth part of the second alignment pattern comprises a sixth display line segment, the fifth part of the second alignment pattern comprises a seventh display line segment, and the sixth part of the second alignment pattern comprises an eighth display line segment, under the control of the second data signal, making the display screen display the alignment display picture, comprises:

under the control of the second data signal, controlling display pixels located in an mb-th row to an mb'-th row of a $((2*n-2)-\gamma)$-th column and in the mb-th row to the mb'-th row of a $((2*n-1)-\gamma)$-th column of the display screen to display the sixth display line segment, controlling display pixels located in an mc-th row to an mc'-th row of a $(2*n-1)$-th column and in the mc-th row to the mc'-th row of a $(2*n)$-th column of the display screen to display the seventh display line segment, and controlling display pixels located in an md-th row to an md'-th row of a $((2*n)+\gamma)$-th column and in the md-th row to the md'-th row of a $((2*n+1)+\gamma)$-th column of the display screen to display the eighth display line segment, wherein $\gamma$ is 0 or 1, mb, mb', mc, mc', md, and md' are positive integers, and $1 \leq mb \leq mb' < mc \leq mc' < md \leq md' \leq 2M$.

11. The method according to claim 10, wherein the second alignment direction is a row direction of the plurality of dimming pixels of the dimming screen, and the alignment state comprises a fourth alignment state, a fifth alignment state, and a sixth alignment state, the fourth alignment state indicates that in the row direction of the plurality of dimming pixels of the dimming screen, an alignment between the display screen and the dimming screen has no deviation, the fifth alignment state indicates that in the row direction of the plurality of dimming pixels of the dimming screen, the display screen is offset to left by one column of display pixels relative to the dimming screen, the sixth alignment state indicates that in the row direction of the plurality of dimming pixels of the dimming screen, the display screen is offset to right by one column of display pixels relative to the dimming screen.

12. The method according to claim 11, wherein $\gamma=0$, according to the display situation of the second alignment pattern, determining the alignment state between the display screen and the dimming screen, comprises:

in a case where a brightness value of the seventh display line segment is greater than a brightness value of the sixth display line segment and a brightness value of the eighth display line segment, and the brightness value of the sixth display line segment is equal to the brightness value of the eighth display line segment, determining that the display screen and the dimming screen are in the fourth alignment state;

in a case where the brightness value of the eighth display line segment is greater than the brightness value of the seventh display line segment, and the brightness value of the seventh display line segment is greater than the brightness value of the sixth display line segment, determining that the display screen and the dimming screen are in the fifth alignment state; or, in a case where the brightness value of the sixth display line segment is greater than the brightness value of the seventh display line segment, and the brightness value of the seventh display line segment is greater than the brightness value of the eighth display line segment, determining that the display screen and the dimming screen are in the sixth alignment state.

13. The method according to claim 11, wherein the fourth part of the second alignment pattern further comprises a ninth display line segment, and the sixth part of the second alignment pattern further comprises a tenth display line segment, under the control of the second data signal, making the display screen display the alignment display picture, further comprises:

under the control of the second data signal, controlling display pixels located in an ma-th row to an ma'-th row of a $((2*n-3)-\gamma)$-th column and in the ma-th row to the ma'-th row of a $((2*n-2)-\gamma)$-th column of the display screen to display the ninth display line segment, and controlling display pixels located in an me-th row to an me'-th row of a $((2*n+1)+\gamma)$-th column and in the me-th row to the me'-th row of a $((2*n+2)+\gamma)$-th column of the display screen to display the tenth display line segment, wherein ma, ma', me, and me' are positive integers, and $1 \leq ma \leq ma' < mb \leq mb' < mc \leq mc' < md \leq md' < me \leq me' \leq 2M$.

14. The method according to claim 13, wherein $\gamma=0$, according to the display situation of the second alignment pattern, determining the alignment state between the display screen and the dimming screen, comprises:

in a case where a brightness value of the seventh display line segment is greater than a brightness value of the sixth display line segment, a brightness value of the eighth display line segment, a brightness value of the ninth display line segment, and a brightness value of the tenth display line segment, and the brightness value of the sixth display line segment is equal to the brightness value of the eighth display line segment, and the brightness value of the ninth display line segment is equal to the brightness value of the tenth display line segment, and the brightness value of the sixth display line segment is greater than the brightness value of the ninth display line segment, determining that the display screen and the dimming screen are in the fourth alignment state;

in a case where the brightness value of the eighth display line segment is greater than the brightness value of the sixth display line segment, the brightness value of the seventh display line segment, the brightness value of the ninth display line segment, and the brightness value of the tenth display line segment, and the brightness value of the seventh display line segment is equal to the brightness value of the tenth display line segment, and the brightness value of the sixth display line segment is smaller than the brightness value of the seventh display line segment and is equal to the brightness value of the ninth display line segment, determining that the display screen and the dimming screen are in the fifth alignment state; or, in a case where the brightness value of the sixth display line segment is greater than the brightness value of the seventh display line segment, the brightness value of the eighth display line segment, the brightness value of the ninth display line segment, and the brightness value of the tenth display line segment, and the brightness value of the seventh display line segment is equal to the brightness value of the ninth display line segment, and the brightness value of the eighth display line segment is smaller than the brightness value of the seventh display line segment and is equal to the brightness value of the tenth display line segment, determining that the display screen and the dimming screen are in the sixth alignment state.

15. A data compensation method of a display panel, wherein the display panel comprises a dimming screen and a display screen, the dimming screen is on a backlight side of the display screen and is configured to perform backlight modulation on the display screen, and the data compensation method comprises:
determining an alignment state between the display screen and the dimming screen by using an alignment deviation detection method of the display panel;
acquiring an image signal of an input image to be displayed;
according to the alignment state, determining, based on the image signal, dimming pixel data of a dimming picture to be displayed on the dimming screen;
according to the alignment state, determining, based on the image signal and the dimming pixel data, display pixel data of a display picture to be displayed on the display screen;
wherein the alignment deviation detection method comprises:
providing a first data signal for causing the dimming screen to display an alignment dimming picture comprising a first alignment pattern;
providing a second data signal for causing the display screen to display an alignment display picture comprising a second alignment pattern;
under a control of the first data signal, making the dimming screen display the alignment dimming picture, and under a control of the second data signal, making the display screen display the alignment display picture;
according to a display situation of the second alignment pattern in the alignment display picture, determining the alignment state between the display screen and the dimming screen,
wherein an orthographic projection of the second alignment pattern on the dimming screen is preset to be at least partially aligned with the first alignment pattern and at least partially deviated from the first alignment pattern.

16. The method according to claim 15, wherein the dimming screen comprises a plurality of dimming pixels, and the display screen comprises a plurality of display pixels,
according to the alignment state, determining, based on the image signal, the dimming pixel data of the dimming picture to be displayed on the dimming screen, comprises:
according to a pixel corresponding relationship between the image signal and the display screen, determining initial pixel data corresponding to each of the plurality of display pixels of the display screen in the image signal;
according to the alignment state, determining a pixel corresponding relationship between the display screen and the dimming screen in physical position;
according to the pixel corresponding relationship between the display screen and the dimming screen in physical position, determining one or more display pixels of the display screen corresponding to, in physical position, a dimming pixel of the dimming screen; and
based on initial pixel data corresponding to each of the one or more display pixels, determining dimming pixel data of the dimming pixel of the dimming screen corresponding to the one or more display pixels in physical position.

17. The method according to claim 16, wherein based on the initial pixel data corresponding to each of the one or more display pixels, determining the dimming pixel data of the dimming pixel of the dimming screen corresponding to the one or more display pixels in physical position, comprises:
in the alignment state, for one dimming pixel of the dimming screen corresponding to one display pixel of the display screen in physical position, taking initial pixel data corresponding to the one display pixel as dimming pixel data of the one dimming pixel of the dimming screen corresponding to the one display pixel in physical position; and
in the alignment state, for one dimming pixel of the dimming screen corresponding to a plurality of display pixels of the display screen in physical position, selecting a maximum value in initial pixel data corresponding to the plurality of display pixels as dimming pixel data of the one dimming pixel of the dimming screen corresponding to the plurality of display pixels in physical position.

18. The method according to claim 16, wherein
according to the alignment state, determining, based on the image signal and the dimming pixel data, the display pixel data of the display picture to be displayed on the display screen, comprises:
in the alignment state, for one or more display pixels, which do not correspond to any dimming pixel of the dimming screen in physical position, of the display screen, taking initial pixel data corresponding to each of the one or more display pixels as display pixel data of the one or more display pixels of the display screen; and
in the alignment state, for one or more display pixels of the display screen corresponding to one dimming pixel of the dimming screen in physical position, determining display pixel data of the one or more display pixels of the display screen based on initial pixel data corresponding to each of the one or more display pixels and dimming pixel data of the one dimming pixel of the dimming screen corresponding to the one or more display pixels in physical position.

19. An alignment deviation detection apparatus, comprising:
a processor;
a memory, storing computer executable instructions,
wherein when the computer executable instructions are executed by the processor, causing the processor to perform an alignment deviation detection method of a display panel,
wherein the display panel comprises a dimming screen and a display screen, and the dimming screen is on a backlight side of the display screen and is configured to perform backlight modulation on the display screen,
the alignment deviation detection method comprises:
providing a first data signal for causing the dimming screen to display an alignment dimming picture comprising a first alignment pattern;
providing a second data signal for causing the display screen to display an alignment display picture comprising a second alignment pattern;
under a control of the first data signal, making the dimming screen display the alignment dimming picture, and under a control of the second data signal, making the display screen display the alignment display picture;
according to a display situation of the second alignment pattern in the alignment display picture, determining an alignment state between the display screen and the dimming screen, wherein an orthographic projection of the second alignment pattern on the dimming screen is preset to be at least partially aligned with the first alignment pattern and at least partially deviated from the first alignment pattern.

20. A data compensation apparatus, comprising:

a processor;

a memory, storing computer executable instructions, wherein when the computer executable instructions are executed by the processor, causing the processor to perform the data compensation method according to claim 15.

\* \* \* \* \*